US012373397B2

(12) United States Patent
Meister et al.

(10) Patent No.: US 12,373,397 B2
(45) Date of Patent: Jul. 29, 2025

(54) MANAGING DIRECTORY-TREE OPERATIONS IN FILE STORAGE

(71) Applicant: Pure Storage, Inc., Mountain View, CA (US)

(72) Inventors: Dirk Meister, Mountain View, CA (US); Subramaniam Periyagaram, Campbell, CA (US); David A. Grunwald, San Francisco, CA (US); Ronald Karr, Palo Alto, CA (US)

(73) Assignee: Pure Storage, Inc., Santa Clara, CA (US)

( * ) Notice: Subject to any disclaimer, the term of this patent is extended or adjusted under 35 U.S.C. 154(b) by 1119 days.

(21) Appl. No.: 17/022,857

(22) Filed: Sep. 16, 2020

(65) Prior Publication Data

US 2021/0303528 A1   Sep. 30, 2021

Related U.S. Application Data

(63) Continuation-in-part of application No. 16/834,762, filed on Mar. 30, 2020, now Pat. No. 11,704,035.

(60) Provisional application No. 63/077,259, filed on Sep. 11, 2020, provisional application No. 63/036,955, filed on Jun. 9, 2020.

(51) Int. Cl.
| G06F 16/185 | (2019.01) |
| G06F 16/11  | (2019.01) |
| G06F 16/16  | (2019.01) |
| G06F 16/17  | (2019.01) |
| G06F 16/182 | (2019.01) |

(52) U.S. Cl.
CPC .......... *G06F 16/185* (2019.01); *G06F 16/128* (2019.01); *G06F 16/162* (2019.01); *G06F 16/1734* (2019.01); *G06F 16/1824* (2019.01)

(58) Field of Classification Search
CPC .... G06F 16/185; G06F 16/128; G06F 16/162; G06F 16/1734; G06F 16/1824; G06F 16/184; G06F 16/188
See application file for complete search history.

(56) References Cited

U.S. PATENT DOCUMENTS

| 5,802,547 A | 9/1998 | Legvold |
| 5,832,527 A | 11/1998 | Kawaguchi |
| 5,933,368 A | 8/1999 | Ma |

(Continued)

OTHER PUBLICATIONS

"International Search Report and Written Opinion received in International Application No. PCT/US2022/024451 on Aug. 2, 2022".

(Continued)

*Primary Examiner* — Kenneth M Lo
*Assistant Examiner* — Jonah C Krieger
(74) *Attorney, Agent, or Firm* — ALG Intellectual Property, LLC

(57) ABSTRACT

An illustrative data storage system establishes path sets that represent relationships between service layer entities and storage layer entities associated with service layer entities. The data storage system coordinates, based on the path sets and on operations applied to one or more of the service layer entities, implementation of the operations on the storage layer entities. The path sets may be used to support implementation of snapshots, space accounting, and/or other operations of the data storage system.

20 Claims, 37 Drawing Sheets

(56) References Cited

U.S. PATENT DOCUMENTS

| | | |
|---|---|---|
| 6,473,775 B1 | 10/2002 | Kusters |
| 6,484,177 B1 | 11/2002 | Van Huben |
| 6,643,654 B1 | 11/2003 | Patel |
| 6,647,473 B1 | 11/2003 | Golds |
| 6,748,420 B1 | 6/2004 | Quatrano et al. |
| 6,915,420 B2 | 7/2005 | Hensley |
| 6,934,822 B2 | 8/2005 | Armangau |
| 6,957,362 B2 | 10/2005 | Armangau |
| 6,970,975 B2 | 11/2005 | Frank |
| 6,976,146 B1 | 12/2005 | Aiello |
| 7,007,047 B2 | 2/2006 | Zelenka |
| 7,016,907 B2 | 3/2006 | Boreham et al. |
| 7,065,558 B2 | 6/2006 | Ramanathan et al. |
| 7,162,486 B2 | 1/2007 | Patel |
| 7,200,627 B2 | 4/2007 | Stickler |
| 7,225,210 B2 | 5/2007 | Guthrie, II |
| 7,409,494 B2 | 8/2008 | Edwards |
| 7,409,511 B2 | 8/2008 | Edwards |
| 7,478,096 B2 | 1/2009 | Margolus |
| 7,499,905 B2 | 3/2009 | Jaschek |
| 7,506,111 B1 | 3/2009 | Hamilton |
| 7,529,905 B2 | 5/2009 | Sinclair |
| 7,539,706 B1 | 5/2009 | Campbell |
| 7,587,570 B2 | 9/2009 | Sarkar |
| 7,631,156 B2 | 12/2009 | Nakamura et al. |
| 7,634,514 B2 | 12/2009 | Langan et al. |
| 7,636,776 B2 | 12/2009 | Shah et al. |
| 7,664,798 B2 | 2/2010 | Wood |
| 7,680,996 B2 | 3/2010 | Komarov |
| 7,711,946 B2 | 5/2010 | Gilliam |
| 7,725,668 B2 | 5/2010 | Akutsu |
| 7,734,603 B1 | 6/2010 | McManis |
| 7,739,312 B2 | 6/2010 | Gordon |
| 7,743,023 B2 | 6/2010 | Teodosiu |
| 7,747,637 B2 | 6/2010 | Haselden et al. |
| 7,756,821 B2 | 7/2010 | Havens et al. |
| 7,757,056 B1 | 7/2010 | Fair |
| 7,774,312 B2 | 8/2010 | Ngai |
| 7,779,034 B2 | 8/2010 | Pedersen et al. |
| 7,801,894 B1 | 9/2010 | Bone |
| 7,814,262 B2 | 10/2010 | Sinclair |
| 7,827,350 B1 | 11/2010 | Jiang |
| 7,836,017 B1 | 11/2010 | Srinivasan |
| 7,849,057 B1 | 12/2010 | Kazar |
| 7,853,624 B2 | 12/2010 | Friedlander et al. |
| 7,873,614 B2 | 1/2011 | Boreham et al. |
| 7,877,539 B2 | 1/2011 | Sinclair |
| 7,958,095 B1 | 6/2011 | Campbell |
| 7,991,942 B2 | 8/2011 | Biswas |
| 7,996,636 B1 | 8/2011 | Prakash |
| 8,046,522 B2 | 10/2011 | Sinclair |
| 8,055,832 B2 | 11/2011 | Sinclair |
| 8,117,164 B2 | 2/2012 | Spektor |
| 8,121,981 B2 | 2/2012 | Simek |
| 8,190,798 B1 | 5/2012 | Dalal et al. |
| 8,190,832 B2 | 5/2012 | Dickey |
| 8,190,850 B1 | 5/2012 | Davenport |
| 8,195,623 B2 | 6/2012 | Prahlad |
| 8,195,636 B2 | 6/2012 | Stager |
| 8,195,980 B2 | 6/2012 | Schuba |
| 8,214,583 B2 | 7/2012 | Sinclair |
| 8,224,781 B2 | 7/2012 | Popovski |
| 8,230,085 B2 | 7/2012 | Roa |
| 8,245,035 B2 | 8/2012 | Khalidi et al. |
| 8,255,651 B2 | 8/2012 | Liu |
| 8,280,908 B2 | 10/2012 | Khalidi et al. |
| 8,284,198 B1 | 10/2012 | Hackworth |
| 8,285,681 B2 | 10/2012 | Prahlad |
| 8,286,030 B1 | 10/2012 | Chatterjee |
| 8,321,380 B1 | 11/2012 | Leverett |
| 8,352,785 B1 | 1/2013 | Nicklin et al. |
| 8,370,302 B2 | 2/2013 | Otani |
| 8,412,682 B2 | 4/2013 | Zheng |
| 8,433,682 B2 | 4/2013 | Ngo |
| 8,458,690 B2 | 6/2013 | Zhang |
| 8,484,164 B1 | 7/2013 | Sivakumar |
| 8,549,648 B2 | 10/2013 | Sallam |
| 8,589,447 B1 | 11/2013 | Grunwald |
| 8,613,093 B2 | 12/2013 | Camp |
| 8,959,048 B1 | 2/2015 | Rossberg |
| 9,002,807 B2 | 4/2015 | Hasegawa et al. |
| 9,015,123 B1 | 4/2015 | Mathew |
| 9,043,637 B2 | 5/2015 | Saika |
| 9,069,780 B2 | 6/2015 | Zuckerman |
| 9,116,901 B2 | 8/2015 | Bostock |
| 9,152,776 B2 | 10/2015 | Aggarwal et al. |
| 9,223,679 B1 | 12/2015 | Ho |
| 9,280,556 B2 | 3/2016 | Hasegawa et al. |
| 9,286,182 B2 | 3/2016 | Fries |
| 9,417,815 B1 | 8/2016 | Elisha |
| 9,471,587 B2 | 10/2016 | Conway et al. |
| 9,496,043 B1 | 11/2016 | Camp et al. |
| 9,552,259 B1 | 1/2017 | Chopra |
| 9,558,078 B2 | 1/2017 | Farlee |
| 9,563,555 B2 | 2/2017 | Flynn |
| 9,569,123 B2 | 2/2017 | Desantis |
| 9,569,455 B1 | 2/2017 | Bono |
| 9,606,909 B1 | 3/2017 | Vincent |
| 9,619,335 B1 | 4/2017 | Bushman |
| 9,635,132 B2 | 4/2017 | Lin |
| 9,639,296 B1 | 5/2017 | Vincent |
| 9,646,024 B2 | 5/2017 | Srivas |
| 9,665,306 B1 | 5/2017 | Patwardhan |
| 9,679,040 B1 | 6/2017 | Davis |
| 9,697,268 B1 | 7/2017 | Prater |
| 9,715,348 B2 | 7/2017 | Periyagaram |
| 9,715,507 B2 | 7/2017 | Brand |
| 9,753,659 B2 | 9/2017 | Hasegawa et al. |
| 9,753,932 B1 | 9/2017 | Brow |
| 9,767,106 B1 | 9/2017 | Duggal |
| 9,778,881 B2 | 10/2017 | Romanovskiy |
| 9,792,941 B2 | 10/2017 | Farey |
| 9,830,096 B2 | 11/2017 | Raj |
| 9,858,155 B2 | 1/2018 | Ashutosh |
| 9,870,367 B2 | 1/2018 | Sergeev |
| 9,875,054 B2 | 1/2018 | Vishniac |
| 9,880,762 B1 | 1/2018 | Armangau |
| 9,886,346 B2 | 2/2018 | Kumarasamy |
| 9,891,833 B2 | 2/2018 | Devendrappa |
| 9,904,487 B2 | 2/2018 | Elisha |
| 9,921,773 B2 | 3/2018 | Georgiev |
| 9,928,246 B1 | 3/2018 | Xu |
| 9,940,066 B2 | 4/2018 | Eggers |
| 9,959,070 B2 | 5/2018 | Vishniac |
| 9,959,280 B1 | 5/2018 | Whitehead |
| 9,965,204 B1 | 5/2018 | Cousins |
| 9,983,933 B2 | 5/2018 | Furman |
| 9,983,934 B2 | 5/2018 | Furman |
| 10,007,445 B2 | 6/2018 | Nithrakashyap |
| 10,019,180 B1 | 7/2018 | Miah |
| 10,031,672 B2 | 7/2018 | Wang |
| 10,055,149 B2 | 8/2018 | Dewey |
| 10,108,356 B1 | 10/2018 | Natanzon |
| 10,140,054 B2 | 11/2018 | Chiu |
| 10,185,505 B1 | 1/2019 | Golden |
| 10,228,871 B2 | 3/2019 | Patnaik |
| 10,248,618 B1 | 4/2019 | Gaurav |
| 10,248,657 B2 | 4/2019 | Prahlad |
| 10,275,308 B2 | 4/2019 | Czezatke |
| 10,275,317 B2 | 4/2019 | Borate |
| 10,339,101 B1 | 7/2019 | Gupta |
| 10,360,261 B2 | 7/2019 | Zuckerman |
| 10,397,241 B2 | 8/2019 | White et al. |
| 10,437,687 B2 | 10/2019 | Bushman |
| 10,437,787 B2 | 10/2019 | Plisko |
| 10,452,641 B1 | 10/2019 | Batchu |
| 10,503,427 B2 | 12/2019 | Botes et al. |
| 10,503,771 B2 | 12/2019 | Maybee |
| 10,528,521 B2 | 1/2020 | Agarwal |
| 10,534,749 B1 | 1/2020 | Miah |
| 10,795,598 B1 | 10/2020 | Vohra |
| 2002/0178146 A1 | 11/2002 | Akella |
| 2003/0088593 A1 | 5/2003 | Stickler |
| 2003/0163550 A1 | 8/2003 | Ramanathan et al. |

(56) References Cited

U.S. PATENT DOCUMENTS

| | | |
|---|---|---|
| 2003/0182301 A1 | 9/2003 | Patterson |
| 2003/0187883 A1 | 10/2003 | Zelenka |
| 2004/0030727 A1 | 2/2004 | Armangau |
| 2004/0030951 A1 | 2/2004 | Armangau |
| 2004/0059866 A1 | 3/2004 | Patel |
| 2004/0098539 A1 | 5/2004 | Frank |
| 2004/0133790 A1 | 7/2004 | Hensley |
| 2004/0167938 A1 | 8/2004 | Margolus |
| 2004/0167943 A1 | 8/2004 | Margolus |
| 2004/0250033 A1 | 12/2004 | Prahlad et al. |
| 2005/0114402 A1 | 5/2005 | Guthrie, II |
| 2005/0182910 A1 | 8/2005 | Stager |
| 2005/0246397 A1 | 11/2005 | Edwards |
| 2005/0246401 A1 | 11/2005 | Edwards |
| 2006/0123211 A1 | 6/2006 | Derk |
| 2006/0184719 A1 | 8/2006 | Sinclair |
| 2006/0184720 A1 | 8/2006 | Sinclair |
| 2007/0022091 A1 | 1/2007 | Styles et al. |
| 2007/0033328 A1 | 2/2007 | Sinclair |
| 2007/0083501 A1 | 4/2007 | Pedersen et al. |
| 2007/0086260 A1 | 4/2007 | Sinclair |
| 2007/0088669 A1 | 4/2007 | Jaschek |
| 2007/0150559 A1 | 6/2007 | Smith |
| 2007/0174569 A1 | 7/2007 | Schnapp |
| 2007/0208790 A1 | 9/2007 | Reuter |
| 2007/0220029 A1 | 9/2007 | Jones et al. |
| 2007/0288487 A1 | 12/2007 | Song et al. |
| 2008/0005060 A1 | 1/2008 | Khalidi et al. |
| 2008/0005133 A1 | 1/2008 | Khalidi et al. |
| 2008/0005141 A1 | 1/2008 | Zheng |
| 2008/0034176 A1 | 2/2008 | Akutsu |
| 2008/0046432 A1 | 2/2008 | Anderson |
| 2008/0082593 A1 | 4/2008 | Komarov |
| 2008/0109394 A1 | 5/2008 | Havens et al. |
| 2008/0155178 A1 | 6/2008 | Sinclair |
| 2008/0172423 A1* | 7/2008 | Shinkai ................ G06F 3/0685 707/999.203 |
| 2008/0177770 A1 | 7/2008 | Friedlander et al. |
| 2008/0270461 A1 | 10/2008 | Gordon |
| 2009/0024600 A1 | 1/2009 | Martin, Jr. et al. |
| 2009/0164705 A1 | 6/2009 | Gorobets |
| 2009/0268903 A1 | 10/2009 | Bojinov |
| 2010/0037031 A1 | 2/2010 | Desantis |
| 2010/0070466 A1 | 3/2010 | Prahlad |
| 2010/0070726 A1 | 3/2010 | Ngo |
| 2010/0077013 A1 | 3/2010 | Clements |
| 2010/0077160 A1 | 3/2010 | Liu et al. |
| 2010/0169394 A1 | 7/2010 | Hahn |
| 2010/0180092 A1 | 7/2010 | Rajaa |
| 2010/0191922 A1 | 7/2010 | Dickey |
| 2010/0281081 A1 | 11/2010 | Stager |
| 2010/0281473 A1 | 11/2010 | Zhang |
| 2010/0299490 A1 | 11/2010 | Attarde |
| 2010/0306174 A1 | 12/2010 | Otani |
| 2010/0306277 A1 | 12/2010 | Rimer et al. |
| 2010/0306500 A1* | 12/2010 | Mimatsu ................ G06F 3/0665 711/E12.078 |
| 2010/0332454 A1 | 12/2010 | Prahlad et al. |
| 2010/0332456 A1 | 12/2010 | Prahlad et al. |
| 2010/0333116 A1 | 12/2010 | Prahlad |
| 2011/0066768 A1 | 3/2011 | Brittner |
| 2011/0137966 A1 | 6/2011 | Srinivasan |
| 2011/0137991 A1 | 6/2011 | Russell |
| 2011/0213814 A1* | 9/2011 | Fukatani ................ G06F 16/185 707/827 |
| 2011/0218968 A1 | 9/2011 | Liu |
| 2011/0238936 A1 | 9/2011 | Hayden |
| 2011/0252208 A1 | 10/2011 | Ali et al. |
| 2011/0313973 A1 | 12/2011 | Srivas |
| 2012/0011176 A1 | 1/2012 | Aizman |
| 2012/0011336 A1 | 1/2012 | Saika |
| 2012/0011562 A1 | 1/2012 | Slater |
| 2012/0101991 A1 | 4/2012 | Srivas |
| 2012/0255011 A1 | 10/2012 | Sallam |
| 2012/0303585 A1 | 11/2012 | Zuckerman |
| 2013/0006936 A1 | 1/2013 | Chen |
| 2013/0007436 A1 | 1/2013 | Bookman et al. |
| 2013/0024424 A1 | 1/2013 | Prahlad |
| 2013/0036098 A1 | 2/2013 | Mutalik et al. |
| 2013/0036214 A1 | 2/2013 | Carmel |
| 2013/0054927 A1 | 2/2013 | Raj |
| 2013/0067175 A1 | 3/2013 | Yadav |
| 2013/0110790 A1 | 5/2013 | Matsumoto |
| 2013/0117239 A1 | 5/2013 | Hasegawa et al. |
| 2013/0212085 A1 | 8/2013 | Nica et al. |
| 2013/0268740 A1 | 10/2013 | Holt |
| 2014/0108519 A1 | 4/2014 | Klinkner et al. |
| 2014/0317371 A1 | 10/2014 | Muhlestein et al. |
| 2014/0321210 A1 | 10/2014 | Xiang |
| 2014/0325640 A1 | 10/2014 | Aggarwal et al. |
| 2014/0351217 A1 | 11/2014 | Bostock |
| 2014/0365540 A1 | 12/2014 | Conway et al. |
| 2015/0012571 A1* | 1/2015 | Powell ................ G06F 16/188 707/827 |
| 2015/0026126 A1 | 1/2015 | Lee et al. |
| 2015/0149411 A1 | 5/2015 | Plisko |
| 2015/0154418 A1 | 6/2015 | Redberg |
| 2015/0169618 A1 | 6/2015 | Hasegawa et al. |
| 2015/0261885 A1 | 9/2015 | Zuckerman |
| 2016/0054995 A1 | 2/2016 | Dehner et al. |
| 2016/0072898 A1 | 3/2016 | Fallon |
| 2016/0117099 A1 | 4/2016 | Prins et al. |
| 2016/0117228 A1 | 4/2016 | Farlee |
| 2016/0119428 A1 | 4/2016 | De Spiegeleer |
| 2016/0124978 A1 | 5/2016 | Nithrakashyap |
| 2016/0139996 A1 | 5/2016 | Mathew |
| 2016/0188236 A1 | 6/2016 | Hasegawa et al. |
| 2016/0285779 A1 | 9/2016 | Commons et al. |
| 2016/0342334 A1 | 11/2016 | Elisha |
| 2016/0350006 A1 | 12/2016 | Wang |
| 2017/0031776 A1 | 2/2017 | Ren |
| 2017/0039218 A1 | 2/2017 | Prahlad |
| 2017/0091296 A1 | 3/2017 | Beard |
| 2017/0109227 A1 | 4/2017 | Furman |
| 2017/0109234 A1 | 4/2017 | Furman |
| 2017/0147439 A1 | 5/2017 | Charters |
| 2017/0212915 A1 | 7/2017 | Borate |
| 2017/0242599 A1 | 8/2017 | Patnaik |
| 2017/0262349 A1 | 9/2017 | Bushman |
| 2017/0262543 A1 | 9/2017 | Gerzi et al. |
| 2017/0277602 A1 | 9/2017 | Kumar |
| 2017/0300247 A1 | 10/2017 | Dewey |
| 2017/0300551 A1 | 10/2017 | Prater |
| 2017/0323110 A1 | 11/2017 | Griffith |
| 2017/0351695 A1 | 12/2017 | Rao |
| 2018/0034892 A1 | 2/2018 | Olsen et al. |
| 2018/0081573 A1 | 3/2018 | Goodman et al. |
| 2018/0103062 A1 | 4/2018 | White et al. |
| 2018/0103104 A1 | 4/2018 | Burbey |
| 2018/0115556 A1 | 4/2018 | Otsubo |
| 2018/0181311 A1 | 6/2018 | Elisha |
| 2018/0232279 A1 | 8/2018 | Furman |
| 2018/0232280 A1 | 8/2018 | Furman |
| 2018/0288057 A1 | 10/2018 | Varadamma et al. |
| 2018/0335902 A1 | 11/2018 | Arrouye et al. |
| 2018/0356989 A1 | 12/2018 | Meister et al. |
| 2019/0012087 A1 | 1/2019 | Ding |
| 2019/0012714 A1* | 1/2019 | Bright ................ G06F 11/3438 |
| 2019/0146907 A1 | 5/2019 | Frolikov |
| 2019/0155523 A1 | 5/2019 | Golden |
| 2019/0179717 A1 | 6/2019 | Juniwal |
| 2019/0199512 A1 | 6/2019 | Pentland |
| 2019/0227878 A1 | 7/2019 | Agarwal |
| 2019/0303010 A1 | 10/2019 | Meiri |
| 2019/0303350 A1 | 10/2019 | Gupta |
| 2019/0324663 A1 | 10/2019 | Kass et al. |
| 2019/0370116 A1 | 12/2019 | Jacob |
| 2019/0370249 A1 | 12/2019 | Batchu |
| 2019/0370360 A1 | 12/2019 | Mainali |
| 2019/0377802 A1 | 12/2019 | Haber |
| 2019/0392053 A1 | 12/2019 | Chalakov |
| 2020/0019620 A1 | 1/2020 | Sarda et al. |
| 2020/0034051 A1 | 1/2020 | Zhang et al. |
| 2020/0034240 A1 | 1/2020 | Natanzon |

(56) References Cited

U.S. PATENT DOCUMENTS

| | | |
|---|---|---|
| 2020/0034718 A1 | 1/2020 | Beedu |
| 2020/0089409 A1* | 3/2020 | Ankireddypalle .. G06F 11/1453 |
| 2020/0097444 A1 | 3/2020 | Agarwal |
| 2020/0364351 A1 | 11/2020 | Sanchez et al. |
| 2020/0412707 A1 | 12/2020 | Siefker et al. |
| 2021/0081432 A1 | 3/2021 | Grunwald et al. |
| 2021/0117377 A1 | 4/2021 | Savir et al. |
| 2021/0255778 A1 | 8/2021 | Garewal |
| 2021/0294775 A1 | 9/2021 | Keller et al. |

OTHER PUBLICATIONS

International Search Report and Written Opinion received in International Application No. PCT/US2021/023728, dated Jun. 21, 2021.
Anonymous, "How to Enable Access-Based Enumeration (ABE) on Windows Server | Windows OS Hub", Jun. 24, 2019, pp. 1-15, XP055885118, [Retrieved on Jan. 28, 2022] Retrieved from URL: https://web.archive.org/web/20190624222937/woshub.com/enable-access-based-enumeration-in-windows-server/.
Hu F., et al., "Dell EMC PowerScale: Solution Design and Considerations for SMB Environments," Technical White Paper, Jun. 2, 2020, pp. 1-44, XP055885116, [Retrieved on Jan. 28, 2022] Retrieved from URL: https://www.delltechnologies.com/asset/en-us/products/storage/industry-market/h17463-wp-dell-emc-isilon-design-and-considerations-for-smb.pdf.
Turner J., "Access-Based Enumeration (ABE) Troubleshooting (part 2 of 2)," TechNet, Sep. 21, 2016, 9 Pages.

* cited by examiner

MANAGING DIRECTORY-TREE OPERATIONS IN FILE STORAGE

RELATED APPLICATIONS

The present application is a continuation-in-part application of U.S. patent application Ser. No. 16/834,762, entitled "Unified Storage on Block Containers" and filed on Mar. 30, 2020. The present application also claims priority to U.S. Provisional Patent Application No. 63/036,955, entitled "Managing Snapshots of Directories in File Systems" and filed on Jun. 9, 2020, and to U.S. Provisional Patent Application No. 63/077,259, entitled "Space Accounting in a Storage System" and filed Sep. 11, 2020. These applications are expressly incorporated by reference herein.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DESCRIPTION OF EMBODIMENTS

Figure 1A:
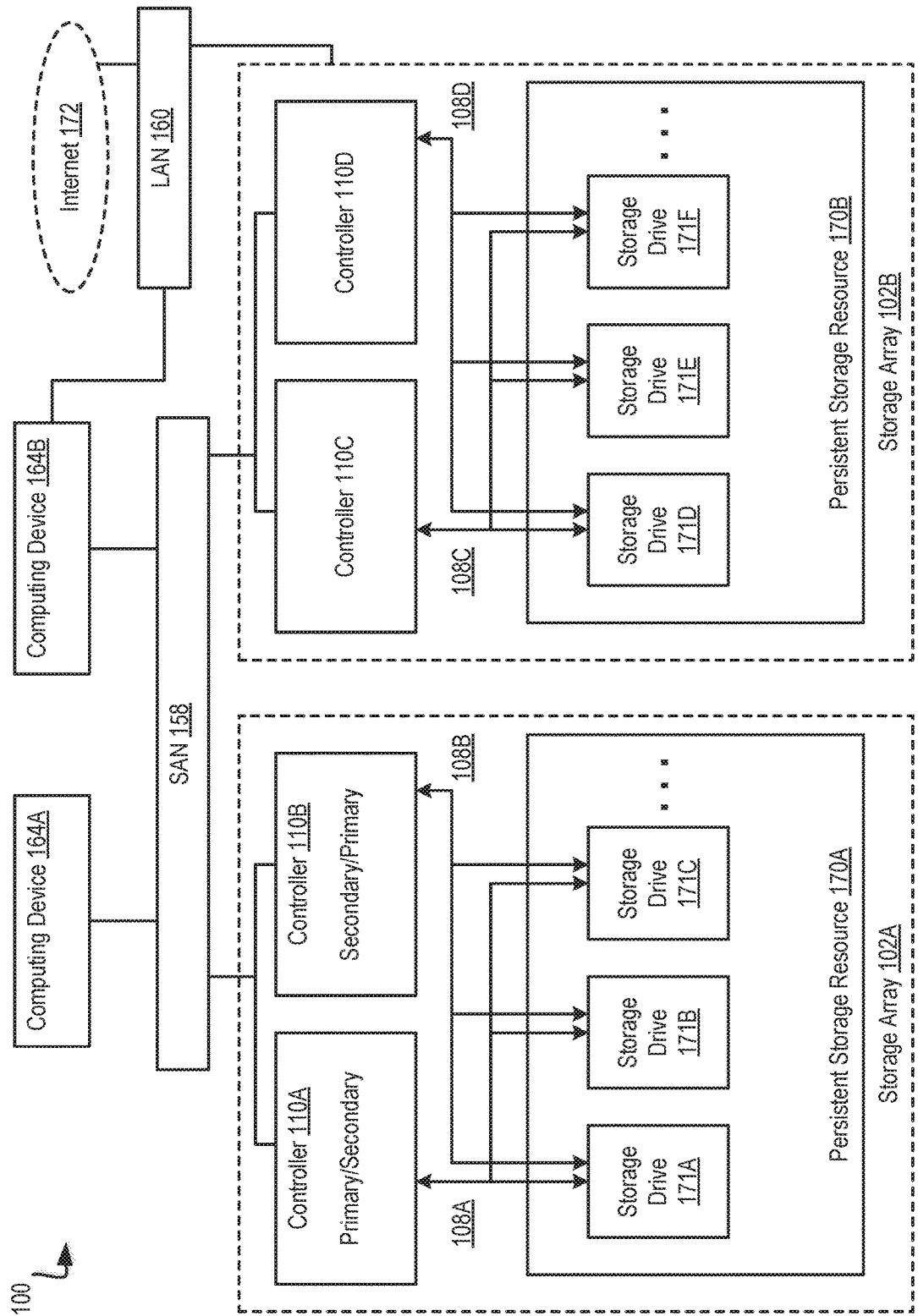
FIG. 1A illustrates a first example system for data storage in accordance with some implementations.

Example methods, apparatus, and products for data storage in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
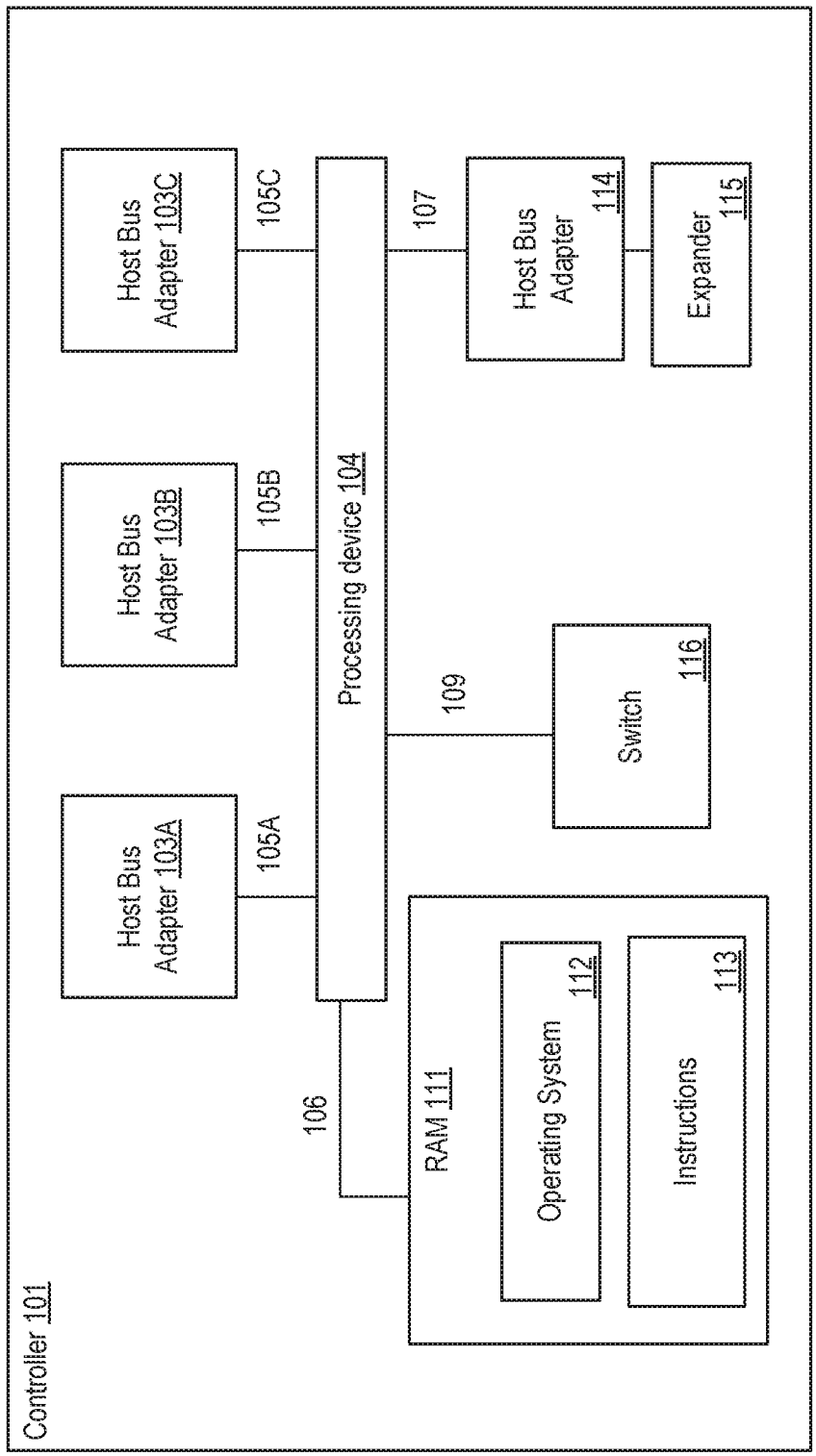
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
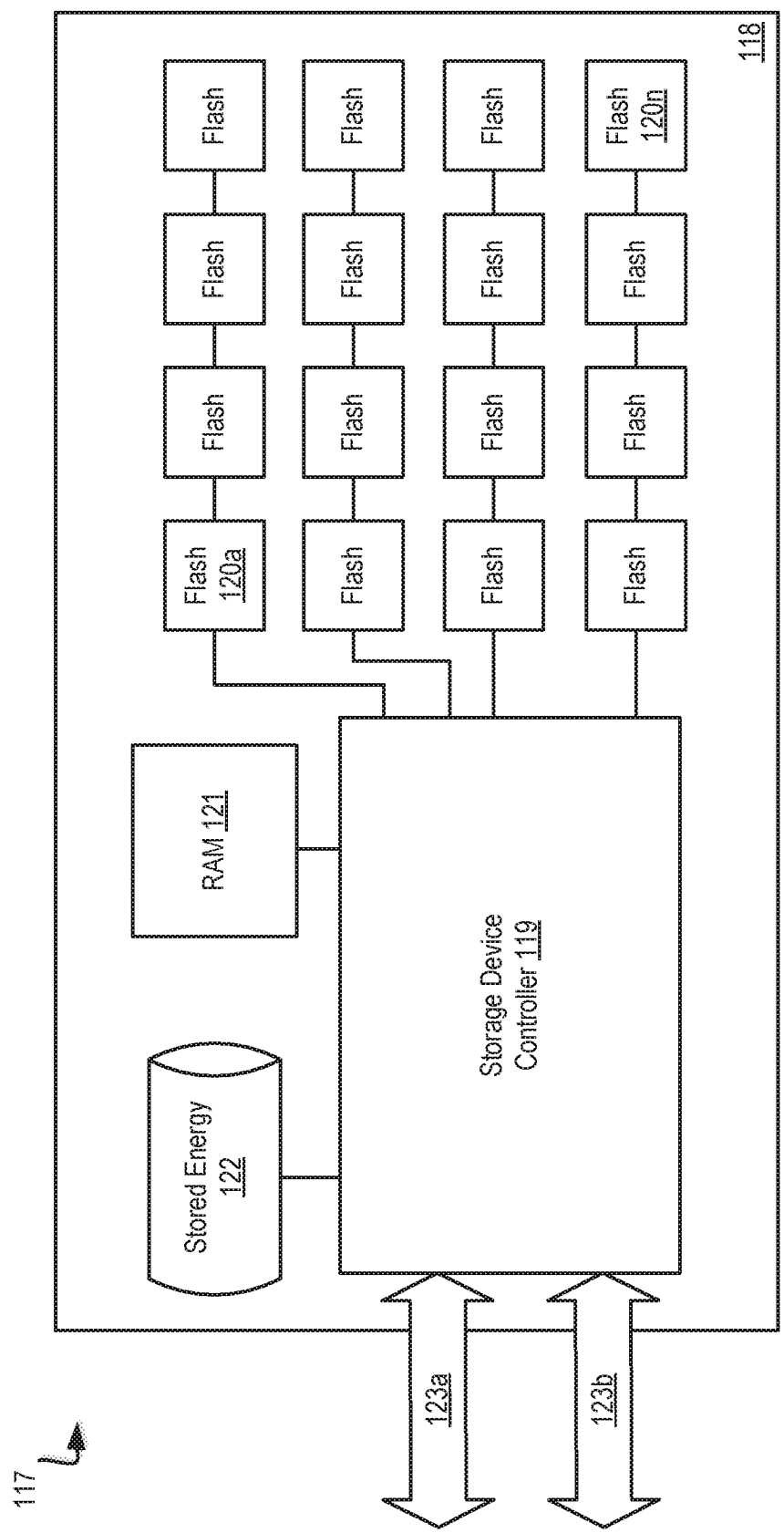
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
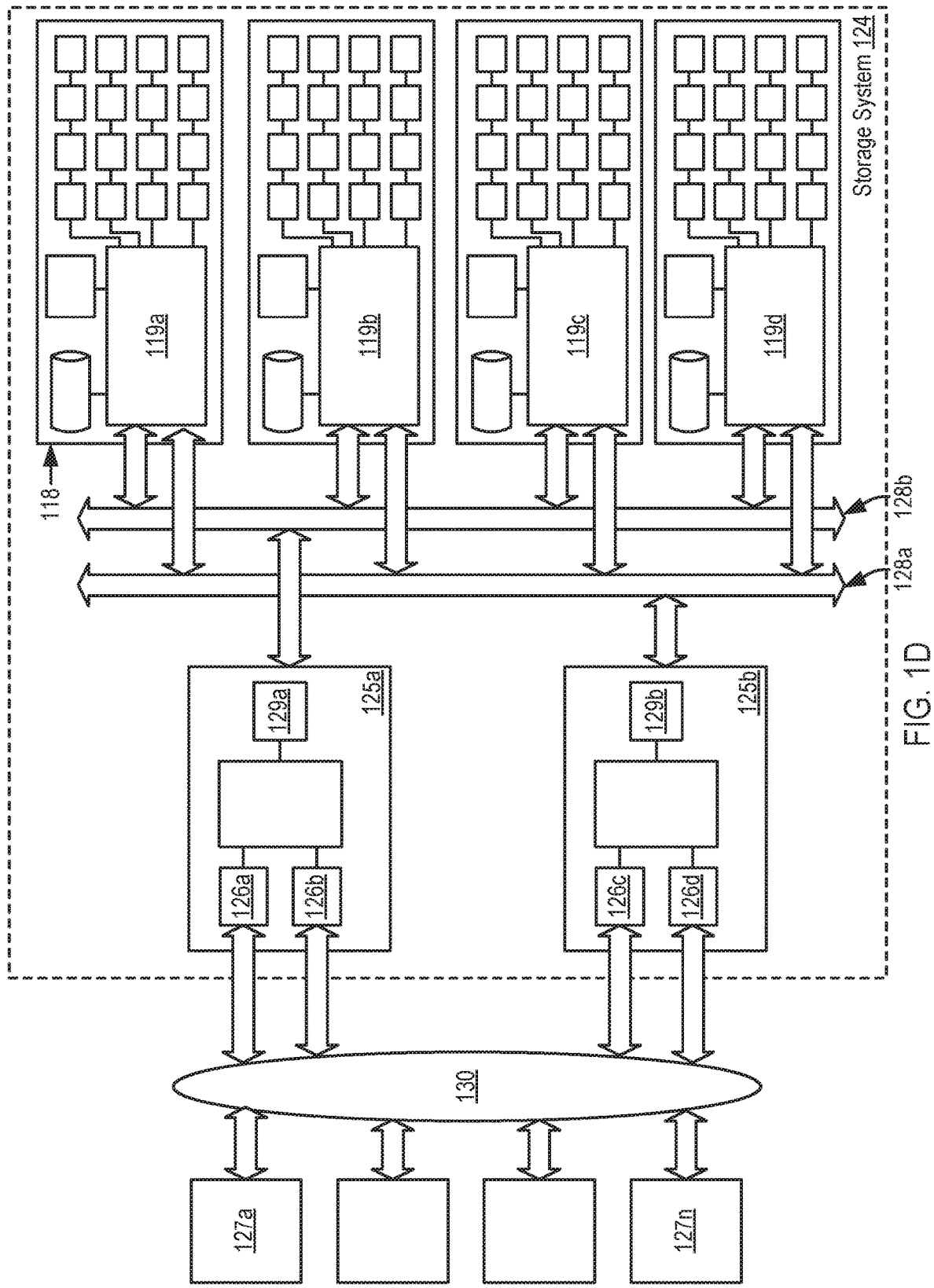
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
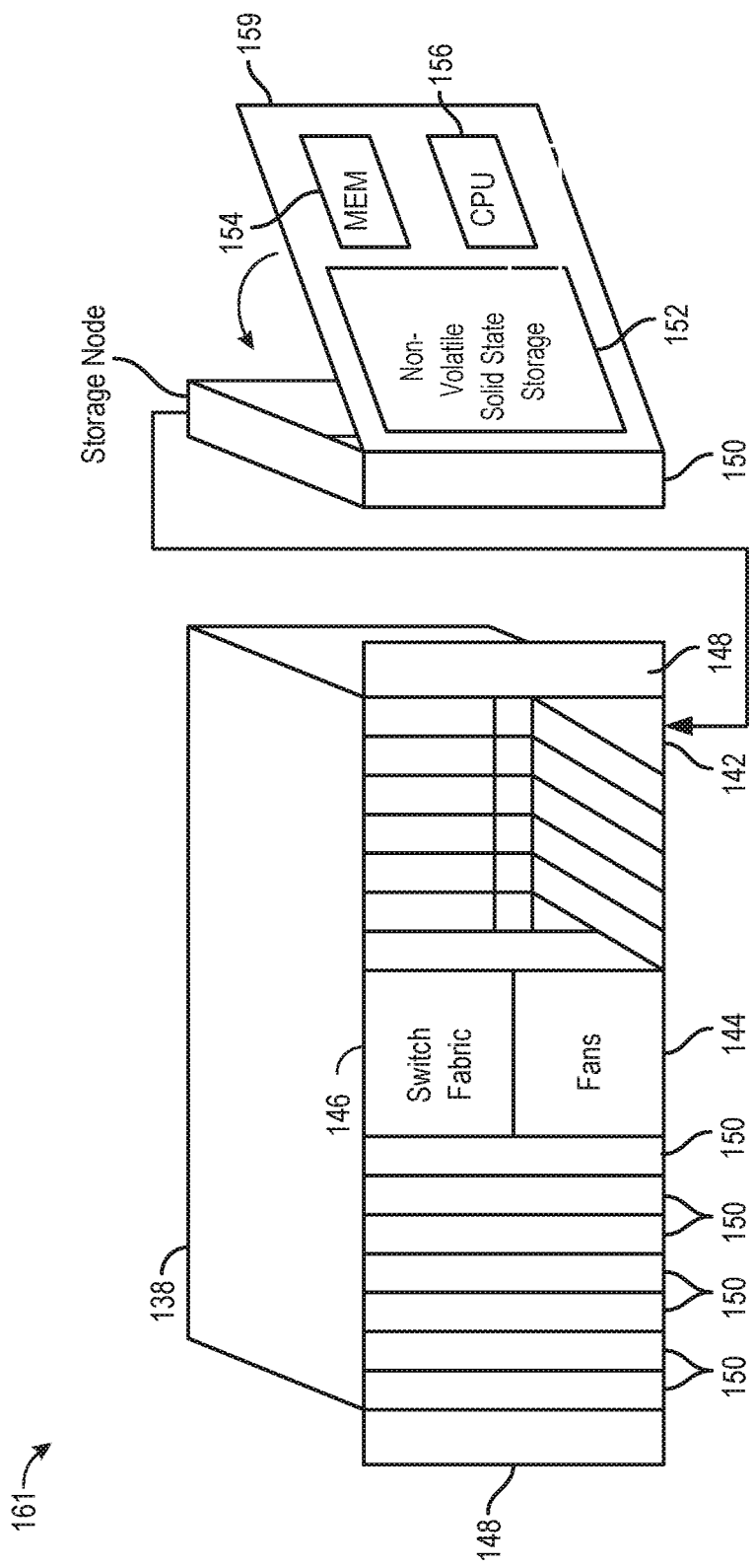
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
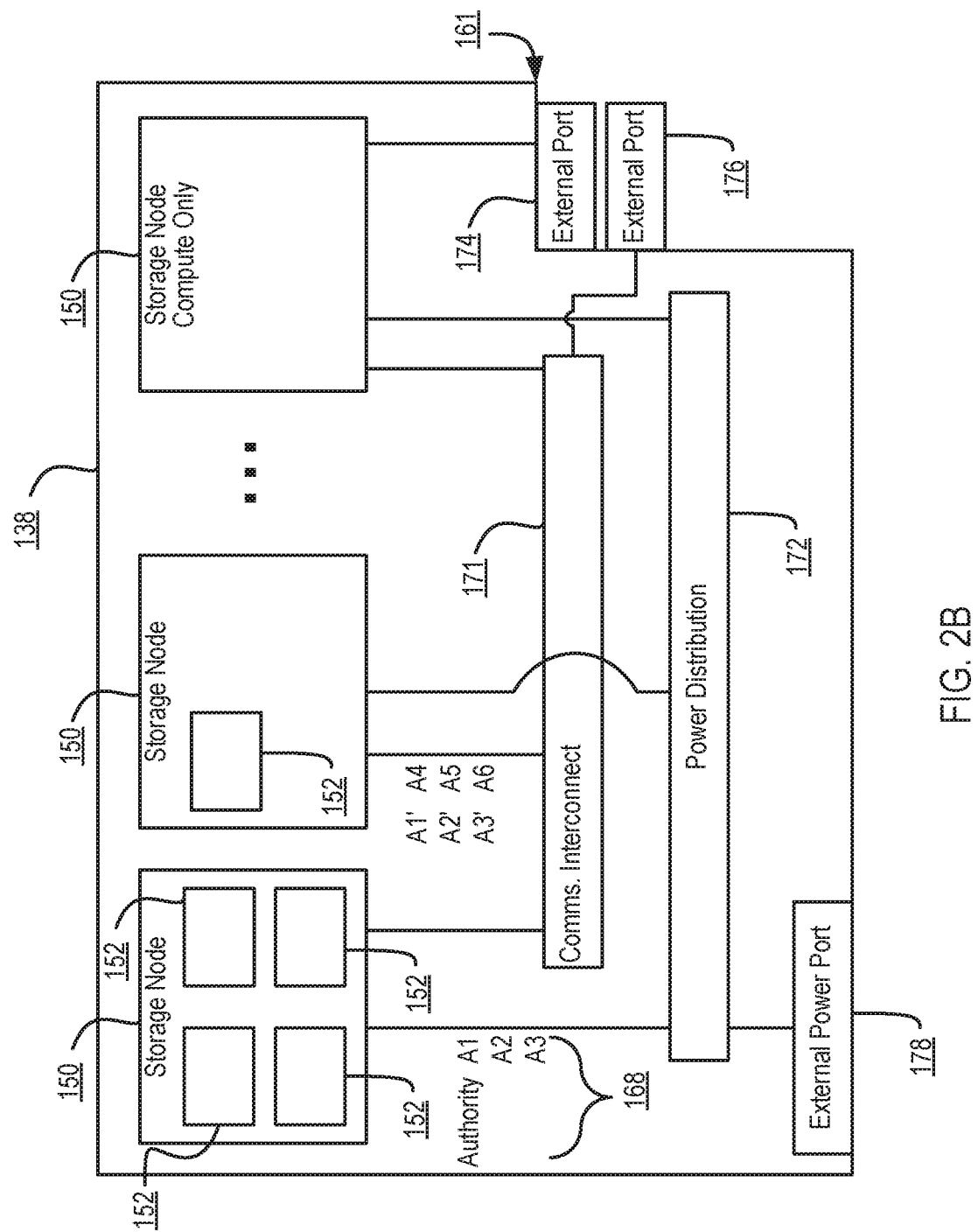
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudorandom assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
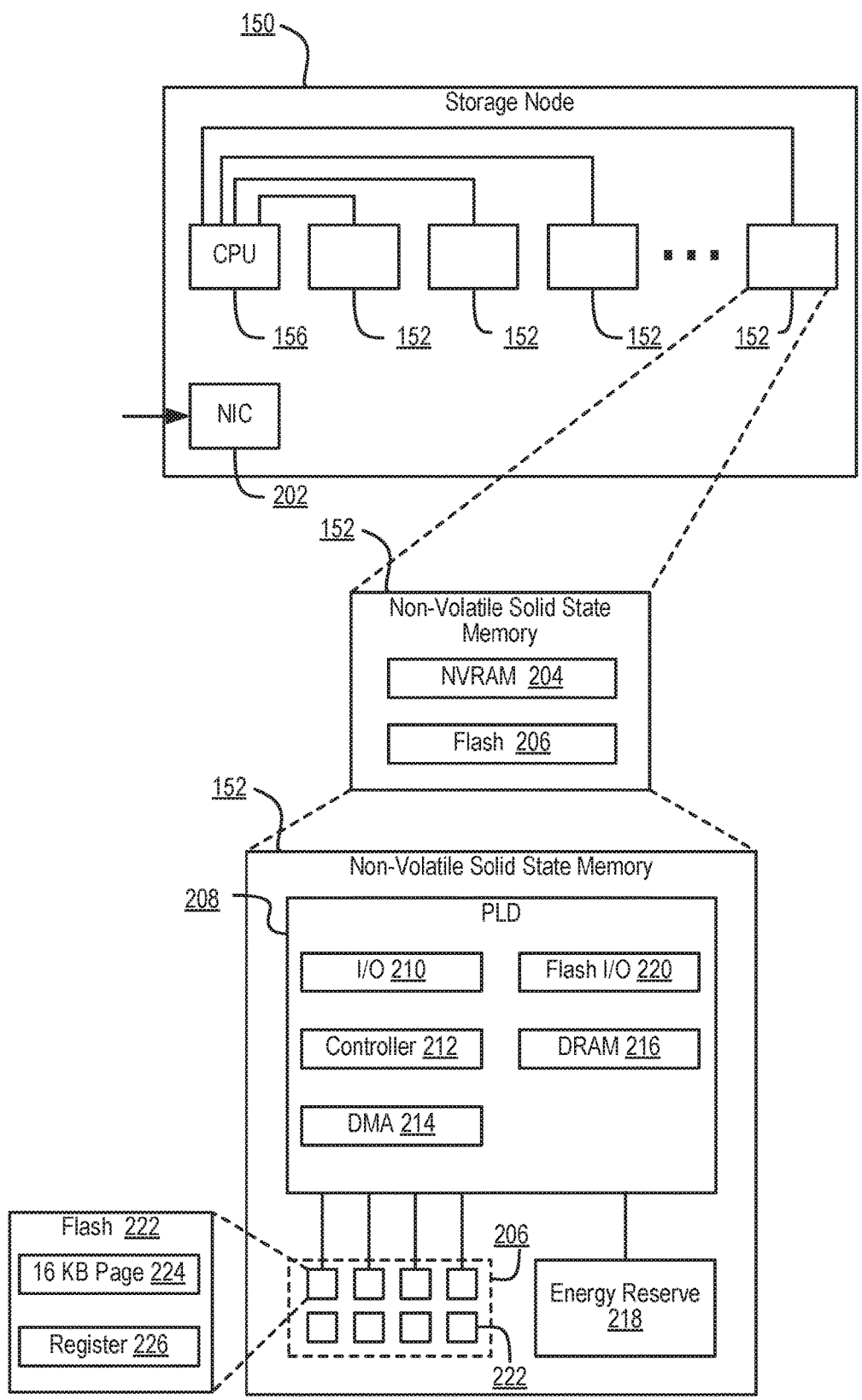
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen KB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
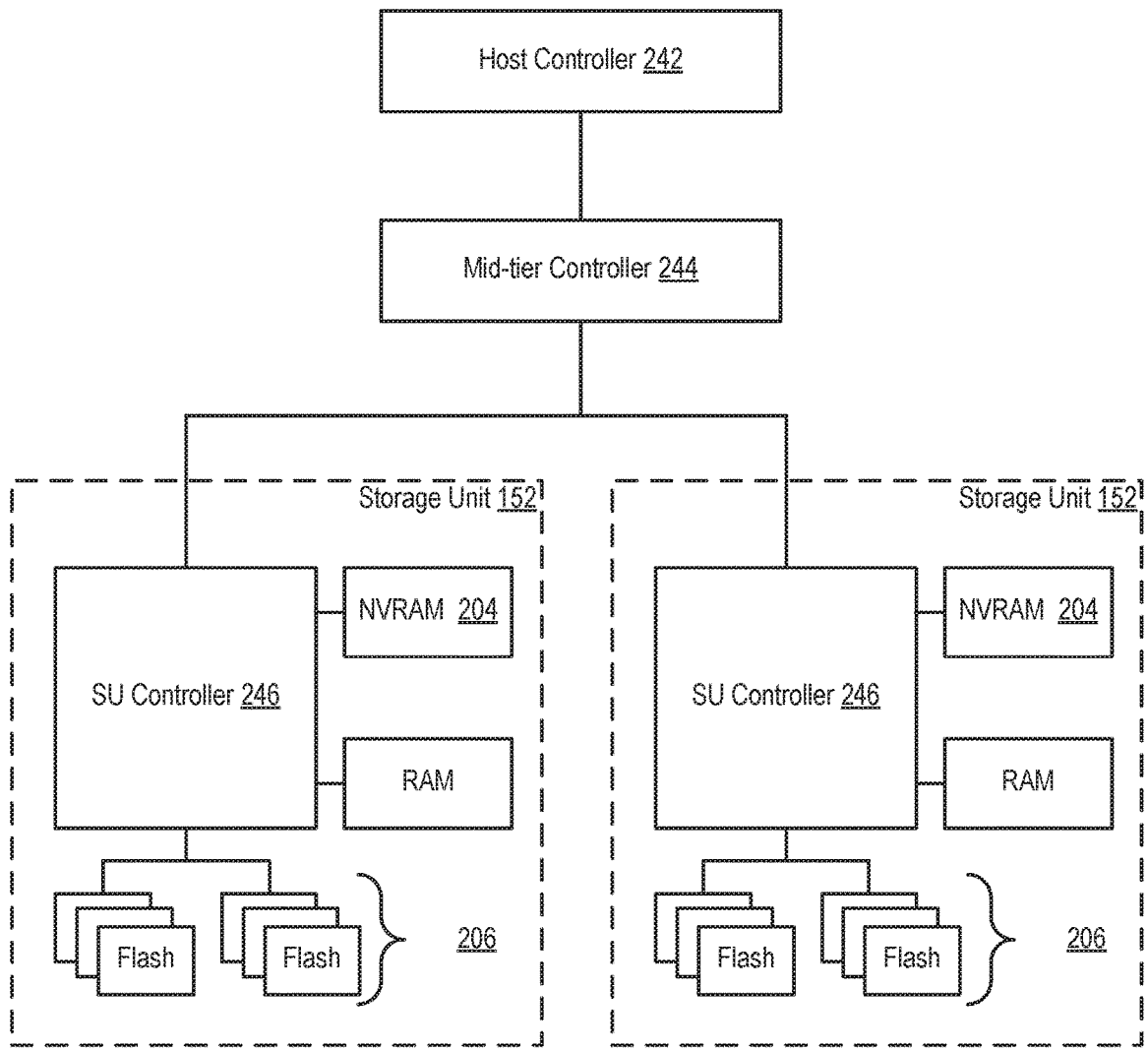
FIG. 2D shows a storage server environment, which uses embodiments of the storage nodes and storage units of some previous FIG.s in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
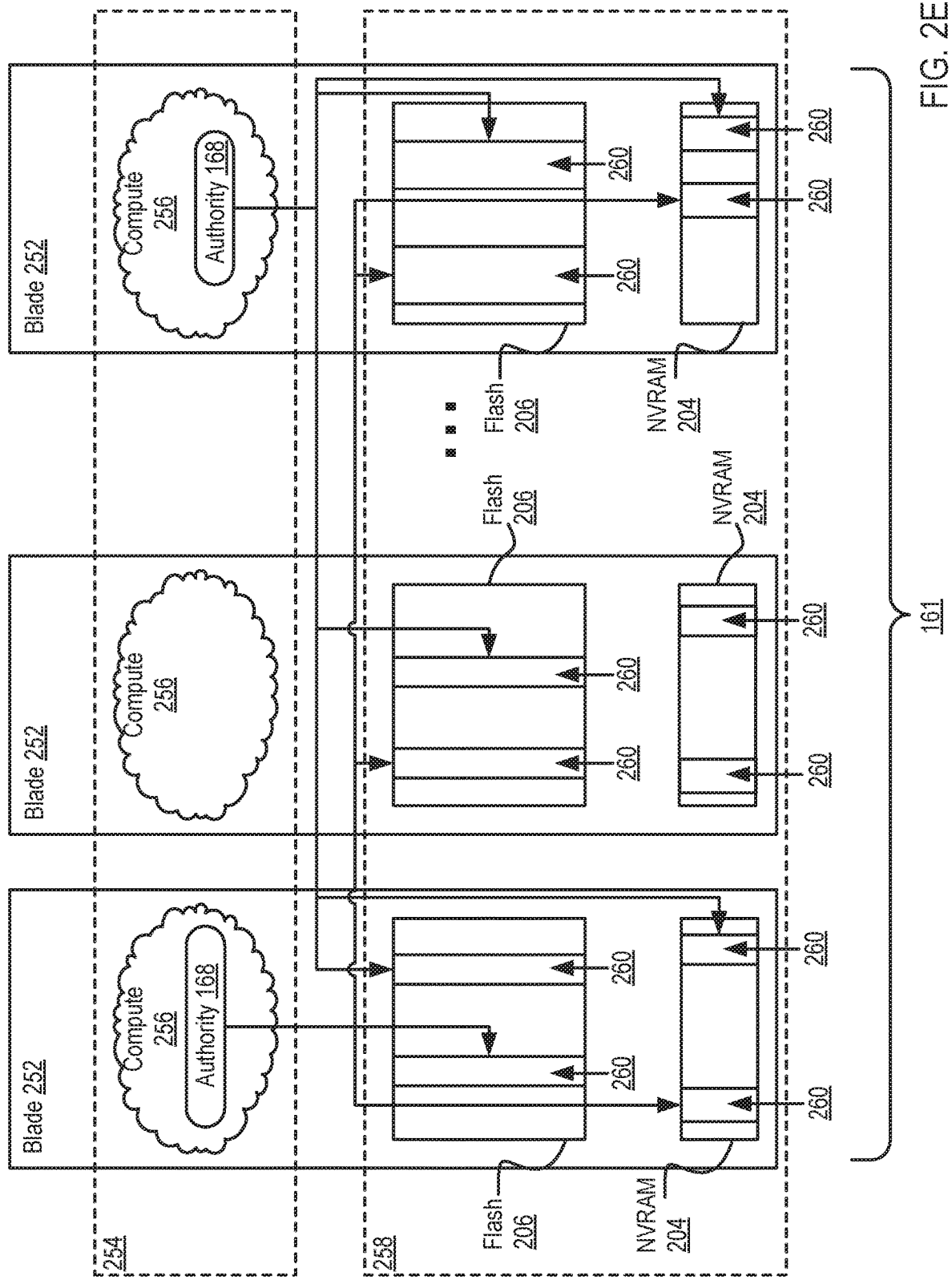
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
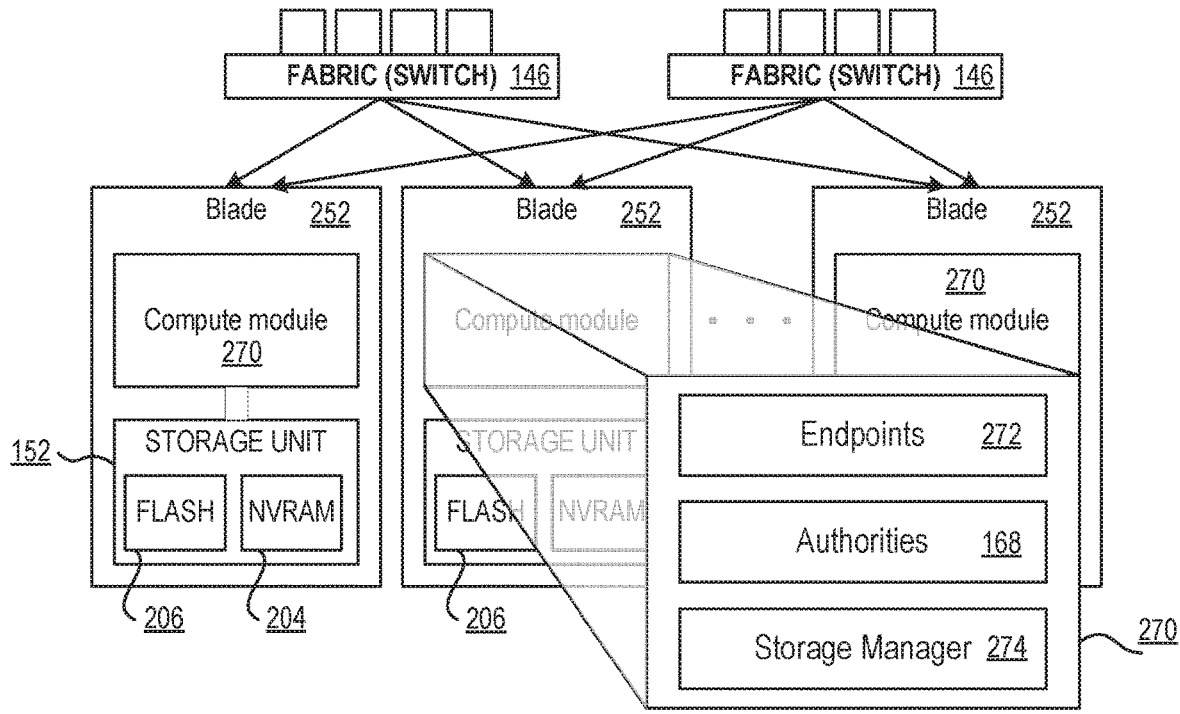
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
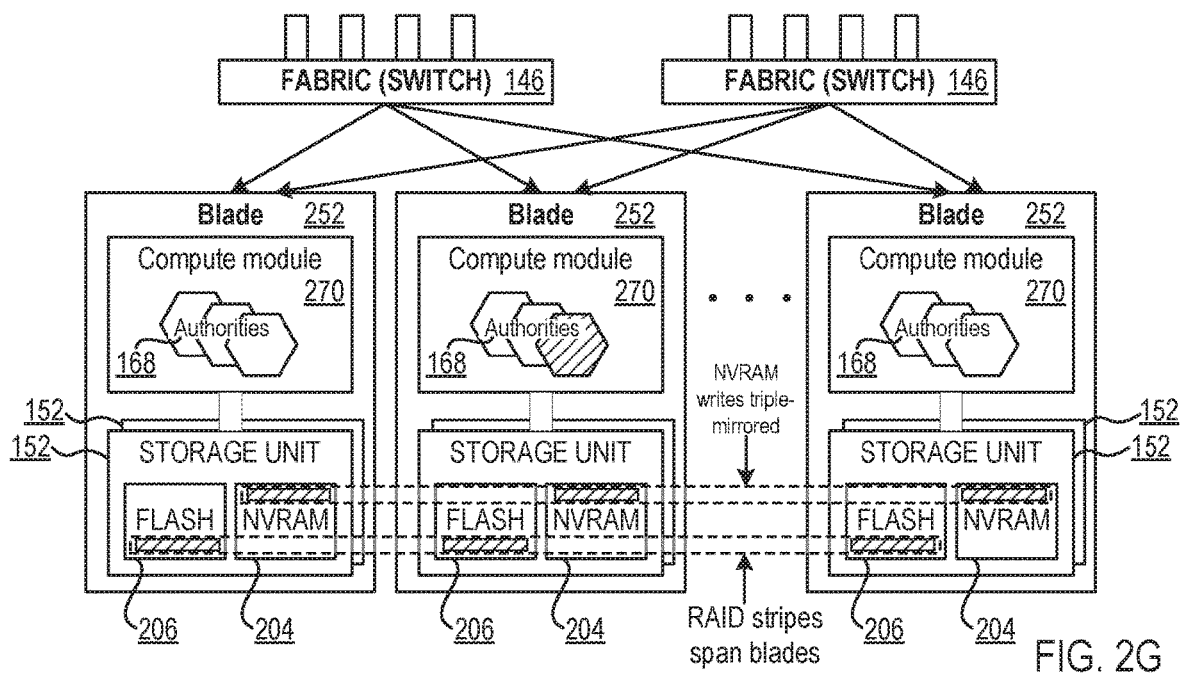
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPV6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
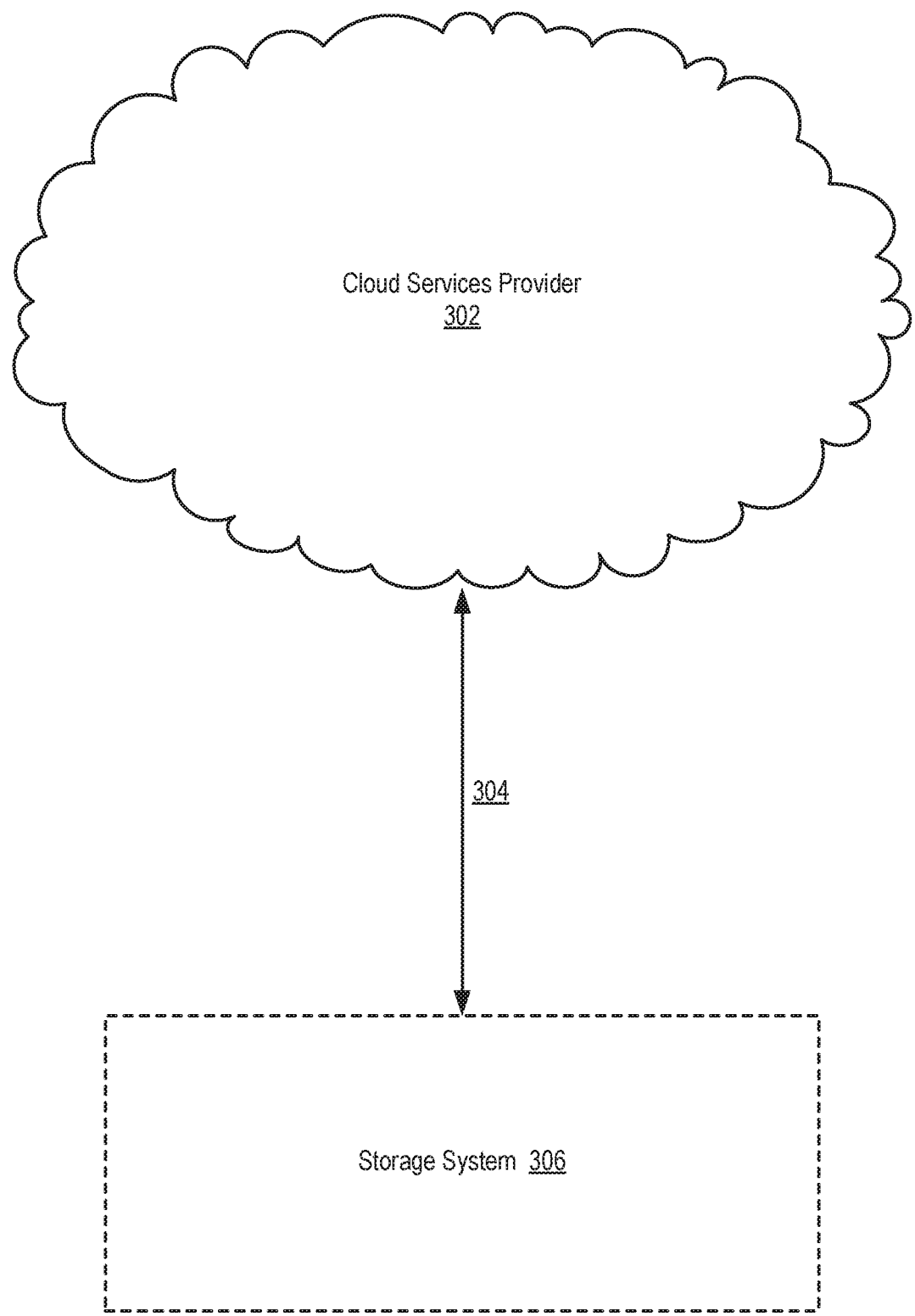
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with frontend controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
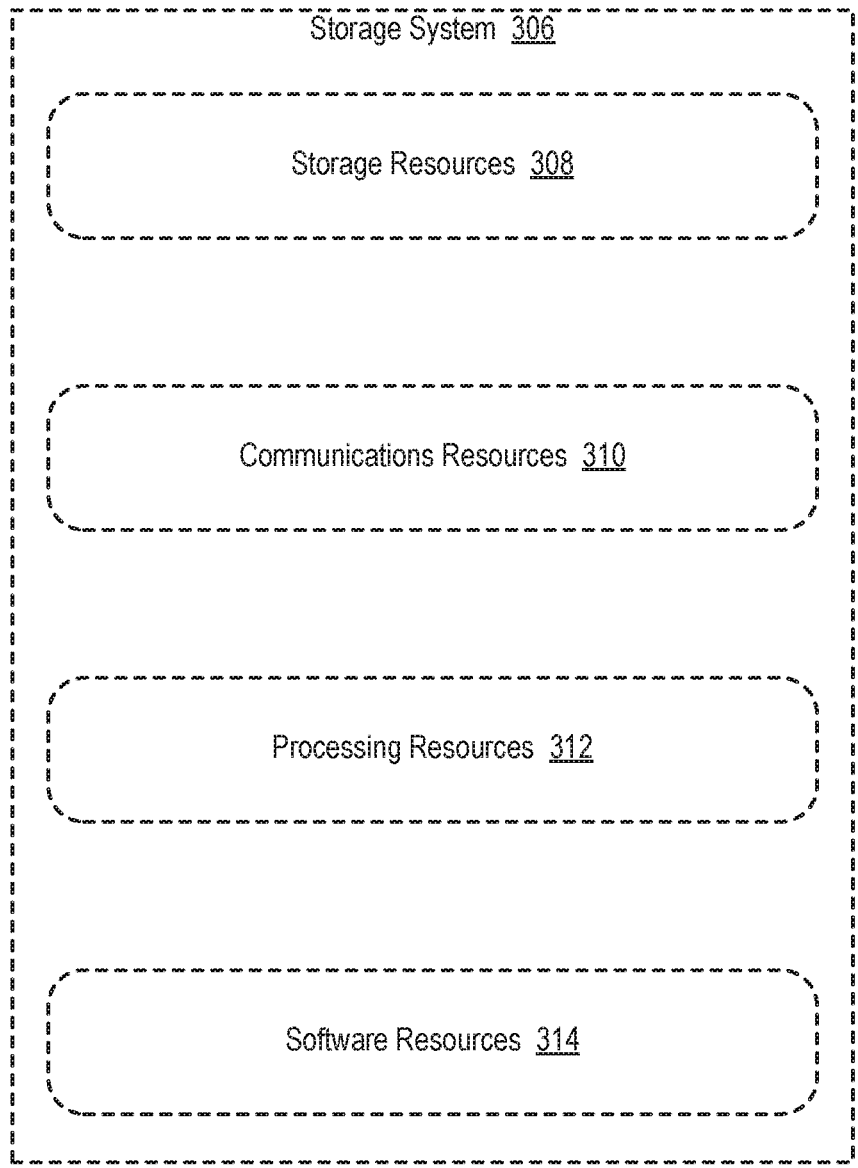
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3A may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
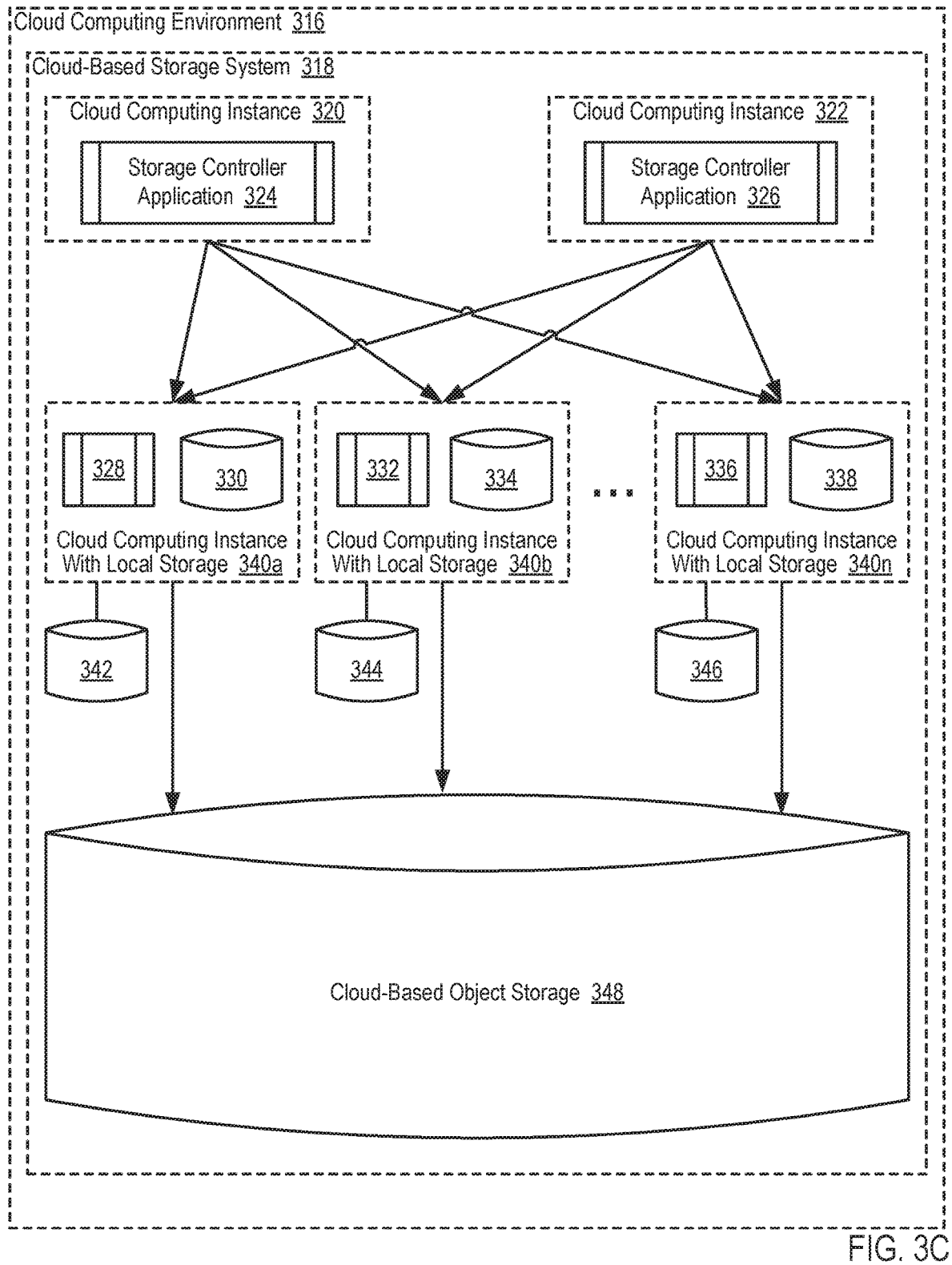
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n depicted in FIG. 3C may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340a, a second EBS volume may be coupled to a second cloud computing instance 340b, and a third EBS volume may be coupled to a third cloud computing instance 340n. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block-storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM.

In the example depicted in FIG. 3C, the cloud computing instances 340a, 340b, 340n with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

Readers will appreciate that when a request to write data is received by a particular cloud computing instance 340a, 340b, 340n with local storage 330, 334, 338, the software daemon 328, 332, 336 or some other module of computer program instructions that is executing on the particular cloud computing instance 340a, 340b, 340n may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340a, 340b, 340n may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3') storage that is accessible by the particular cloud computing instance 340a, 340b, 340n. In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. In order to address this, the software daemon 328, 332, 336 or some other module of computer program instructions that is executing on the particular cloud computing instance 340a, 340b, 340n may be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block-storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340a, 340b, 340n is relatively straightforward as 5 blocks that are 1 MB in size are written to the local storage 330, 334, 338 resources and the block-storage 342, 344, 346 resources that are utilized by the cloud computing instances 340a, 340b, 340n. In such an example, the software daemon 328, 332, 336 or some other module of computer program instructions that is executing on the particular cloud computing instance 340a, 340b, 340n may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage 348 may be incorporated into the cloud-based storage system 318 to increase the durability of the cloud-based storage system 318. Continuing with the example described above where the cloud computing instances 340a, 340b, 340n are EC2 instances, readers will understand that EC2 instances are only guaranteed to have a monthly uptime of 99.9% and data stored in the local instance store only persists during the lifetime of the EC2 instance. As such, relying on the cloud computing instances 340a, 340b, 340n with local storage 330, 334, 338 as the only source of persistent data storage in the cloud-based storage system 318 may result in a relatively unreliable storage system. Likewise, EBS volumes are designed for 99.999% availability. As such, even relying on EBS as the persistent data store in the cloud-based storage system 318 may result in a storage system that is not sufficiently durable. Amazon S3, however, is designed to provide 99.999999999% durability, meaning that a cloud-based storage system 318 that can incorporate S3 into its pool of storage is substantially more durable than various other options.

Readers will appreciate that while a cloud-based storage system 318 that can incorporate S3 into its pool of storage is substantially more durable than various other options, utilizing S3 as the primary pool of storage may result in storage system that has relatively slow response times and relatively long I/O latencies. As such, the cloud-based storage system 318 depicted in FIG. 3C not only stores data in S3 but the cloud-based storage system 318 also stores data in local storage 330, 334, 338 resources and block-storage 342, 344, 346 resources that are utilized by the cloud computing instances 340a, 340b, 340n, such that read operations can be serviced from local storage 330, 334, 338 resources and the block-storage 342, 344, 346 resources that are utilized by the cloud computing instances 340a, 340b, 340n, thereby reducing read latency when users of the cloud-based storage system 318 attempt to read data from the cloud-based storage system 318.

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340a, 340b, 340n. In such embodiments, the local storage 330, 334, 338 resources and block-storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340a, 340b, 340n.

As described above, when the cloud computing instances 340a, 340b, 340n with local storage 330, 334, 338 are embodied as EC2 instances, the cloud computing instances 340a, 340b, 340n with local storage 330, 334, 338 are only guaranteed to have a monthly uptime of 99.9% and data stored in the local instance store only persists during the lifetime of each cloud computing instance 340a, 340b, 340n with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340a, 340b, 340n with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 318. The number of new cloud computing instances that are created may substantially exceed the number of cloud computing instances that are needed to locally store all of the data stored by the cloud-based storage system 318 in order to more rapidly pull data from the cloud-based object storage 348 and into the new cloud computing instances, as each new cloud computing instance can (in parallel) retrieve some portion of the data stored by the cloud-based storage system 318. In such embodiments, once the data stored by the cloud-based storage system 318 has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system 318 have written to the cloud-based storage system 318. In such an example, assume that all 1,000 cloud computing instances fail. In such an example, the monitoring module may cause 100,000 cloud computing instances to be created, where each cloud computing instance is responsible for retrieving, from the cloud-based object storage 348, distinct 1/100,000th chunks of the valid data that users of the cloud-based storage system 318 have written to the cloud-based storage system 318 and locally storing the distinct chunk of the dataset that it retrieved. In such an example, because each of the 100,000 cloud computing instances can retrieve data from the cloud-based object storage 348 in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. Consider an example in which the monitoring module monitors the performance of the could-based storage system 318 via communications with one or more of the cloud computing instances 320, 322 that each are used to support the execution of a storage controller application 324, 326, via monitoring communications between cloud computing instances 320, 322, 340a, 340b, 340n, via monitoring communications between cloud computing instances 320, 322, 340a, 340b, 340n and the cloud-based object storage 348, or in some other way. In such an example, assume that the monitoring module determines that the cloud computing instances 320, 322 that are used to support the execution of a storage controller application 324, 326 are undersized and not sufficiently servicing the I/O requests that are issued by users of the cloud-based storage system 318. In such an example, the monitoring module may create a new, more powerful cloud computing instance (e.g., a cloud computing instance of a type that includes more processing power, more memory, etc . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system 318, an example in which the monitoring module determines that the utilization of the local storage that is collectively provided by the cloud computing instances 340a, 340b, 340n has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances 340a, 340b, 340n, such that data stored in an already existing cloud computing instance 340a, 340b, 340n can be migrated to the one or more new cloud computing instances and the already existing cloud computing instance 340a, 340b, 340n can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system 318 may be sized up and down automatically by a monitoring module applying a predetermined set of rules that may be relatively simple of relatively complicated. In fact, the monitoring module may not only take into account the current state of the cloud-based storage system 318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 318 may be based on current performance metrics, predicted workloads, and many other factors, including combinations thereof.

Readers will further appreciate that because the cloud-based storage system 318 may be dynamically scaled, the cloud-based storage system 318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 318 described here can always 'add' additional storage (e.g., by adding more cloud computing instances with local storage). Because the cloud-based storage system 318 described here can always 'add' additional storage, the cloud-based storage system 318 can make more intelligent decisions regarding when to perform garbage collection. For example, the cloud-based storage system 318 may implement a policy that garbage collection only be performed when the number of IOPS being serviced by the cloud-based storage system 318 falls below a certain level. In some embodiments, other system-level functions (e.g., deduplication, compression) may also be turned off and on in response to system load, given that the size of the cloud-based storage system 318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may be also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available-including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing-so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICS.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

Figure 3D:
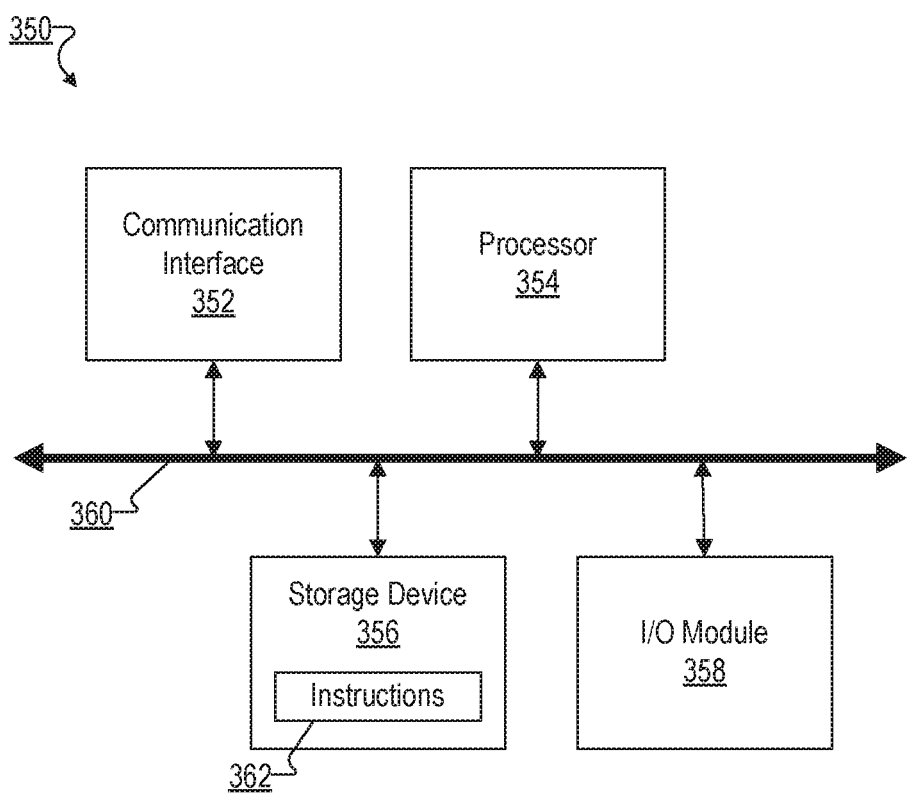
FIG. 3D illustrates an example of a computing device that may be specifically configured to perform one or more of the processes described herein in accordance with some embodiments of the present disclosure.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Advantages and features of the present disclosure can be further described by the following statements:

1. A data storage system comprising: a memory storing instructions; and a processor communicatively coupled to the memory and configured to execute the instructions to: establish a path set that represents a collection of storage layer entities associated with service layer entities of a directory hierarchy of a file system; and coordinate, based on the path set and on operations applied to one or more of the service layer entities of the directory hierarchy of the file system, implementation of the operations on the storage layer entities.

2. The data storage system of statement 1, wherein the service layer entities comprise files and directories within the directory hierarchy of the file system; and the storage layer entities comprise block objects implementing the files and directories.

3. The data storage system of any of the preceding statements, wherein the operations comprise a snapshot of a directory associated with the directory hierarchy of the file system; and the coordinating implementation of the operations on the storage layer entities comprises implementing the snapshot on a storage implementation entity of the storage layer entities in response to a request to modify the storage layer entity.

4. The data storage system of any of the preceding statements, wherein the snapshot is applied to the directory at a first time; and the implementation of the snapshot on the storage layer entity is delayed until a modification of the storage layer entity is requested at a second time subsequent to the first time.

5. The data storage system of any of the preceding statements, wherein the request to modify the storage layer entity comprises a request to delete the storage layer entity or a request to write to the data or the metadata of the storage layer entity.

6. The data storage system of any of the preceding statements, wherein the operations further comprise a snapshot of a subdirectory of the directory associated with the directory hierarchy of the file system; and the coordinating implementation of the operations on the storage layer entities comprises implementing the snapshot of the subdirectory on the storage layer entity in response to the request to modify the storage layer entity.

7. The data storage system of any of the preceding statements, wherein the processor is configured to execute the instructions to establish an additional path set that represents an additional collection of storage layer entities associated with service layer entities of the directory hierarchy of the file system; the path set corresponds to a first operation of the operations, the first operation applied, at a first time, to the directory hierarchy of the file system; and the additional path set corresponds to a second operation of the operations, the second operation applied, at a second time subsequent to the first time, to the directory hierarchy of the file system.

8. The data storage system of any of the preceding statements, wherein the path set represents the collection of storage layer entities that are associated with service layer entities of the directory hierarchy of the file system at the first time; and the additional path set represents the additional collection of storage layer entities that are associated with service layer entities of the directory hierarchy of the file system at the second time.

9. The data storage system of any of the preceding statements, wherein the additional collection of storage layer entities that are associated with service layer entities of the directory hierarchy of the file system at the second time is different from the collection of storage layer entities that are associated with service layer entities of the directory hierarchy of the file system at the first time.

10. The data storage system of any of the preceding statements, wherein the directory hierarchy of the file system is associated with a managed directory designated to be managed with path sets.

11. The data storage system of any of the preceding statements, wherein the service layer entities are managed by a service layer of the data storage system, the service layer configured to provide a data storage service; the storage layer entities are managed by a storage layer of the data storage system; and certain aspects of the data storage service are separated from the service layer for implementation by the storage layer.

12. The data storage system of any of the preceding statements, wherein the service layer maintains configuration information representing the directory hierarchy of the file system; and the storage layer entities of the storage layer do not maintain configuration information representing the directory hierarchy of the file system.

13. The data storage system of any of the preceding statements, wherein the operations comprise at least one of a snapshot operation, a cloning operation, a replication operation, a continuous data protection operation, a quota operation, a space management operation, or a space accounting operation.

14. A data storage system comprising: a memory storing instructions; and a processor communicatively coupled to the memory and configured to execute the instructions to: establish that an operation applied to a directory hierarchy of a file system at a first time is to be selectively implemented later in time; detect a request to modify a storage layer entity at a second time that is after the first time; and implement, in response to the request and based on a path set indicating that the storage layer entity is associated with the directory hierarchy of the file system at the first time, the operation on the storage layer entity before modifying the storage layer entity based on the request.

15. The data storage system of any of the preceding statements, wherein the operation comprises a snapshot of the directory hierarchy.

16. The data storage system of any of the preceding statements, wherein the storage layer entity comprises a block object that implements a file or directory of the directory hierarchy of the file system.

17. The data storage system of any of the preceding statements, wherein the path set indicates any managed directory of the file system having a directory tree that includes the file or directory implemented by the block object.

18. A method comprising: receiving a request to modify a storage layer entity that implements a file service layer entity of a file system; determining, in response to the request and based on a path set indicating a relationship between the storage layer entity and a directory of the file system, that there is a pending operation on the directory that is yet to be applied to the storage layer entity; and applying, based on the determining, the pending action to the storage layer entity before modifying the storage layer entity based on the request.

19. The method of any of the preceding statements, wherein the pending action comprises a snapshot of the directory.

20. The method of any of the preceding statements, wherein the storage layer entity comprises a block object that implements a file or directory of a directory hierarchy of the directory of the file system.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

In accordance with certain embodiments of the present disclosure, a storage system may provide unified data storage on block containers and, using the unified storage on block containers, may provide one or more data storage services such as block, file, object, and/or database services. To this end, the storage system may leverage block containers and one or more resources associated with block containers such that a data storage service provided by the storage system benefits from and/or has access to block containers and resources associated with block containers. In certain examples, this may allow block containers that are optimized for implementation using all-flash data storage to be used to provide one or more data storage services that are similarly optimized for implementation using all-flash data storage. The storage system may provide and/or facilitate efficient operations on block containers and container data, such as efficient writing, reading, extending, thin-provisioning, deleting, range-copying, mapping, unmapping, snapshotting, cloning, replicating, compressing, deduplicating, garbage collecting, etc.

Figure 4A:
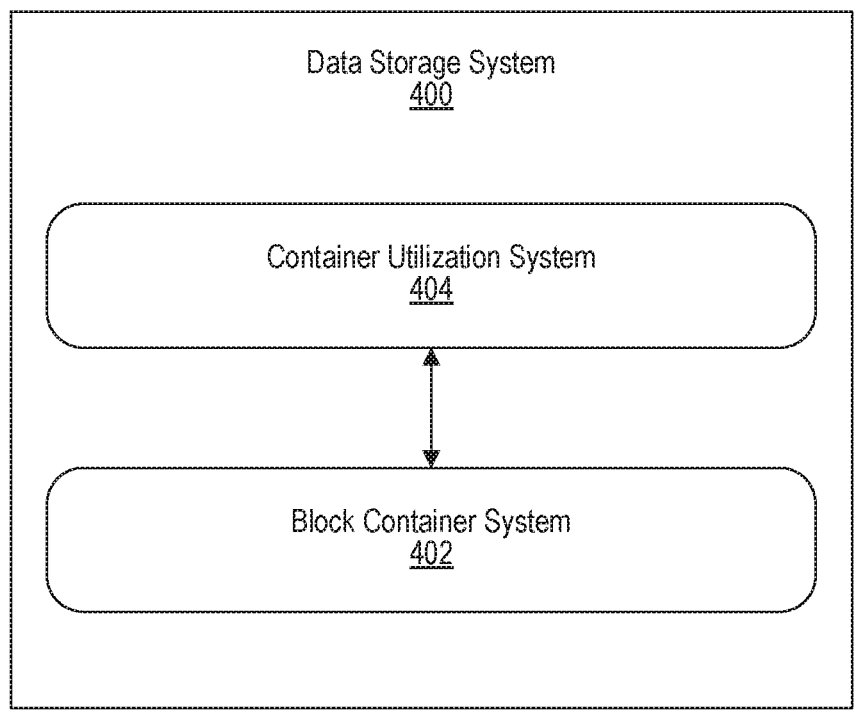
FIGS. 4A-4B illustrate an example of a data storage system that includes a block container system and a container utilization system in accordance with some embodiments of the present disclosure.
Figure 4B:
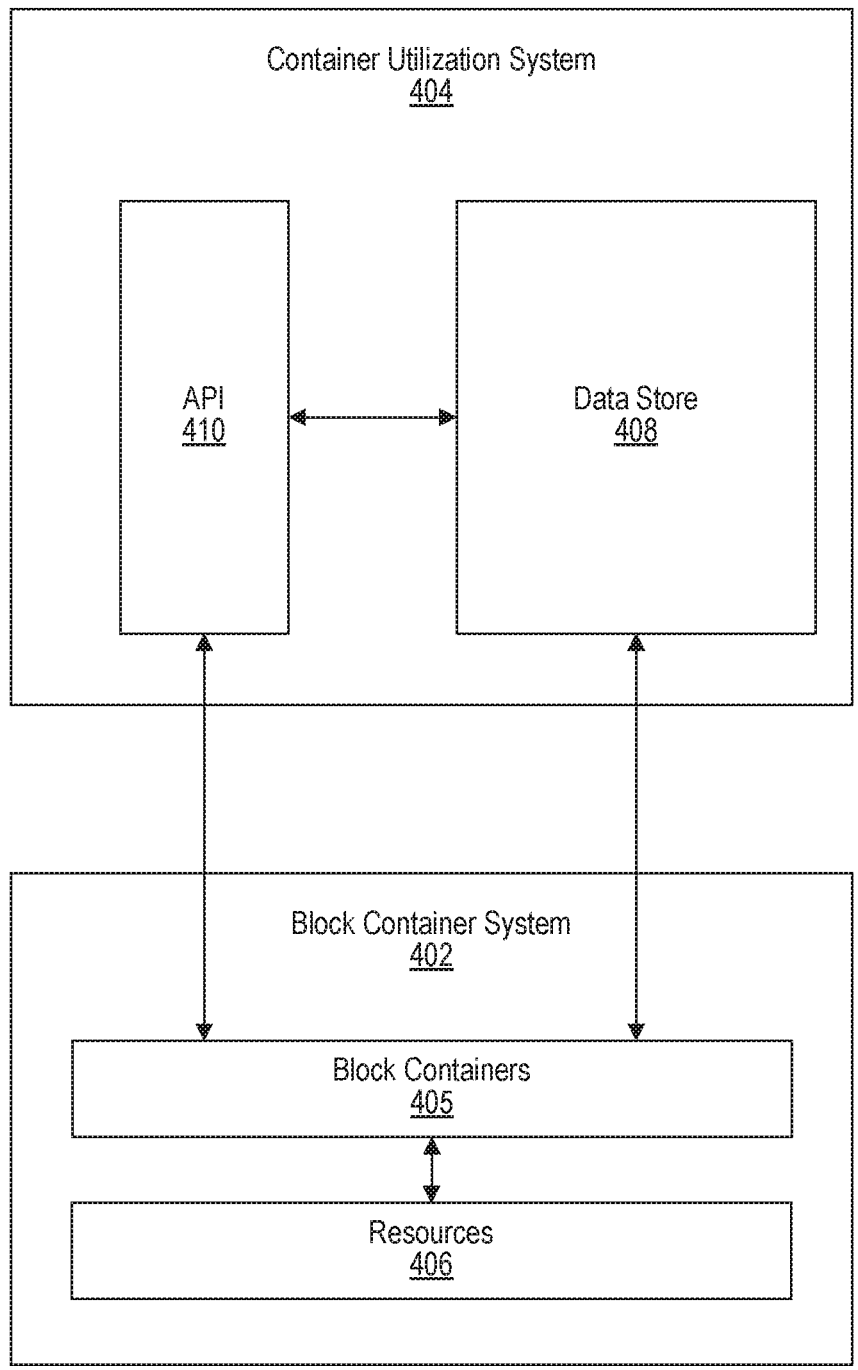

FIGS. 4A-4B illustrate an example of a data storage system 400 that includes a block container system 402 and a container utilization system 404 communicatively coupled to one another. Block container system 402 and container utilization system 404 may be communicatively coupled using any suitable data communication technologies.

Block container system 402 may provide block containers 405 and resources 406 associated with block containers 405. Block containers 405 may represent a linear address space of blocks where block container system 402 may quickly and dynamically create and delete block containers. Block containers 405 may be thin provisioned with a block range deallocate capability. The block address space may be any suitable size, including very large (e.g., a 64-bit address space of bytes or blocks) in some examples. Implementations of block containers 405 may support operations and/or sharing or stored content within and between block containers 405, such as operations or sharing of stored content across block containers of different types (e.g., across block containers of different forms used for different types of storage systems). Examples of such operations or sharing of stored content include, without limitation, snapshots, clones, checkpoints, replication, deduplication, compression, encryption, and virtual copy by reference operations for entire block containers (e.g., cloning by reference the content of one block container to another) as well as for ranges of blocks within and between block containers. Block containers 405 may be tagged, grouped, and/or named to allow operations or mechanisms such as snapshots, clones, checkpoints, and replication to operate consistently and atomically on various types of sets of block containers 405 to form or replace matching sets of block containers 405. Such features may facilitate grouping of individual block containers 405 or sets of block containers 405 into groups.

An example of such a group may be referred to as a "pod." A pod may represent a dataset along with one or more storage systems that store the dataset. A pod may have a name and an identifier. Storage systems may be added to and removed from a pod. When a storage system is added to a pod, the pod's dataset may be copied to that storage system and then kept up to data as the dataset is modified. When a storage system is removed from a pod, the pod's dataset is no longer kept up to date on the storage system. Any storage system that is active for a pod can receive and process requests to modify or read the pod. A pod may also be a unit of administration that represents a collection of block containers 405, volumes, file systems, object/analytic stores, snapshots, and other administrative entities where making administrative changes on any one storage system is automatically reflected to all active storage systems associated with the pod. In the context of storage systems described herein, a pod may operate as a namespace for some set of objects (for example, block containers or snapshots or clones of block containers) that can be operated on as a set, such that additions or removals of a set of objects (such as block containers) from the pod causes future operations to operate on the adjusted collection of these objects. If a pod is replicated, such as through symmetric synchronous replication, between storage systems, then each storage system which is operating normally against the pod will store the same collection of these objects with the same names and other identify or tag metadata.

In certain examples, implementations of block containers 405 may optimize data storage system 400 for flash data storage (e.g., all-flash data storage). For example, block container system 402 may be configured to generally gather a collection of updates which will be organized into segments (e.g., medium-sized segments) that are written and managed in such a way that the content and the capacity held by the stored segments are changed or reused through a garbage collection process. Segments may be any suitable size, such as on the order of megabytes, and may be sized optimally around flash erase blocks or sized optimally for erasure coded segments written as shards across several flash-based storage devices which are organized as erase blocks or to be a reasonably optimal size for desired throughput in writing and reading whole data structures in a data store operating as a bulk backend for data storage system 400 and/or a data storage service provided by data storage system 400 (e.g., writing and reading whole objects in an object store operating as a build backend for data storage system 400). Such segments can work with flash-based data storage that exposes erase blocks directly or through some scheme such as zoned drives. Such a scheme can also be used to organize data to be written (and eventually garbage collected) to non-flash-based zoned drives or to medium-sized objects in a typical type of object store that best supports objects which are written and eventually deleted without ever having been updated in place.

In certain embodiments, block container system 402 may include and/or may be specifically designed to use all-flash data storage for block-based data storage. To this end, block container system 402 may be a flash block-based storage system that is optimized for flash block-based storage and that preserves data integrity, provides consistent low latency and high performance, and maximizes physical media endurance.

Resources 406 associated with block containers 405 may include any components of block container system 402 configured to create, delete, modify, thin provision, allocate, deallocate, append, or otherwise operate on block containers 405 and/or content of block containers 405. Resources 406 may be implemented in any suitable way, including as hardware and/or software components (e.g., as computer-implemented instructions executable by a processor to perform operations on block containers 405). Resources 406 may include any of the storage system resources described herein, including any of storage resources 308, communications resources 310, processing resources 312, software resources 314, and other resources described above. Examples of resources 406 of block container system 402 include, without limitation, data reduction resources (e.g., pattern removal, deduplication, and compression resources), metadata resources (e.g., metadata such as one or more maps that track relationships between logical block addresses and physical media addresses), data structure resources (e.g., graphs of structures called logical extents), data replication resources (e.g., snapshot, clone, extended copy, asynchronous replication, synchronous replication resources), storage reclamation resources (e.g., garbage collection resources), lookaside data structure resources for tracking operations on data for use in implementing or completing implementation of changes in a time-shifted manner (e.g., by a background process at a suitable time), foreground or inline data processing resources (e.g., foreground or inline data reduction as part of a data write process), and background processing resources (e.g., background data reduction, storage reclamation, etc. applied to logically stored data that remains unaltered for a threshold length of time). Examples of resources 406 of block container system 402 may include components and/or processes configured to perform operations such as writing, reading, extending, thin-provisioning, deleting, range-copying, mapping, unmapping, snapshotting, cloning, replicating, compressing, deduplicating, and garbage collecting block containers 405 and/or content of block containers 405.

Block containers 405 may be configured to store and address data in blocks of any suitable size and configuration. Accordingly, block containers system 402 may utilize block containers 405 for multiple types of uses. In certain implementations, block containers 405 may be used to represent volumes, which may function to a client host as individual data storage drives accessed through SCSI, NVMe, or some other block protocol (e.g., mounted drive volumes accessible by an operating system). In certain implementations, block containers 405 may additionally or alternatively include or represent fixed or variable size blocks of data that each contain a number of sectors of data (e.g., zero or more 512-byte sectors of data).

Block container system 402 may include or implement any of the storage systems or features of the storage systems described above. In certain embodiments, block container system 402 may include a virtually mapped allocate-on-write and/or copy-on-write block-based storage system.

Block containers 405 may be implemented in any way suitable to provide one or more of the features of block container system 402 described herein. Examples of architectures for implementing block containers 405 will now be described. The examples are illustrative and not limiting. Additional or alternative architectures for implementing block containers 405 may be used in other examples.

In certain examples, block containers 405 may be implemented using a linear table of vectors to blocks or content-addressable stores. In certain examples, block containers 405 may be implemented using a two-level vector of block references where blocks themselves are compressed and written into garbage collection segments. In certain implementations, the two-level vector may use copy-on-write of a more granular vector level. In certain examples, block containers 405 may be implemented using hash references (e.g., hash tables) to blocks or content-addressable stores. In certain examples, block containers 405 may be implemented using B-trees or similar data structures that reference blocks or content-addressable stores.

In certain examples, block containers 405 may be implemented using graphs of structures called logical extents. A logical extent may include a list of pointers to logical block addresses, to other logical extents, or to a combination of logical block addresses and other logical extents. Logical extents may be linked together to form a data structure such as graph of logical extent nodes that represents relationships between data. Any suitable structure of logical extents may be used, such as an acyclic graph of logical extents. In certain examples, block container system 402 may use a directed acyclic graph ('DAG') or a balanced directed acyclic graph ('B-DAG') of logical extents.

In certain examples, logical extents may be categorized into two types of logical extents: leaf logical extents that reference some amount of stored data in some way (e.g., by including or pointing to logical addresses mapped to physical media locations of data) and composite logical extents that reference other leaf or composite logical extents.

A leaf extent can reference data in a variety of ways. It can point directly to a single range of stored data (e.g., 64 kilobytes of data), or it can be a collection of references to stored data (e.g., a 1 megabyte "range" of content that maps some number of virtual blocks associated with the range to physically stored blocks). In the latter case, these blocks may be referenced using some identity, and some blocks within the range of the extent may not be mapped to anything. Also in the latter case, these block references need not be unique, allowing multiple mappings from virtual blocks within some number of logical extents within and across some number of block containers (e.g., block containers 405) to map to the same physically stored blocks. Instead of stored block references, a logical extent could encode simple patterns. For example, a block that is a string of identical bytes could simply encode that the block is a repeated pattern of identical bytes.

A composite logical extent can be a logical range of content with some virtual size, which comprises a plurality of maps that each map from a subrange of the composite logical extent logical range of content to an underlying leaf or composite logical extent. Transforming a request related to content for a composite logical extent, then, involves taking the content range for the request within the context of the composite logical extent, determining which underlying leaf or composite logical extents that request maps to, and transforming the request to apply to an appropriate range of content within those underlying leaf or composite logical extents.

In certain implementations of block container system 402, block containers can be defined as logical extents. Thus, block containers can be organized using the logical extent model. In certain examples, a graph of logical extents may include a root node associated with a block container in block container system 402. The root node may point to one or more other nodes that point to other nodes and/or logical addresses mapped to physical media locations at which data associated with the block container is stored.

Depending on implementation, leaf or composite logical extents could be referenced from a plurality of other composite logical extents, effectively allowing inexpensive duplication of larger collections of content within and across block containers. Thus, logical extents can be arranged essentially within an acyclic graph of references, each ending in leaf logical extents. This can be used to make copies of block containers, to make snapshots of block containers, or as part of supporting virtual range copies within and between block containers as part of an extended copy operation or similar types of operations.

An implementation may provide each logical extent with an identity which can be used to name it. This simplifies referencing, since the references within composite logical extents become lists comprising logical extent identities and a logical subrange corresponding to each such logical extent identity. Within logical extents, each stored data block reference may also be based on some identity used to name it.

To support these duplicated uses of extents, logical extents may be configured as copy-on-write logical extents. When a data modifying operation affects a copy-on-write leaf or composite logical extent, the logical extent is copied, with the copy being a new reference and possibly having a new identity (depending on implementation). The copy retains all references or identities related to underlying leaf or composite logical extents, but with whatever modifications result from the modifying operation. For example, a write request, a write same request, an extended write read request, an extended write request, or a compare and write request may store new blocks in the storage system (or use deduplication techniques to identify existing stored blocks), resulting in modifying the corresponding leaf logical extents to reference or store identities to a new set of blocks, possibly replacing references and stored identities for a previous set of blocks. Alternately, an un-map request may modify a leaf logical extent to remove one or more block references. In both types of cases, a leaf logical extent is modified. If the leaf logical extent is a copy-on-write logical extent, then a new leaf logical extent will be created that is formed by copying unaffected block references from the old extent and then replacing or removing block references based on the modifying operation.

A composite logical extent that was used to locate the leaf logical extent may then be modified to store the new leaf logical extent reference or identity associated with the copied and modified leaf logical extent as a replacement for the previous leaf logical extent. If that composite logical extent is a copy-on-write logical extent, then a new composite logical extent is created as a new reference or with a new identity, and any unaffected references or identities to its underlying logical extents are copied to that new composite logical extent, with the previous leaf logical extent reference or identity being replaced with the new leaf logical extent reference or identity.

This process continues further backward from referenced extent to referencing composite extent, based on the search path through the acyclic graph used to process the modifying operation, with all copy-on-write logical extents being copied, modified, and replaced.

These copied leaf and composite logical extents can then drop the characteristic of being copy on write, so that further modifications do not result in a copy. For example, the first time some underlying logical extent within a copy-on-write "parent" composite extent is modified, that underlying logical extent may be copied and modified, with the copy having a new identity which is then written into a copied and replaced instance of the parent composite logical extent. But, a second time some other underlying logical extent is copied and modified and with that other underlying logical extent copy's new identity being written to the parent composite logical extent, the parent can then be modified in place with no further copy and replace necessary on behalf of references to the parent composite logical extent.

Modifying operations to new regions of a block container or of a composite logical extent for which there is no current leaf logical extent may create a new leaf logical extent to store the results of those modifications. If that new logical extent is to be referenced from an existing copy-on-write composite logical extent, then that existing copy-on-write composite logical extent will be modified to reference the new logical extent, resulting in another copy, modify, and replace sequence of operations similar to the sequence for modifying an existing leaf logical extent.

If a parent composite logical extent cannot be grown large enough (based on implementation) to cover an address range associated with new leaf logical extents to be created for a new modifying operation, then the parent composite logical extent may be copied into two or more new composite logical extents which are then referenced from a single "grandparent" composite logical extent which yet again is a new reference or a new identity. If that grandparent logical extent is itself found through another composite logical extent that is a copy-on-write logical extent, then that other composite logical extent will be copied and modified and replaced in a similar way as described in previous paragraphs.

This copy-on-write model can be used as part of implementing snapshots, block container copies, and virtual block container address range copies within a storage system implementation based on these directed acyclic graphs of logical extents. To make a snapshot as a read-only copy of an otherwise writable block container, a graph of logical extents associated with the block container is marked copy-on-write and references to the original composite logical extents are retained by the snapshot. Modifying operations to the block container will then make logical extent copies as needed, resulting in the block container storing the results of those modifying operations and the snapshots retaining the original content. Block container copies are similar, except that both the original block container and the copied block container can modify content resulting in their own copied logical extent graphs and subgraphs.

Virtual block container address range copies can operate either by copying block references within and between leaf logical extents (which does not itself involve using copy-on-write techniques unless changes to block references modify copy-on-write leaf logical extents). Alternately, virtual block container address range copies can duplicate references to leaf or composite logical extents. This works well for block container address range copies of larger address ranges. And, this is one way the graphs can become directed acyclic graphs of references rather than merely reference trees. Copy-on-write techniques associated with duplicated logical extent references can be used to ensure that modifying operations to the source or target of a virtual address range copy will result in the creation of new logical extents to store those modifications without affecting the target or the source that share the same logical extent immediately after the block container address range copy operation.

Logical extents, such as described above, are an example of an architecture for implementing block containers 405. Another example includes single-instance stores, where blocks are stored in association with an index derived from a secure hash fingerprint of their content and where a block container would effectively be an array of references that is updated whenever a block is written. A simple two-level logical extent model, where one level represents a vector of references to individual leaf logical extents represents a simpler version of the logical extent model where the leaf logical extents can reference a deduplicated block store or a content addressable block store. Whatever the model, the relationship between data stored into block containers 405 at particular logical block addresses and bulk storage should be dynamic to ensure that new data is written into new blocks that are arranged within medium-sized segments, and organized around garbage collection processes that can move blocks that are still referenced while deleting blocks that are no longer referenced in order to either reclaim space from segments that contain some no longer referenced blocks or, particularly in the case of flash memory, in order to address flash memory durability issues.

Block container system 402 may be configured to present handles to block containers 405. The handles may include any suitable data identifying block containers 405 such as pointers to block containers 405 (e.g., pointers to root nodes of block containers 405). The handles may be used by container utilization system 404 to operate on and/or interact with block containers 405, such as by writing content to and/or reading content from block containers 405.

Container utilization system 404 may be configured to utilize block containers 405 to store and manage content for one or more data storage services provided by a unified data storage system. As an example, for a block storage service, a block volume may be implemented on a single block container 405 (a block container representing a volume). As another example, for a file storage service, individual files, directories, file system data, and/or metadata may be implemented on individual block containers 405. As another example, for an object storage service, individual objects and metadata may be implemented on individual block containers 405. As another example, for a database, block containers 405 may be allocated to store individual redo logs, archive logs, table spaces, blobs (binary large objects), data configuration data, and/or metadata.

To this end, container utilization system 404 may be configured to use block containers 405 of block container system 402, as well as resources 406 of block container system 402 in some examples, to provide one or more data stores for storing and managing content for one or more data storage services. For example, container utilization system 404 may provide a data store 408 that utilizes block containers 405 to represent data stored in data store 408. Accordingly, data store 408 may be referred to as a container-based data store 408 for storing and managing content for a data storage service. Data store 408 may operate as a bulk backend data store for one or more data storage services.

Container utilization system 404 may be configured to facilitate use of block containers 405 to represent data for any suitable number and/or type of data storage services. To this end, container utilization system 404 may provide and maintain any suitable number and types of data stores for storing content for any suitable number and/or type of data storage services. In at least this regard, data storage system 400 may be a unified storage system that supports various types of data storage services and/or data storage protocols. For example, container utilization system 404 may provide one or more data stores 408 for storing content for block, file, object, and/or database storage services.

Block containers 405 of block container system 402 may be adapted and/or used differently by container utilization system 404 for various data storage services. For example, certain block containers 405 may be used to represent content for a first storage service (e.g., a block storage service), certain block containers 405 may be used to represent content for a second storage service different from the first storage service (e.g., a file storage service), etc.

In certain embodiments in which block containers 405 are implemented using graphs of logical extents as described above, container utilization system 404 may be configured to use graphs of logical extents to represent and manage data in data store 408. For example, a data instance for a data storage service may be represented as a block container defined by a graph of logical extents that point to and/or include data for the data instance. Container utilization system 404 may associate the data instance with the block container defined by the graph of logical extents, such as by associating an identifier for the data instance with a root node of the graph of logical extents.

Figure 5:
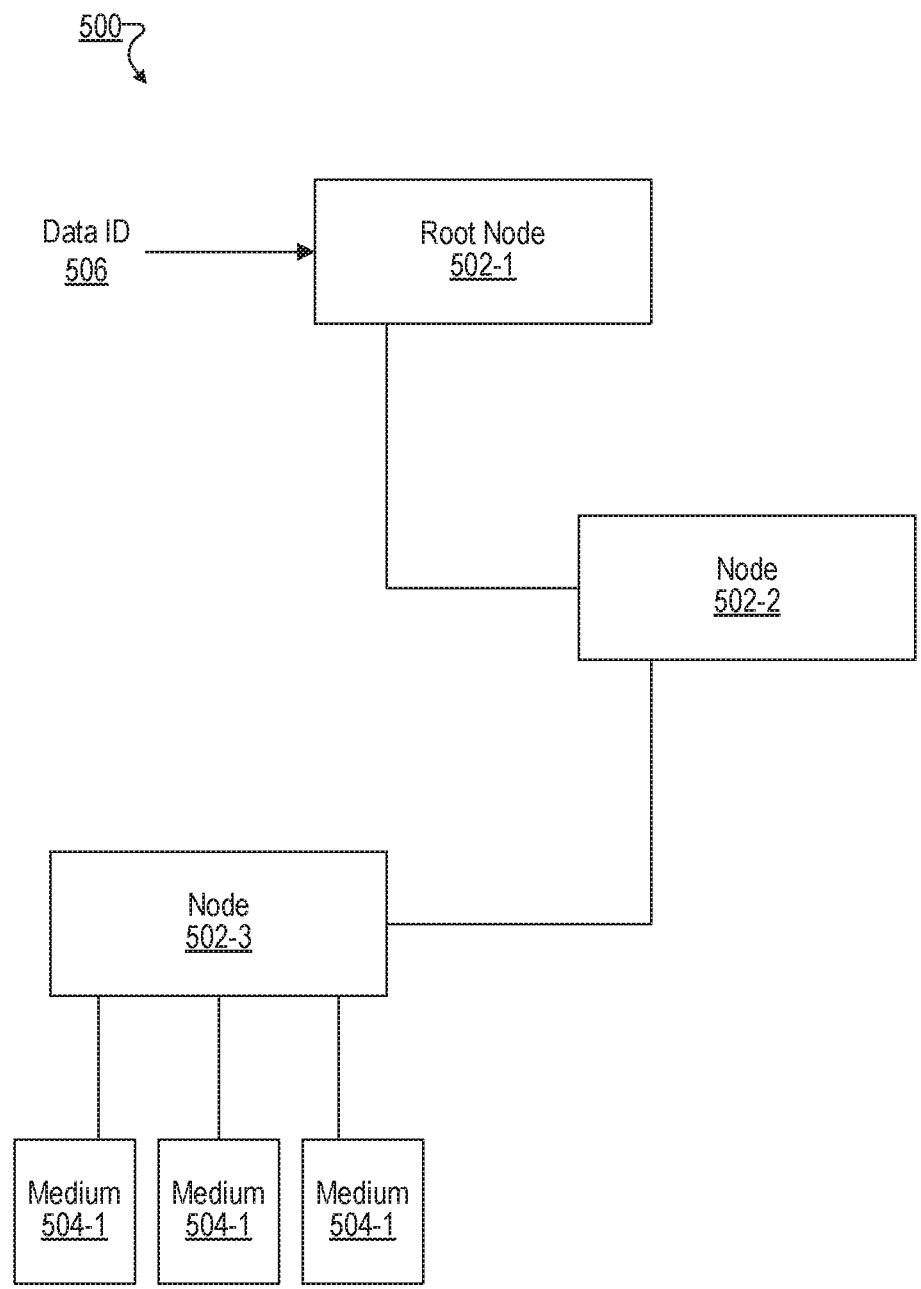
FIG. 5 illustrates an example of a data structure resource used to represent a data instance in accordance with some embodiments.

FIG. 5 illustrates an example of a block container 500 used to represent a data instance in accordance with some embodiments. As shown in FIG. 5, block container 500 may include a graph (e.g., an acyclic graph such as a directed acyclic graph or a balanced directed acyclic graph) of logical extent nodes 502-1 through 502-3 (collectively "logical extent nodes 502," "logical extents 502," or "nodes 502"). In the illustrated graph, node 502-1 is a root node, node 502-2 is a child node of node 502-1, and node 503-3 is a child node of node 502-2.

The graph of logical extents is associated with and represents a data instance. In the illustrated example, a data instance identifier (data ID) 506 is mapped to root node 502-1 to associate a data instance having the data ID 506 to the root node 502-1 and consequently to the graph of logical extents 502. Data ID 506 may be any suitable unique identifier and may be produced in any suitable way. For example, container utilization system 404 may generate or receive data ID 506. Container utilization system 404 may map the data ID 506 to root node 502-1 in any suitable way.

Each of nodes 502 includes a list of one or more pointers to other nodes 502 and/or to logical addresses mapped to physical media locations at which data associated with the data object is stored. For example, root node 502-1 may include a pointer to node 502-2, which may include a pointer to node 502-3. Node 502-3 may include pointers to logical addresses such as logical block addresses that are mapped to locations in physical media at which data for the object is stored. In FIG. 5, mediums 504-1 through 504-3 (collectively "mediums 504") may represent the logical addresses (in a linear address space) and/or locations in physical media at which data for the data instance is stored. Accordingly, nodes 502-1 and 502-2 may be composite logical extents, and node 502-3 may be a leaf logical extent.

While FIG. 5 depicts a data ID 506 for a data instance being mapped to root node 502-1, this is illustrative of certain embodiments. A data instance may be associated with a graph of logical extents in any suitable way, including by directly mapping the data instance to any other suitable internal handle for supporting virtualized thin provisioning of block containers 405 and/or blocks in block container system 402. Moreover, the use of a graph of logical extents to represent a block container 405 is illustrative only. Block containers 405 may be represented using any suitable architecture, including any of the other illustrative architectures described herein.

The use of block containers 405 to represent data instances in data store 408 may provide flexibility for the storage and management of the data instances. For example, for certain data storage services, data instances can be any size and can be resized by reconfiguring the block containers 405 representing the data instances. As another example, additional resources of block container system 402 may be used, such as by applying the resources to the block containers 405 to perform one or more operations on the data instances. To illustrate, data reduction resources, data replication resources (e.g., snapshotting), and/or storage reclamation resources of block container system 402 may be applied to the data instances represented by block containers 405. Such applications may provide instantaneous and/or efficient snapshotting of the data instances in data store 408, reducing of data by using multiple block containers 405 to point to the same stored content that are associated with multiple data instances, and garbage collecting to reclaim storage in data store 408.

Block containers 405 of block container system 402 may be adapted for representing and managing data in data store 408. For example, an architecture used to represent a block container 405 may be adapted to reduce or minimize overhead that is associated with the block container 405. To illustrate, a block container 405 may be associated with a volume in a block storage service such that the block container 405 is tied to an overhead associated with the volume. The block container 405 or another block container 405 may be adapted by freeing it from the volume and/or at least some of the overhead associated with the volume. For example, overhead such as metadata overhead, administrative overhead, visual overhead, representation overhead associated with presented, user managed structures, and/or overhead associated with host exports may be reduced or for some types of overhead eliminated from the block container system 402. For example, block containers 405 may be presented to and/or otherwise used by one or more storage services without being presented to or in any way directly used by users of the storage services and/or without being exported or otherwise exposed externally on an individual basis. Such configurations may allow block containers 405 to have minimal overhead in block container system 402, and in some cases to have none of one or more of the types of overheads mentioned above. For example, a storage service such as a file storage service may present a file system as a whole, as an exported and user administered entity. These features may allow a data instance to be represented with a block container 405 that has substantially less overhead in comparison with, say, a set of block devices which are implemented using similar internal structure as the described block container. Accordingly, for the same finite physical storage resources, container utilization system 404 may store and manage many more data instances represented with block containers 405 compared to the number of volumes that can be represented in block container system 402. In certain examples, for instance, only tens of thousands of volumes may be practically represented using full administrative load volumes implemented in the style of block containers 405 compared to practical support for billions of data instances being represented using adapted, low administrative load block containers 405.

Container utilization system 404 may be configured to perform one or more operations to provide data store 408 and to represent and manage data in data store 408 using block containers 405 and resources 406 of block container system 402. Such operations may include, without limitation, writing data, reading data, creating a data instance, setting a length of a data instance, retrieving information about data, deleting data, snapshotting data, appending data, reducing data, replicating data, and reclaiming storage in data store 408. In certain examples, garbage collection resources and/or other resources of block container system 402 may be scaled to handle large numbers of data instances represented with block containers 405.

In certain examples, block containers 405 can provide identifiers formed of multiple parts that may include, for example, a namespace part and a unique identifier within the context of the namespace, where different parts of the identifiers might be provided by varying combinations of the layer implementing the block containers 405 and the layer requesting that block containers 405 be created. Snapshots, clones, checkpoints, and replicas can form new block container names such that some parts are retained while others are adjusted in a common way, such as by retaining some unique identifier associated with a particular block container while including a common substring representing the snapshot, clone, checkpoint, or replica. So, for example, given a file storage system built from block containers 405 named using a combination of a file system name or identifier and a block container identifier that is unique relative to the file system, when making a clone of the file storage system's files, directories, and other data and metadata, the cloned block containers 405 can retain their file system relative unique identifiers while adjusting the file storage system identifier part to be an identifier for the file storage system clone. Then, file storage system or other storage service logic can be pointed at the cloned block containers 405 based on the name pattern of the file storage system clone while reusing the unique identifier parts of the block container names to match the block containers 405 to the logical components within the file storage system.

Alternately, or additionally, block containers 405 can be grouped in various ways such that block containers 405 have names (including names that are simple, dynamically assigned integers) within some group. In such a case, a file storage system or other storage service may be built to make use of one or more groups, such that making a snapshot or clone of a group results in a new group that retains the block container names but has a different group name or identifier. In this case, storage service logic can be pointed at a group instead of utilizing some other naming pattern of block containers 405.

In certain examples, such groups may be based on pods, or for a pod-based storage system, groups or other types of block container collections can be contained within pods. Pods may provide a convenient scheme for additional forms of snapshots, clones, replication schemes, symmetric synchronous replication, continuous data protection, and more.

Container utilization system 404 may provide an application program interface (API) 410 as shown in FIG. 4B. API 410 may include a set of defined operations that may be performed by container utilization system 404 when the operations are called. The set of operations may include and/or support any of the operations of container utilization system 404 described herein. As shown in FIG. 4B, API 410 may be communicatively coupled to data store 408 and block containers 405. Accordingly, API 410 may perform operations on block containers 405 of block container system 402. In certain examples, API 410 may perform operations on block containers 405 by invoking and applying one or more resources 406 (e.g., defined functions) of block container system 402 to perform operations described herein. API 410 may also perform operations on data store 408 and data stored in data store 408.

API 410 may be exposed to and used by one or more data storage services. In such a configuration, the data storage services may leverage and benefit from one or more features of data storage system 400. For example, the data storage services may directly leverage and benefit from data storage provided by container utilization system 404 and indirectly leverage and benefit from block containers 405 and resources 406 of block container system 402 that are used by container utilization system 404.

Figure 6A:
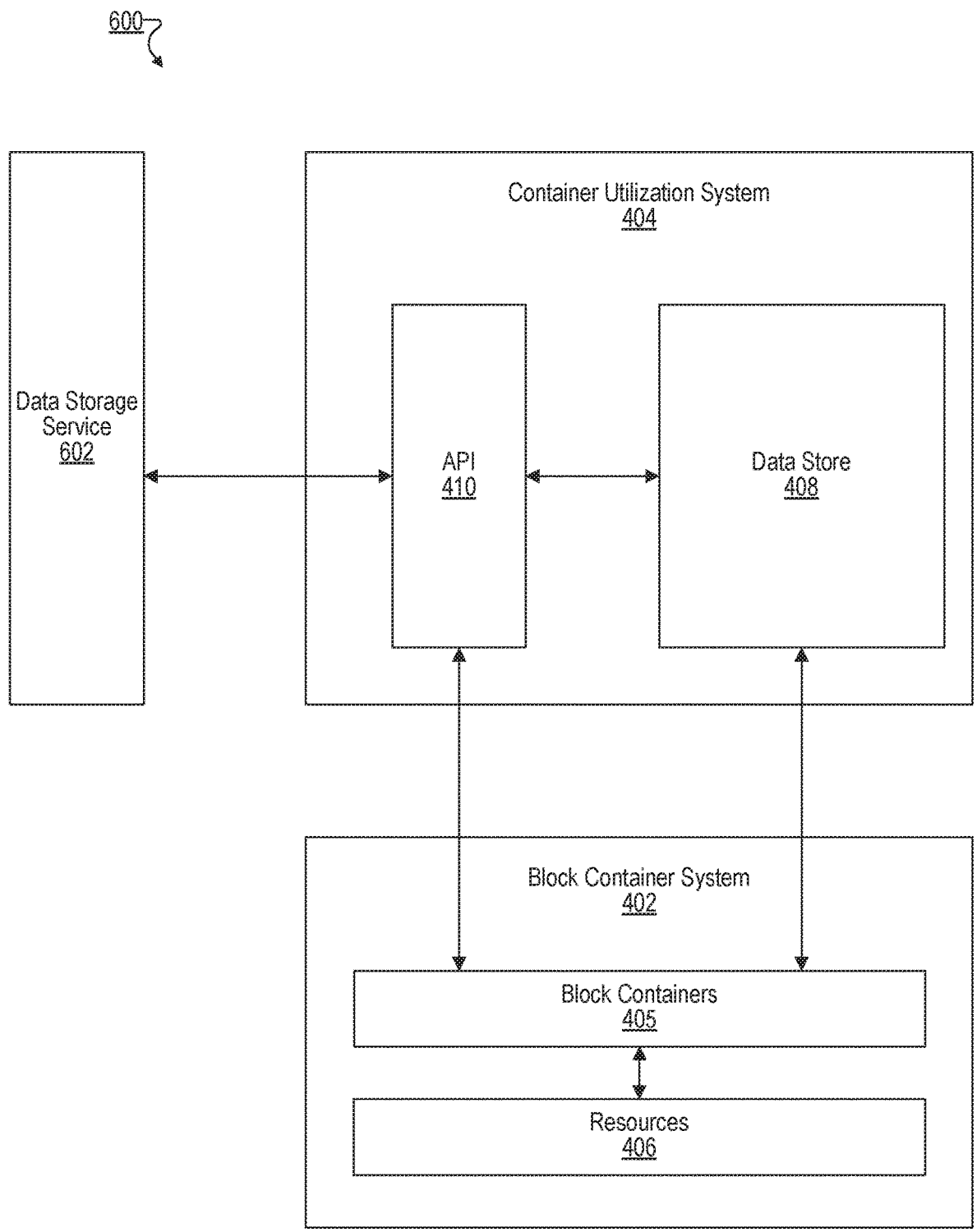
FIGS. 6A-B illustrate examples of data storage service systems configured to interface with a container utilization system in accordance with some embodiments of the present disclosure.

FIG. 6A illustrates an example of a data storage system 600 that includes a data storage service 602 configured to interface with container utilization system 404 by way of API 410. Data storage service 602 may be implemented in any suitable way (e.g., as a data storage system, as an engine, as a virtual data system, etc.) and may interface with container utilization system 404 in any suitable way, including by issuing calls to and receiving responses to the calls from API 410 of container utilization system 404.

Data storage service 602 may be any suitable type of data storage service, such as a file storage service that uses one or more file storage protocols, an object storage service that uses one or more object storage protocols, a block storage service that uses one or more block storage protocols, a database service that uses one or more database protocols, etc. In certain examples, data storage service 602 is a data storage service 602 that is not a block storage service.

Data storage system 400 and/or data storage system 600 may provide data storage service 602 with access to resources of block container system 402 and container utilization system 404 (e.g., through API 410) such that data storage service 602 may be built on block containers 405. For example, data storage service 602 may store and manage content of data storage service 602 in data store 408, and the content may be stored and managed using block containers 405 as described herein.

An example in which data storage service 602 is a file storage service will now be described. The example is illustrative. A file storage service may be implemented in other ways in other examples. Data storage service 602 may be a different type of data storage service in yet other examples.

In certain implementations, data storage service 602 may include a virtual file system (VFS) configured to manage file data. For example, the VFS may manage metadata that represents information about data files and how the data files map to data instances such as block containers stored in data store 408. In certain embodiments, the VFS may employ data structures called envelopes in which metadata about the data files and mappings of the data files to block containers is maintained. An envelope may include information about one or more data files. Envelopes may include any suitable information about data files and corresponding block containers, including, file identifiers, block container identifiers, container store map information (e.g., info about relationships between file identifiers and block container identifiers), snapshot info for the data (indicating older block container versions), root node identifiers for root nodes of graphs representing block containers in container-based data store 408, size information for files, block containers, and/or graphs of logical extents, statistics for the data, log information for the data, and the like. In some examples, envelopes may be directories plus caches of metadata about files contained in the directories. Data storage service 602 may be configured to provide any information about data files, including block container identifiers and/or other information represented in envelopes, to API 410 in conjunction with calling functions of API 410. Data storage service 602 may also be configured to receive information about data files, including block container identifiers and/or other information to be represented in envelopes (e.g., logical size of a file, logical space used for the file, etc.), from API 410 in conjunction with responses from called functions of API 410.

In certain implementations, data storage service 602 may be configured to generate and provide block container identifiers for use by container utilization system 404. Container utilization system 404 may be configured to use the block container identifiers as local identifiers within container utilization system 404 or may be configured to map the block container identifiers to local identifiers generated and used within container utilization system 404.

In certain embodiments, data storage service 602 and container utilization system 404 may be configured to represent each data file or envelope as a block container in data store 408. Data storage service 602 may be configured to cache files and push cached block containers to container utilization system 404 in batches for writing to data store 408. Data store 408, in turn, may persist block containers and associated versions (e.g., snapshots) and make the block containers available for fast access by data storage service 602.

Container utilization system 404 may be configured to provide transaction semantics for use by data storage service 602. In certain embodiments, the transaction semantics may allow, for at least some classes of operations, data storage service 602 to issue multiple updates to a file and request that all or none of the updates be made to the block container representing the file. Container utilization system 404 may be configured to implement all or none of the updates and return either new or old data to data storage service 602.

In certain implementations, container utilization system 404 and data storage service 602 may be configured to support multi-container transactions. For example, container utilization system 404 may use one or more resources 406 of block container system 402 to provide an array of parallel transaction queues (e.g., 32 buffers) that can be written to independently for increased throughput. The number of parallel transaction queues written to may be maximized to increase throughput.

To illustrate the use of such parallel transaction queues, a transactional update may include data for multiple metadata elements and/or operations (e.g., create a block container, create another block container, append to a block container, etc.). Container utilization system 404 may be configured to perform everything associated with such a transactional update all together or not at all. Accordingly, everything in the transactional update may be made visible to a host at the same time.

Data storage service 602 may be configured to provide file storage services (e.g., to a host server that is not shown in FIG. 6A). To this end, data storage service 602 may be configured to support any file-based storage protocols, including for example, NFS, SMB, and/or CIFS. One or more such protocols may be used by a host server, for example, to interface with the VFS.

In the case of a storage system providing a file service, such as through NFS or SMB, container utilization system 404 makes it very simple for the file service layer to concentrate on protocol handling and file service semantics without being concerned about layout out files on the storage, while benefiting from the rich semantics of block containers 405. For example, file stores get the benefit of deduplication and compression without having to implement those features separately, will also benefit from all the other block container or pod services such as snapshots, clones and various types, forms, and methods of replication, and may be able to leverage symmetric synchronous replication to provide symmetrically accessible mirrored files in a simple fashion. Individual files can be cloned easily by virtually copying one block container to another as part of creating a new file. A file can be re-cloned by virtually copying the block container associated with the first file to the block container associated with the second container. This can, for example, make it very fast and space efficient to copy a collection of virtual machine images stored as files, or for storing Docker- and Kubernetes-style containers which are generally stored as a collection of overlay directories but where cloning operations could be used to eliminate the separate overhead of reading and writing to these overlays during run-time operation of such a container In certain examples, a file system of a file storage service can be versioned by making a sequence of snapshots of the file system's associated block containers based on naming or grouping rules. If subtrees of a file system are differentiated in a coordinated way such as with attributes of block containers, for example based on various kinds of tags or name components, then a file system can leverage that to get highly performant and flexible subdirectory snapshots through requests to the block container service layer to snapshot block containers with those attributes to create new block containers with a particular set of new attributes to differentiate them from the original block containers.

While an example of a file storage service system interfacing with container utilization system 404 has been described above, any suitable data storage service system, including another type of data storage service system, may interface with container utilization system 404. For example, an object-based storage service system (e.g., an S3 storage service system) may interface with container utilization system 404. An object store may get the benefit of deduplication and compression without having to implement those features separately, may also benefit from all the other block container or pod services, and may even be able to leverage symmetric synchronous replication to provide symmetrically accessible mirrored objects in a simple fashion. Individual objects can be cloned easily by virtually copying one block container to another as part of creating a new object. An object can be re-cloned by virtually copying the block container associated with the first object to the block container associated with the second container. This can, for example, make it very fast and space efficient to copy a collection of virtual machine images or containers. As another example, a database service system may interface with container utilization system 404. A database that stores blobs may benefit from deduplication and/or inherit additional block container and pod capabilities.

A storage service system that interfaces with container utilization system 404 may be configured to provide data storage services using any suitable data storage protocol or set of protocols.

Figure 6B:
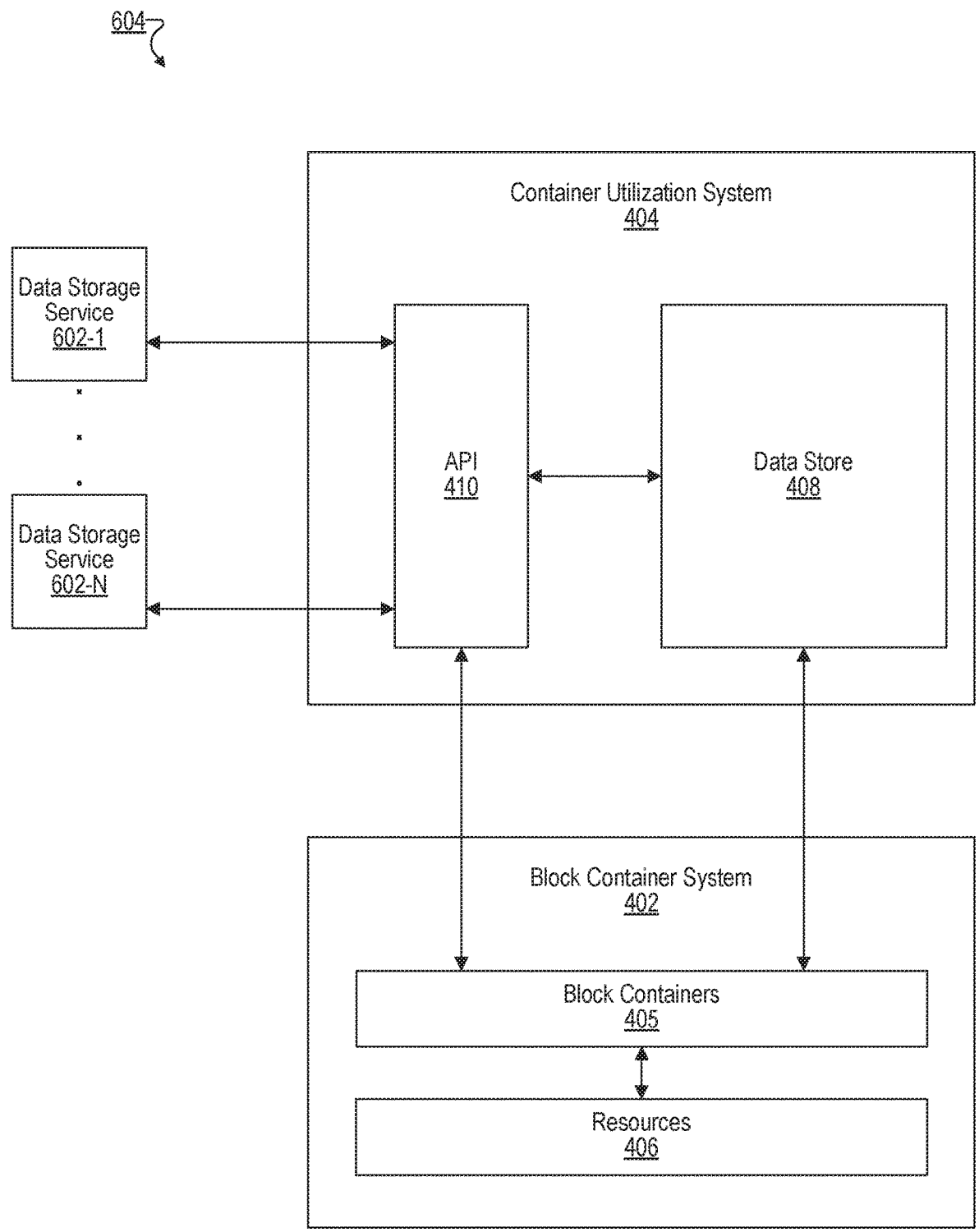

While FIG. 6A illustrates one data storage service 602 supported by container utilization system 404 and block container system 402, these systems may be configured to support any number of data storage services, including data storage services of different types. FIG. 6B illustrates an example of a data storage system 604 that includes N number of data storage services 602 (data storage services 602-1 through 602-N) configured to interface with container utilization system 404 by way of API 410. The plurality of data storage services 602 shown in FIG. 6B may include any suitable combination of data storage services (e.g., file, block, object, database, etc.) configured to interface with container utilization system 404 by way of API 410.

Data storage services 602 may be provided with access to resources of block container system 402 and container utilization system 404 (e.g., through API 410) such that data storage services 602 may be built on block containers 405. For example, data storage services 602 may store and manage content of data storage services 602 in one or more data stores (e.g., data store 408) maintained by container utilization system 404, and the content may be stored and managed using block containers 405 as described herein.

Container utilization system 404 may function as an intermediary between block container system 402 and one or more data storage services 602. This may allow different data storage services 602 to easily interface with container utilization system 404 (e.g., by way of API 410) in order to benefit from block containers 405 and resources 406 of block container system 402.

In certain examples, block container system 402 and/or container utilization system 404 may be configured to allow space efficient virtual copying or cloning of block ranges or block containers associated with one storage service to be used by another storage service. As example, individual files or sets of files of one file system may be virtually copied to another file system. As another example, individual files or sets of files of a file system may be turned into individual objects or sets of objects in an object store (or vice versa). As another example, a database blob may be virtually copied from a database to make a file or object. In a more complex example, a file contained within a virtual machine's file system image where the file system image is itself stored, for example, as either a block volume or an individual file on a block container, could be virtually copied to form an independent file or object within a file system or object store that directly utilizes block containers.

In certain examples, block container system 402 and/or container utilization system 404 may be configured to provide a variant of this in which multiple identities may be provided for a block container such that different storage service can share a block container, which sharing may include inheriting changes to the content of the block container. For example, a file system and an object store may share a block container. The file system may use a first identifier for the block container, and the object store may use a second identifier for the block container. Changes made to content of a file in the file system may be inherited by a corresponding object in the object store by way of the changes to the content of the file being made in the shared block container.

While FIGS. 4A, 4B, 6A, and 6B illustrate container utilization system 404 and block container system 402 as separate entities, other configurations may be implemented in other embodiments. As an example, container utilization system 404 and block container system 402 may be flattened into a container storage system configured to operate in any of the ways described herein. This may be accomplished in any suitable way, including by implementing one or more of resources 406 in a container storage system. The resources 406 implemented in the container storage system may include the same resources as may be used in a block storage system and/or may include adaptations of the resources that are configured for use with the container storage system. The reader will appreciate that any other implementation of a container storage system may be configured to operate in any of the ways described herein using any of the illustrative resources described herein and/or other suitable resource.

Figure 7:
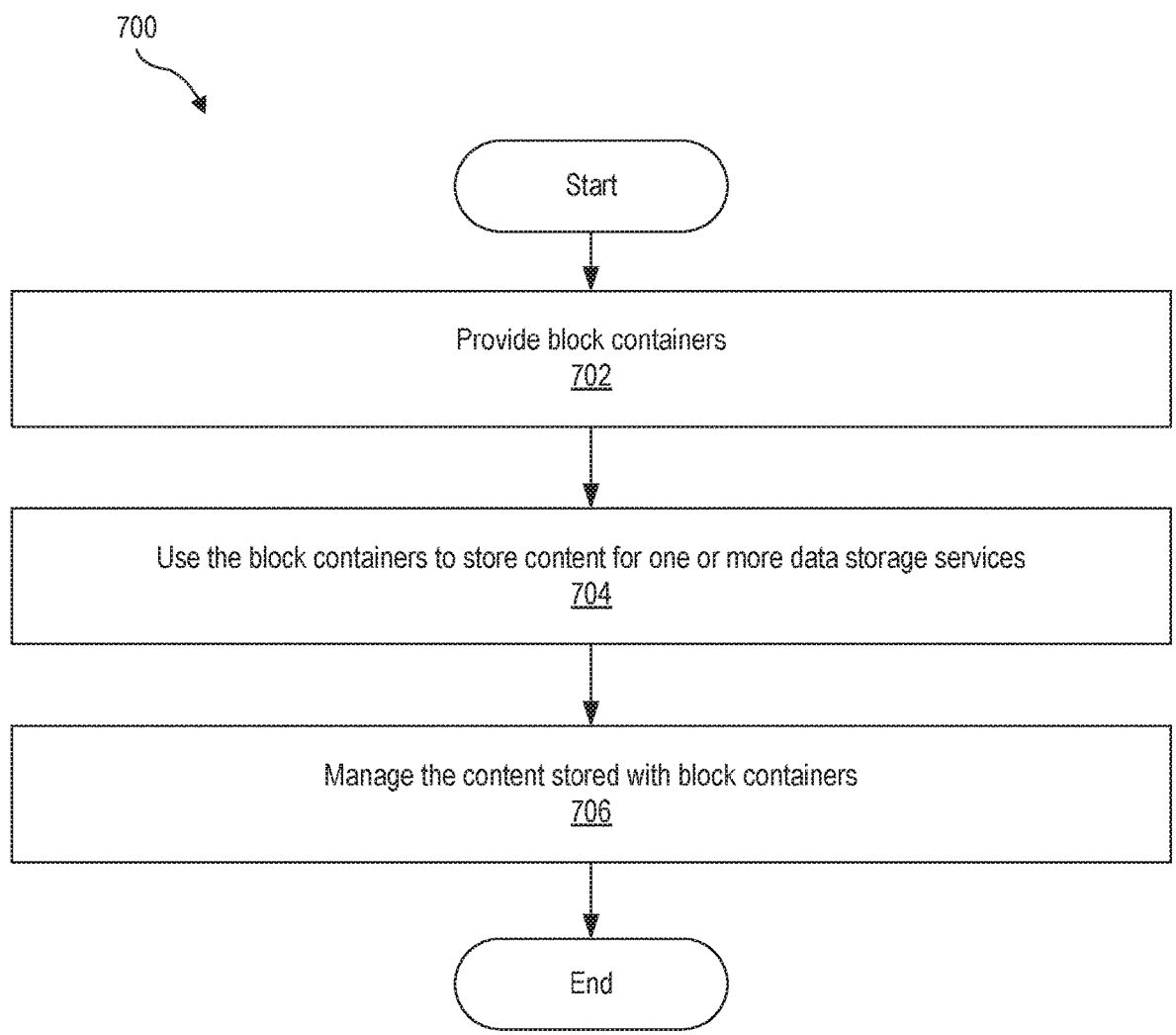
FIGS. 7-11 illustrate example methods of a data storage system in accordance with some embodiments of the present disclosure.

FIG. 7 illustrates an exemplary method 700 for a data storage system. While FIG. 7 illustrates exemplary operations according to one embodiment, other embodiments may omit, add to, reorder, and/or modify any of the operations shown in FIG. 7. One or more of the operations shown in FIG. 7 may be performed by data storage system 400, any components included therein, and/or any implementation thereof.

In operation 702, block containers are provided. For example, block container system 402 may provide block containers 405 in any of the ways described herein.

In operation 704, the block containers are used to store content for one or more data storage services. For example, container utilization system 404 may use block containers 405 to store content for one or more data storage services 602 in any of the ways described herein.

In operation 706, the content stored with the block containers is managed. For example, block container system 402 and/or container utilization system 404 may perform one or more operations to manage the content, such as by applying resources 406 of block container system 402 to perform snapshotting, cloning, deduplication, compression, garbage collection, and/or other operations on the content stored with block containers 405.

Figure 8:
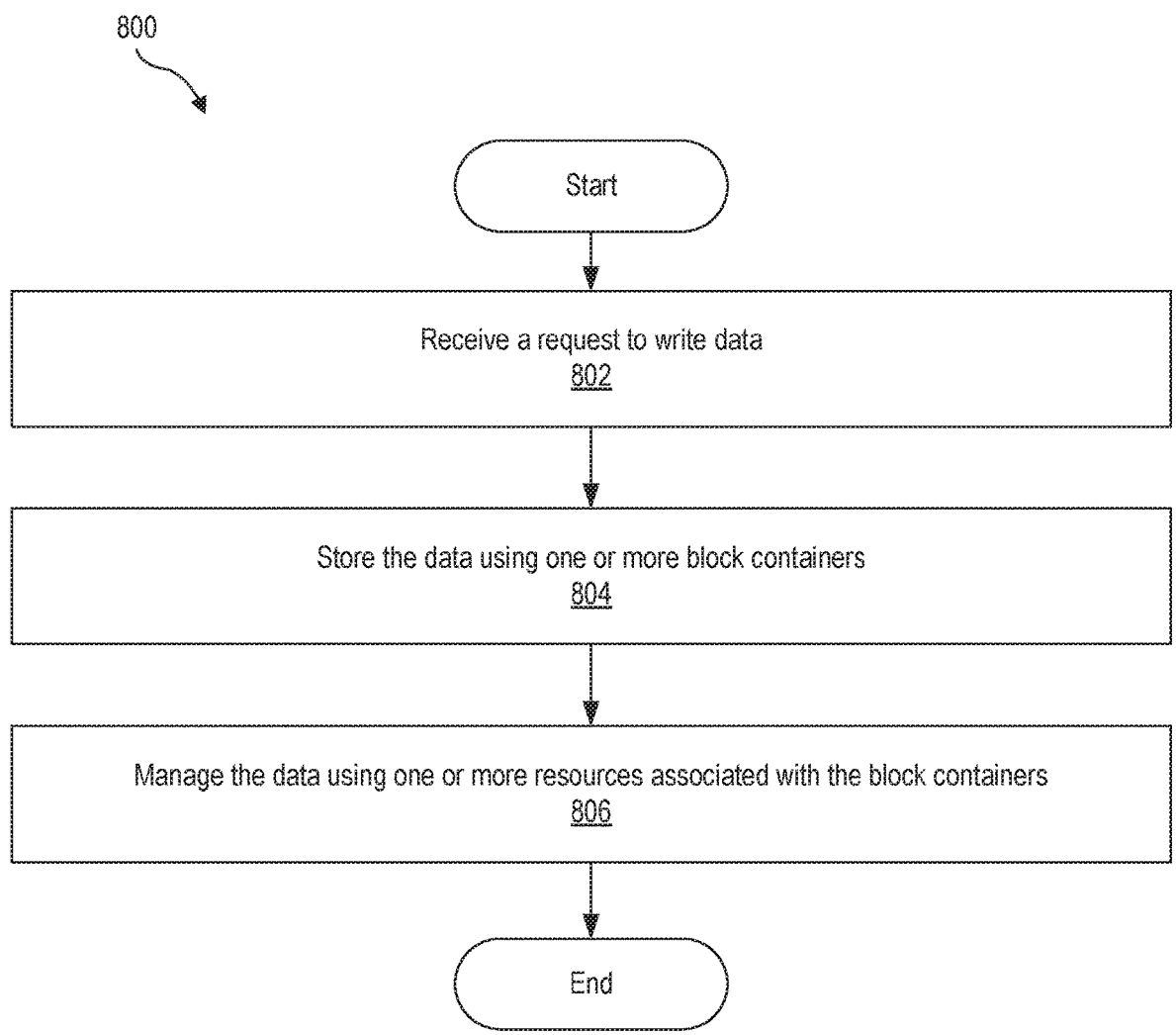

FIG. 8 illustrates an exemplary method 800 for writing and managing data. While FIG. 8 illustrates exemplary operations according to one embodiment, other embodiments may omit, add to, reorder, and/or modify any of the operations shown in FIG. 8. One or more of the operations shown in FIG. 8 may be performed by data storage system 400, any components included therein, and/or any implementation thereof.

In operation 802, a data storage system receives a request to write data. The data storage system may receive the request from any suitable source, such as a data storage service 602, another data storage system configured to interface with the data storage system, or a host (e.g., a host controller, a host server, etc.).

The request may include any information indicating or associated with the request. For example, the request may include data to be written and information about the data, such as a data identifier (a data file identifier, a block container identifier to be used by the data storage system to identify a block container to which the data is written), size information for the data, etc. Data fields included in the request may by defined by a schema used to interface with the data storage system.

In operation 804, the data storage system stores the data to a data store in response to the request received in operation 802. The data storage system may use one or more block containers to store the data to the data store.

Operation 804 may include the data storage system performing one or more processes to store the data to the data store. The processes may use any of the illustrative resources described herein. In certain examples, the storing of the data to the data store may include multi-stage processes such as a frontend process and a backend process. The frontend process may include use of resources to write the data to a temporary data store (e.g., a non-volatile data store, NVRAM, a cache, etc.) and reducing the data (e.g., via pattern recognition, data deduplication, and compressing the data). The frontend process may be performed inline such that the data storage system may notify, with low latency, a host from which the request was received that the data write has been performed. The backend process may include use of resources to write the data to the data store, which may include batch writing the reduced data to all-flash memory.

In operation 806, the data storage system manages the data in the data store using one or more resources associated with the block containers. Operation 806 may include the data storage system performing one or more processes to use one or more resources of block container system 402 to manage the data in the data store. The processes may use any of the illustrative resources described herein. In certain examples, the managing of the data in the data store may include using resources of block container system 402 to reduce the data in the data store (e.g., by deep deduplication, deep compression, etc.) and/or reclaim storage (e.g., by garbage collection).

Figure 9:
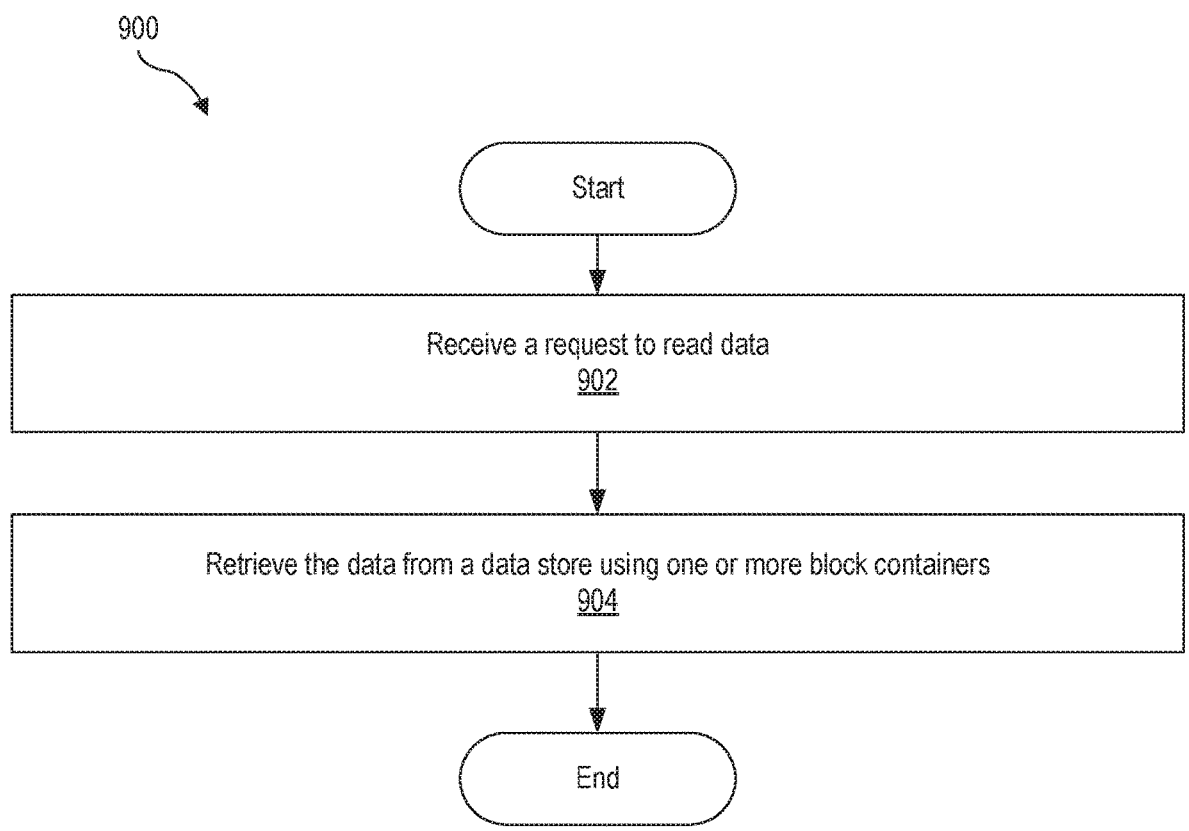

FIG. 9 illustrates an exemplary method 900 for reading data. While FIG. 9 illustrates exemplary operations according to one embodiment, other embodiments may omit, add to, reorder, and/or modify any of the operations shown in FIG. 9. One or more of the operations shown in FIG. 9 may be performed by data storage system 400, any components included therein, and/or any implementation thereof.

In operation 902, a data storage system receives a request to read data. The data storage system may receive the request from any suitable source, such as data storage service 602, another data storage system configured to interface with the data storage system, or a host (e.g., a host controller, a host server, etc.).

The request may include any information indicating or associated with the data to be read. For example, the request may include information about the data to be read, such as a data identifier (a data file identifier, a data object identifier used by the data storage system to identify a data object in which the object data is stored, etc.). Data fields included in the request may by defined by a schema used to interface with the data storage system.

In operation 904, the data storage system retrieves the data from the data store in response to the request received in operation 902. The container storage system may use one or more block containers to retrieve the data from the data store. For example, the data storage system may use a block container that represents the data in the data store, to locate and retrieve the data. This may include using a data identifier to identify a handle of the block container and using the handle to access and use the block container to locate and retrieve the data.

Additionally, in certain examples, the data storage system may use a lookaside data structure, such as a lookaside table or cache, to locate and retrieve the data. The data storage system may be configured to generate and populate the lookaside data structure with data representing a log of actions that are to be performed by the data storage system in a time-shifted manner, such as later as part of a background process. For example, the lookaside data structure may indicate tuples that are written to a silo but not yet written to the data store. Accordingly, the data storage system may use the lookaside data structure, together with a block container, to locate and retrieve data being read.

Figure 10:
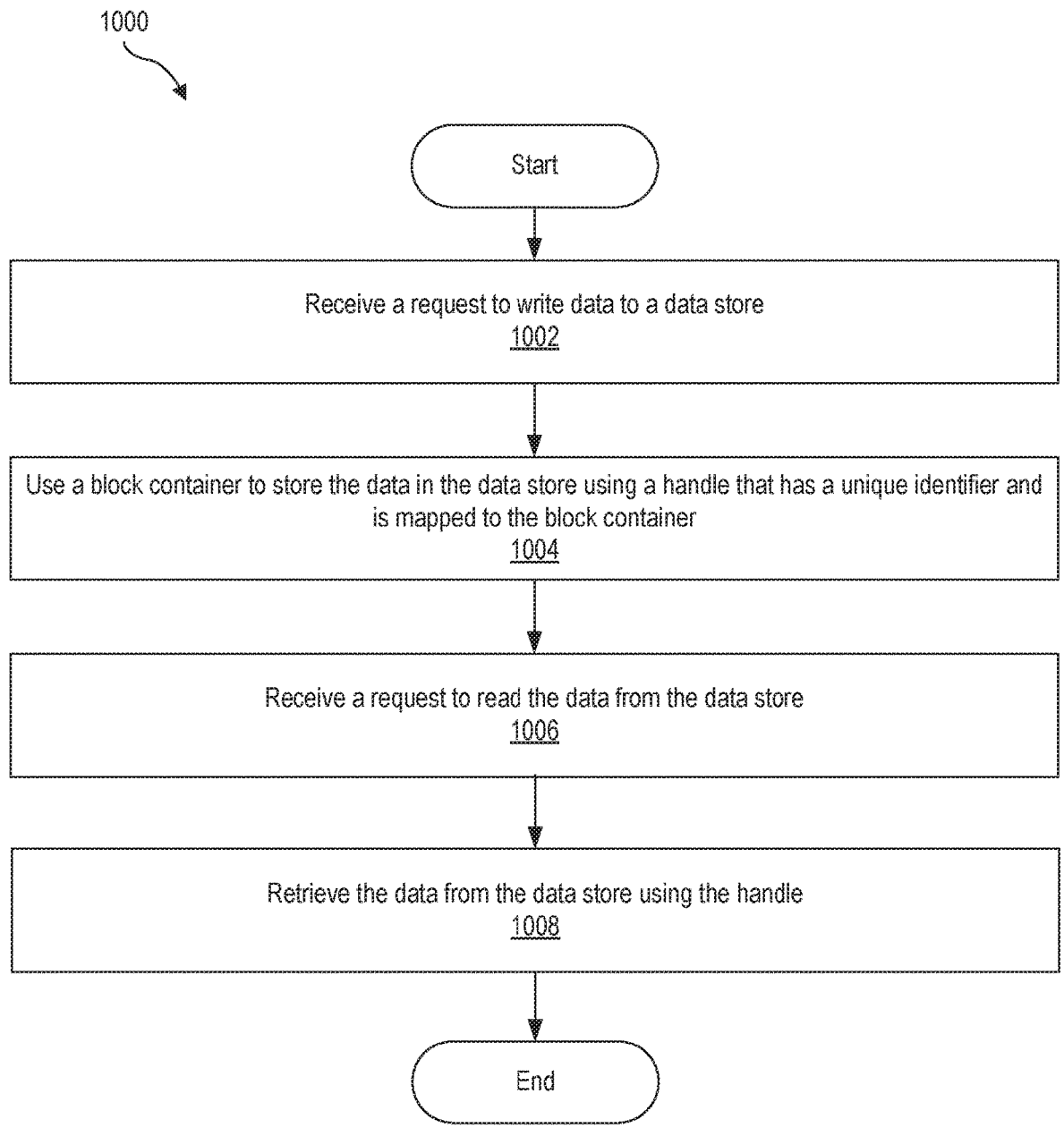

FIG. 10 illustrates an exemplary method 1000 for using a block container to represent data in a data store. While FIG. 10 illustrates exemplary operations according to one embodiment, other embodiments may omit, add to, reorder, and/or modify any of the operations shown in FIG. 10. One or more of the operations shown in FIG. 10 may be performed by a data storage system, any components included therein, and/or any implementation thereof.

In operation 1002, a data storage system receives a request to write data to a data store. The data storage system may receive the request from any suitable source, such as a data storage service 602, another data storage system configured to interface with the data storage system, or a host (e.g., a host controller, a host server, etc.).

The request may include any information indicating or associated with the request. For example, the request may include data to be written and information about the data, such as a data identifier (a data file identifier, a data object identifier to be used by the data storage system to identify a data instance to which the data is written), size information for the data, etc. Data fields included in the request may by defined by a schema used to interface with the data storage system.

In operation 1004, the data storage system uses a block container to store the data to the data store in response to the request received in operation 1002. The data storage system uses a handle having a unique identifier mapped to the block container to identify the block container.

In certain examples, the storing of the data to the data store may include the data storage system performing multi-stage processes such as a frontend process and a backend process. The frontend process may include writing the data to a temporary data store (e.g., a non-volatile data store, NVRAM, a cache, etc.) and reducing the data (e.g., via pattern recognition, data deduplication, and compressing the data). The frontend process may be performed inline such that the data storage system may notify a host, with low latency, that the data write has been performed. The backend process may include writing the data to the data store, which may include batch writing the reduced data to all-flash memory.

In operation 1006, the data storage system receives a request to read the data from the data store. The data storage system may receive the request from any suitable source, such as a data storage service 602, another data storage system configured to interface with the container storage system, or a host (e.g., a host controller, a host server, etc.).

The request may include any information indicating or associated with the data to be read. For example, the request may include information about the data to be read, such as a data identifier (a data file identifier, a data object identifier used by the data storage system to identify a data object in which the data is stored, etc.). Data fields included in the request may by defined by a schema used to interface with the data storage system.

In operation 1008, the data storage system retrieves the data from the data store using the handle. This may include using the handle to identify and use the block container to locate and retrieve the data. Operation 1008 may additionally include searching a lookaside data structure to identify any data indicating that the block container is to be used for retrieval of data (e.g., data from a snapshot of the data that is not yet carried through to an updated version of the data).

Figure 11:
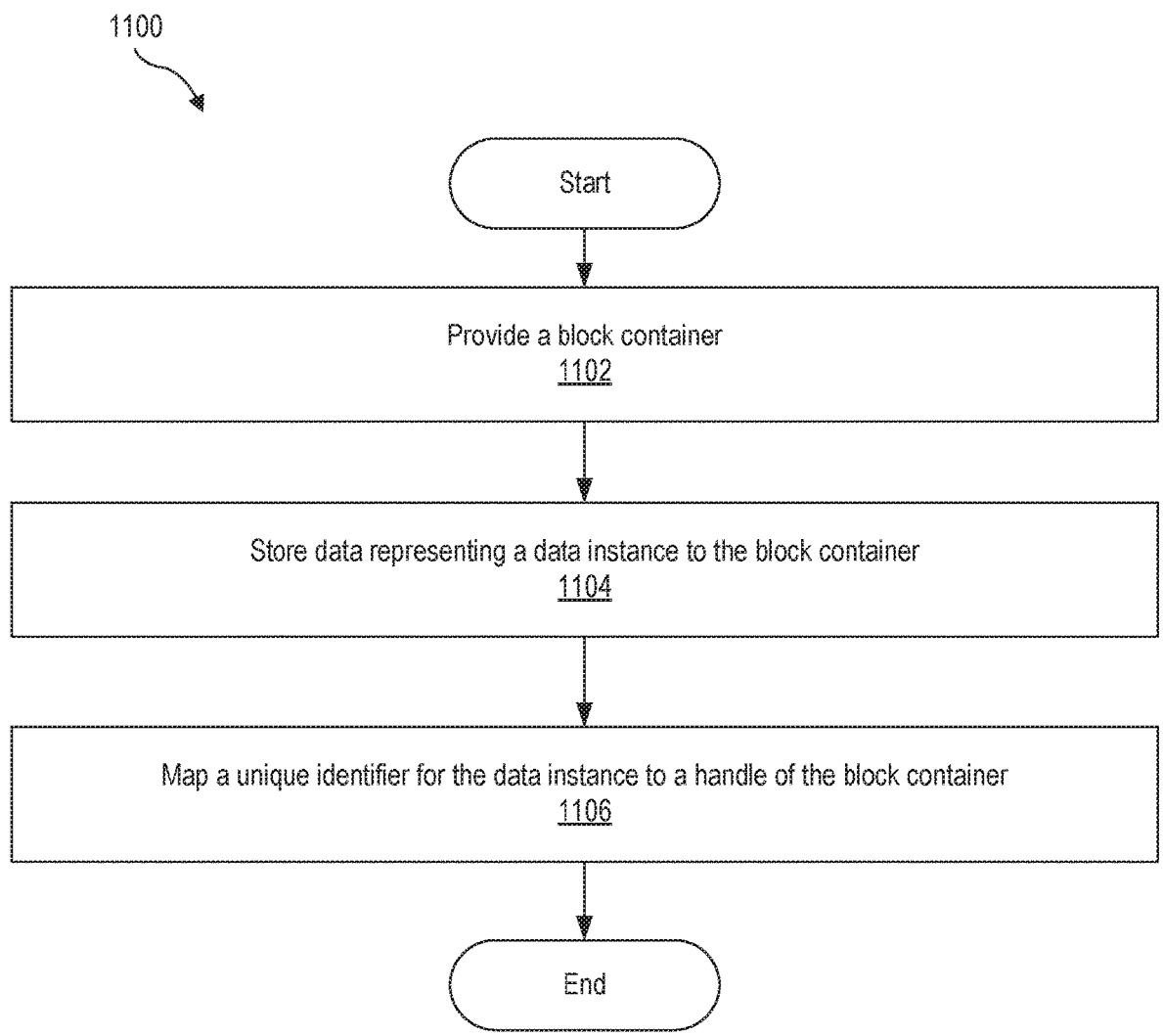

FIG. 11 illustrates an exemplary method 1100 for using a block container to represent data in a data store. While FIG.

11 illustrates exemplary operations according to one embodiment, other embodiments may omit, add to, reorder, and/or modify any of the operations shown in FIG. 11. One or more of the operations shown in FIG. 11 may be performed by a data storage system, any components included therein, and/or any implementation thereof.

In operation 1102, a data storage system provides a block container (e.g., by thin provisioning the block container). Operation 1102, which may be performed in response to a request to write data to a data store, may be performed in any suitable way. For example, the data storage system may provision the block container based on data to be written to the data store and/or further based on block containers that already exist in the data store.

In operation 1104, the data storage system stores data representing a data instance to the block container. Operation 1104 may be performed in any suitable way, including by writing the data to logical and/or physical storage media locations and associating the block container to the logical storage media locations (e.g., logical addresses) mapped to the physical storage media locations.

In operation 1106, the data storage system maps a unique identifier for the data instance to a handle of the block container. Operation 1106 may be performed in any suitable way, including by the data storage system receiving or generating the unique identifier for the data instance and associating the unique identifier with the block container (e.g., by storing the unique identifier in the block container).

In accordance with certain embodiments of the present disclosure, a storage system may establish and use path sets to coordinate operations of the storage system. For example, path sets may be established and used to manage group operations in file storage, such as snapshot operations to one or more particular directory trees (e.g., one or more directory trees of one or more managed directories) of a file storage system.

As used herein, path sets may represent collections of data storage entities that are included in groups to which group operations may be applied. For example, a path set may represent a collection of data storage entities that are included in a particular directory tree of a file storage system (e.g., data storage entities that are located at and below a particular directory of the file storage system). In common usage, a path (or pathname) within a file system represents a hierarchical order of directories from the root directory of the file system to a particular file or directory and leading to the name and identity of the particular file or directory within that file system. A path set, then, may represent the set of all files or directories whose paths (or pathnames) begin with a particular common path from the file system's root directory to a directory (within the hierarchy) on which group operations described in this application can be performed. Examples of path sets are described in detail herein.

Path sets may be particularly useful in a storage system that includes separate layers. For example, a storage system may have a service layer that provides presentation aspects and a storage layer that provides storage aspects that support the service layer. Such a configuration may provide one or more benefits to the storage system and/or users of the storage system, such as a rich set of functions for managing data storage at the storage layer. The service layer may apply operations at the service layer. The storage system may establish and use path sets, which are visible to the storage layer, to coordinate implementation of those operations at the storage layer. For example, for group operations that are applied at the service layer, path sets may be established and used to selectively implement certain kinds of group operations (e.g., snapshot operations), such as directory-tree granularity operations, at the storage layer as needed and/or on a just-in-time basis, in a manner that efficiently utilizes resources of the storage system.

Figure 12:
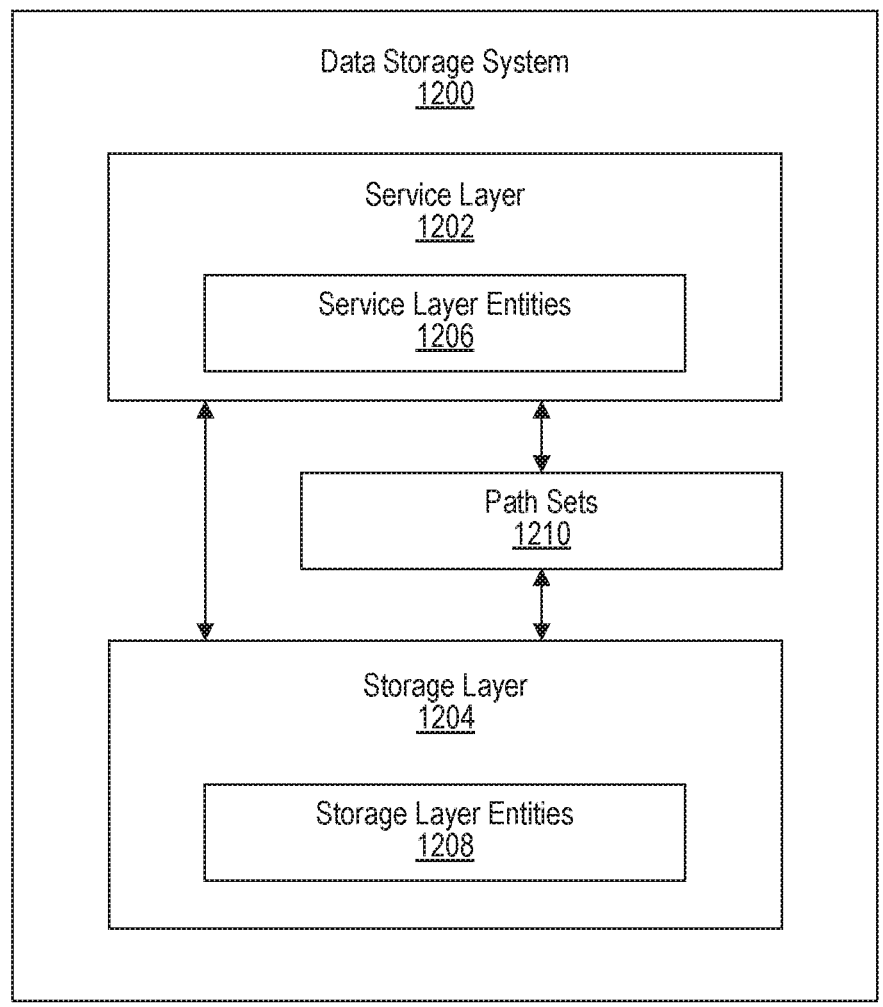
FIG. 12 illustrates an example of a data storage system in accordance with some embodiments of the present disclosure.

FIG. 12 illustrates an example of a data storage system 1200 ("storage system 1200") that includes a service layer 1202 and a storage layer 1204 communicatively coupled to one another. Service layer 1202 and storage layer 1204 may be communicatively coupled to one another using any suitable data communication technologies (e.g., middleware, application program interfaces, other interfaces, etc. of storage system 1200).

Service layer 1202 may be configured to perform one or more operations to provide a data storage service of storage system 1200. For example, service layer 1202 may provide one or more interfaces configured to be used by one or more devices external of storage system 1200 to access and use the data storage service. Service layer 1202 may include or provide a presentation layer configured to provide the interface(s) and/or the data storage service to external devices.

Service layer 1202 may be configured to manage service layer entities 1204 for the presentation layer of storage system 1200. Service layer entities 1204 may include any type or types of data structures suitable to support the data storage service provided by service layer 1202. For example, the data storage service may include a file storage service, and service layer entities 1206 may include file storage entities such as hierarchically arranged directories and files of a file system. Service layer 1202 may manage service layer entities 1204 in any way suitable to provide the data storage service, including by creating service layer entities 1206 and applying operations to service layer entities 1206. Examples of operations that may be applied to service layer entities 1206 may include provisioning, writing to, reading from, modifying, moving (from one location in a directory hierarchy to another location in a directory hierarchy or between directory hierarchies), copying, grouping, organizing, protecting, versioning, snapshotting, cloning, replicating, deleting, and otherwise operating on service layer entities 1206 in the service layer 1202.

While service layer 1202 may manage service layer entities 1206 and provide the presentation layer service of storage system 1200, storage layer 1204 may be configured to perform operations to implement certain aspects of the service layer 1202, such as the service layer entities 1206 and operations applied to the service layer entities 1206 by the service layer 1202. In this regard, the service layer 1202 may be separated from certain implementation aspects of the service layer 1202 because storage layer 1204 is configured to perform those implementation aspects, which may include storing data and metadata for the service layer entities 1206. To this end, service layer 1202 may provide, to storage layer 1204, information about service layer entities 1206 and/or operations performed by service layer 1202. Storage layer 1204 may receive the information and, based on the information, perform implementation operations to implement the operations of the service layer 1202 at the storage layer 1204.

Storage layer 1204 may be configured to create and manage storage layer entities 1208 that are associated with service layer entities 1206. The storage layer entities 1208 may represent the service layer entities 1206 in any suitable way, such as by storing data representative of the service layer entities 1206 (e.g., data and metadata of the service layer entities 1206). The storage layer entities 1208 may include any type or types of data entities suitable to represent the service layer entities 1206. In certain examples, storage layer entities 1208 include data structures arranged in a flat or non-hierarchical configuration, or with minimal hierarchy such as collections of collections of storage layer entities 1208. Accordingly, a hierarchical configuration of service layer entities 1206 may not be reflected in storage layer entities 1208. In certain examples, storage layer entities 1208 include block objects, which are described herein.

The separation of operations of storage system 1200 into service layer 1202 operations and storage layer 1204 operations, and/or the use of storage layer entities 1208 to represent service layer entities 1206 may provide one or more benefits to storage system 1200. For example, storage layer 1204 may provide flexibility in implementing operations on data, managing data, and using resources of storage system 1200. Additionally or alternatively, storage layer 1204 may provide data structures (e.g., storage layer entities 1208) and/or data storage management operations that would be difficult, impractical, less efficient, or more resource intensive to implement in service layer 1202. In certain examples, such operations of storage layer 1204 may be facilitated by use of block objects as storage layer entities 1208, which block objects may provide any of the features and/or benefits of block objects as described herein.

As mentioned, when service layer 1202 applies operations to service layer entities 1206, service layer 1202 may communicate information about the operations to storage layer 1204. The information may be provided in any suitable form, including as one or more requests (e.g., application program interface calls) or requests through a network (e.g., a remote procedure call) to implement aspects of the service layer operations within the storage layer 1204. Storage layer 1204 may be configured to implement the operations on corresponding storage layer entities 1208 in any suitable way. In certain examples and/or for certain operations, storage layer 1204 may implement the operations in real time as information about the operations is received from service layer 1202. For certain other examples and/or operations, storage layer 1204 may selectively perform and/or delay performing the operations until performing the operation becomes necessary, or more efficient, and/or in response to certain defined events. Such delayed and/or selective performing of the operations on storage layer entities 1208 may provide one or more benefits to storage system 1200. For example, the number of I/O operation requests to persistent storage or through internal I/O buses or other interconnects by storage system 1200 may be reduced. This may conserve resources and facilitate efficient operation of storage system 1200.

In examples in which implementation of operations to a particular group of service layer entities (e.g., a directory tree of a managed directory) applied at the service layer 1204 is delayed or is selective at storage layer 1204, maintaining consistency of data between service layer 1202 and storage layer 1204 may be a challenge at least because during periods between application of operations to service layer entities 1206 at the service layer 1202 and implementation of the operations on storage layer entities 1208 at the storage layer 1204, additional operations may be applied to service layer entities 1206 at the service layer 1202. The additional operations may alter the service layer entities 1206, such as by changing a hierarchical configuration of service layer entities 1206. Subsequently, when storage layer 1204 determines to delay operations on storage layer entities 1208 (e.g., for a "lazy" implementation in which performance of certain group operations are intentionally delayed and then selectively implemented on individual entities associated with a group when operating on the entities for some other reason such as modifying the entities), in order to maintain consistency of data with service layer 1202, storage layer 1204 should implement the operations on storage layer entities 1208 that are associated with service layer entities 1206 at the time the operations were applied to service layer entities 1206, as the service layer entities 1206 existed before the additional operations changed the hierarchical configuration of service layer entities 1206.

Another challenge in maintaining data consistency between service layer 1202 and storage layer 1204 is that certain information maintained by the service layer 1202 may not be maintained by the storage layer 1204. In certain examples, service layer 1202 may maintain information about configurations of service layer entities 1206, such as information about groupings of service layer entities 1206 in service layer 1202. An example of such a grouping is a set of all service layer entities 1206 within a hierarchical configuration such as a directory hierarchy. Service layer 1202 may maintain information about any other type or types of groupings of service layer entities 1206 and/or relationships between the service layer entities 1206. Such hierarchy detail information about the relationships between the service layer entities 1206 in a directory hierarchy may not be known to the storage layer 1204. While this may provide certain benefits for storage layer 1204, it may also present a challenge to maintaining data consistency between storage layer 1204 and service layer 1202, particularly when implementation of operations applied to groups of service layer entities 1206 in service layer 1202 is intentionally delayed in storage layer 1204.

Storage system 1200 may establish and use path sets 1210 to coordinate implementation of operations on storage layer entities 1208. For example, storage system 1200 may establish and use path sets 1210 to manage storage layer implementation of service layer operations applied in service layer 1202. To illustrate, an operation may be applied to a directory tree (e.g., to all service layer entities 1208 that are organized within a particular directory and the tree of directories below that directory) of a file system in service layer 1202. Storage layer 1204 may use path sets 1210 to manage implementation of the operation in storage layer 1204, including by using path sets 1210 to identify relationships between storage layer entities 1208 and the operation.

Path sets 1210 may be managed by any suitable component of storage system 1200. For example, path sets 1210 may be managed by service layer 1202, storage layer 1204, an intermediate layer between service layer 1202 and storage layer 1204, or any combination of layers of storage system 1200. Path sets 1210 may be represented using any suitable identifiable data structures, such as data objects or any other identifiable construct.

Path sets 1210 may represent relationships between certain service layer entities 1206 and storage layer entities 1208 associated with (e.g., that implement) those service layer entities 1206. For example, in certain embodiments path sets 1210 may represent collections of storage layer entities 1208 associated with service layer entities 1206 of a directory hierarchy of a file system managed by service layer 1202. For instance, an illustrative path set 1210 may represent a collection of storage layer entities 1208 that are associated with, or reside within, a directory tree at and below a particular directory of a file system managed by service layer 1202, or more specifically a collection of storage layer entities 1208 that correspond to files and directories included directly or indirectly through hierarchical inclusion within the directory of the file system.

Such a path set 1210 may represent the collection of storage layer entities 1208 associated with the directory without representing or including information about the hierarchical relationships between the files and directories in the directory of the file system. That is, the path set 1210 may be unaware of the hierarchical relationships between the files and directories in the directory in the service layer 1202. The path set 1210 may simply represent that the collection of storage layer entities 1208 is associated with the directory without representing or being aware of hierarchical relationships between the files and directories within the directory. Accordingly, the files and directories can be moved around and linked within the directory, thereby changing their hierarchical relationships within the directory, and the path set 1210 may remain unchanged and continue to represent that the collection of storage layer entities 1208 is associated with the directory. In this or any other suitable way, a path set 1210 may associate storage layer entities 1208 in storage layer 1204 with a directory in service layer 1202, without having to record or understand all of the hierarchical relationships between the files and directories in the directory in service layer 1202.

A path set 1210 may be associated with a grouping of service layer entities 1206, such as a directory of files and directories, in any suitable way. For example, service layer 1202 may manage information that links a directory to a path set 1210 for the directory. In certain examples, a directory of a file system managed by the service layer 1202 may include metadata pointing to the path set 1210 associated with the directory.

A path set 1210 may be associated with a collection of storage layer entities 1208 in any suitable way. For example, storage layer 1204 may manage information that links storage layer entities 1208 to a path set 1210, such as a path set of a directory that includes files and directories that are represented by the storage layer entities 1208 in storage layer 1204. In certain examples, storage layer entities 1208 may include metadata pointing the storage layer entities 1208 to the path set 1210.

As mentioned, the path set 1210 may include information representing an association between the directory in the service layer 1202 and a collection of storage layer entities 1208 that represent the files and directories of the directory in the storage layer 1204. The path set 1210 may include additional information about the directory, such as information about operations (e.g., snapshots) applied at the directory and all of its hierarchical constituents in the service layer 1202, versions of the operations and/or the path set 1210, etc. The path set 1210 may be any suitable identifiable construct that is associated with the directory and that is known to (e.g., implemented by) the storage layer 1204 or an intermediate layer between the service layer 1202 and the storage layer 1204. Illustrative examples of path sets 1210 will now be described.

Figure 13A:
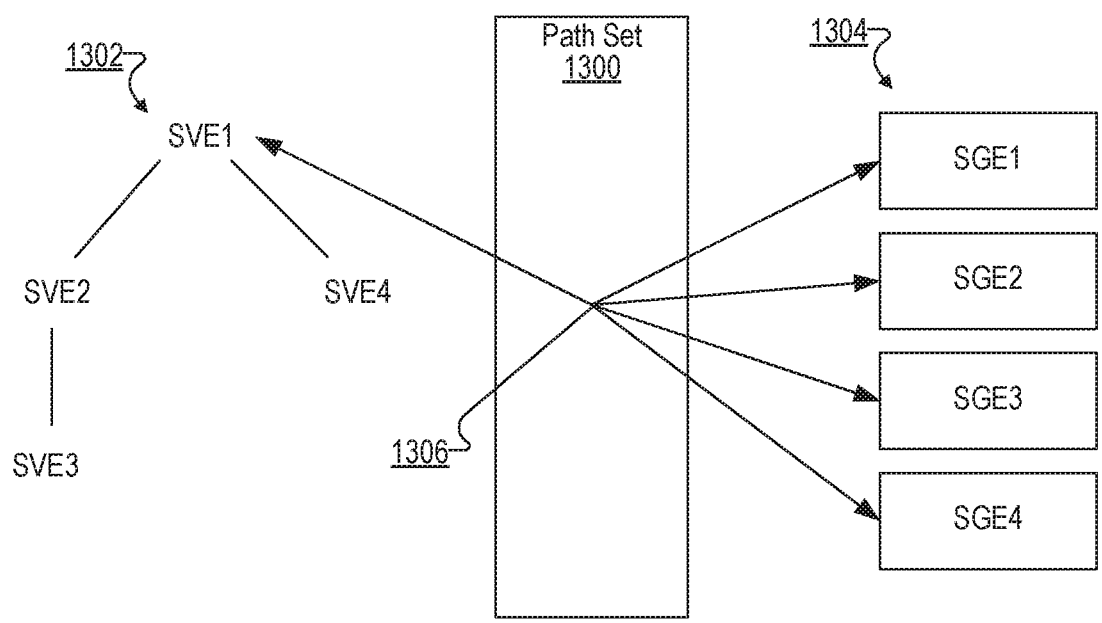
FIGS. 13A-13C illustrate examples of path sets in accordance with some embodiments of the present disclosure.

FIG. 13A illustrates an example of a path set that may be established and used by storage system 1200. FIG. 13A illustrates an example path set 1300 that represents a relationship between service layer entities (SVEs) 1302 of a service layer and storage layer entities (SGEs) 1304 that represent the SVEs 1302 in a storage layer. As shown, the SVEs 1302 may include SVE1, SVE2, SVE3, and SVE4 arranged in a hierarchical configuration such as a directory hierarchy. SVEs 1302 may be in a directory hierarchy having SVE1 as the top node, SVE2 and SVE4 as children nodes of SVE1, and SVE3 as a child node of SVE2. Thus, SVE1 may be said to be a directory that includes SVE2, SVE3, and SVE4 in its directory tree. The SGEs 1304 may include SGE1, SGE2, SGE3, and SGE4 that represent the SVEs 1302 that are included in the directory tree of SVE1. Thus, SGEs 1304 are a collection of SGEs 1304 associated with SVE1.

Path set 1300 may indicate that the collection of SGEs 1304 (SGE1, SGE2, SGE3, and SGE4) are associated with the directory tree of SVE1 by indicating that the collection of SGEs 1304 are associated with SVE1 (the top node of the directory tree). In this or a similar manner, path set 1300 may not represent an entire hierarchical structure of an entire file system, but may simply associate the collection of SGEs 1304 to the directory tree (by associating SGEs 1304 to the top node of the directory tree). The path set 1300 may simply associate the collection of SGEs 1304 to the directory tree without representing relationships between the SGEs 1304.

Path set 1300 may indicate a relationship between SVE1 and SGEs 1304 in any suitable way. As an example, path set 1300 may include information (e.g., metadata) pointing to SVE1 and SGEs 1304. Such a configuration is represented by a configuration of arrows 1306 in FIG. 13A. As another example, SVE1 and SGEs 1304 may include information (e.g., metadata) pointing to path set 1300. Such a configuration is represented by a configuration of arrows 1312 in FIG. 13B.

Figure 13B:
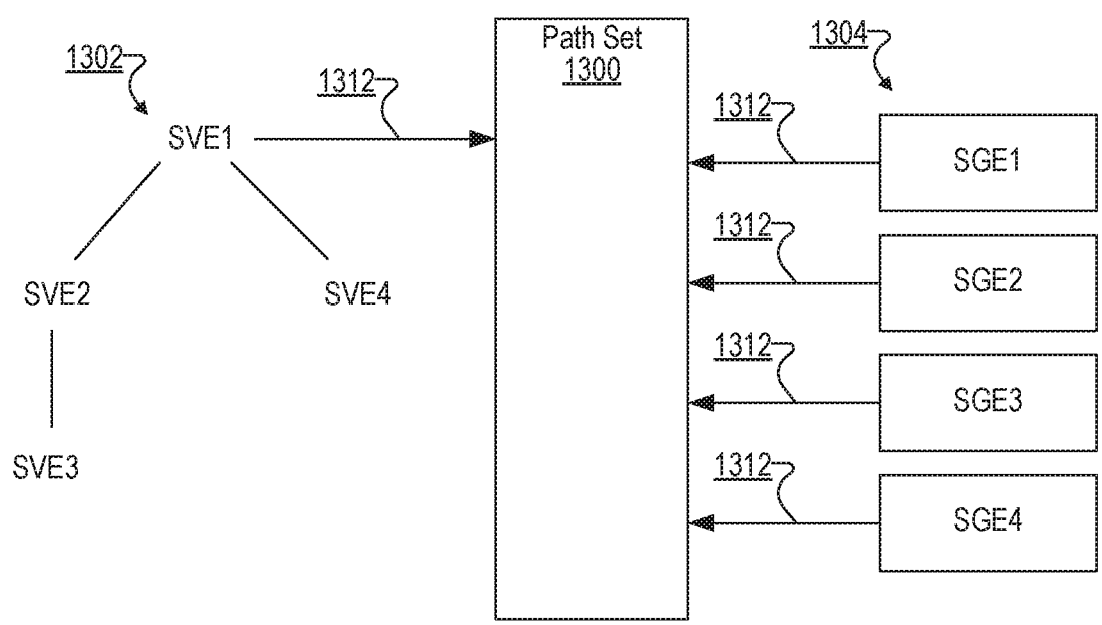

While path set 1300 shown in FIGS. 13A and 13B illustrates an example of a path set, path sets may be configured in any suitable way to represent relationships between storage layer entities and service layer entities. For example, path sets may be established and maintained for storage layer entities and may indicate certain information about relationships of the storage layer entities to certain service layer entities (e.g., managed directories). Such path sets may be referred to as entity-level path sets.

Figure 13C:
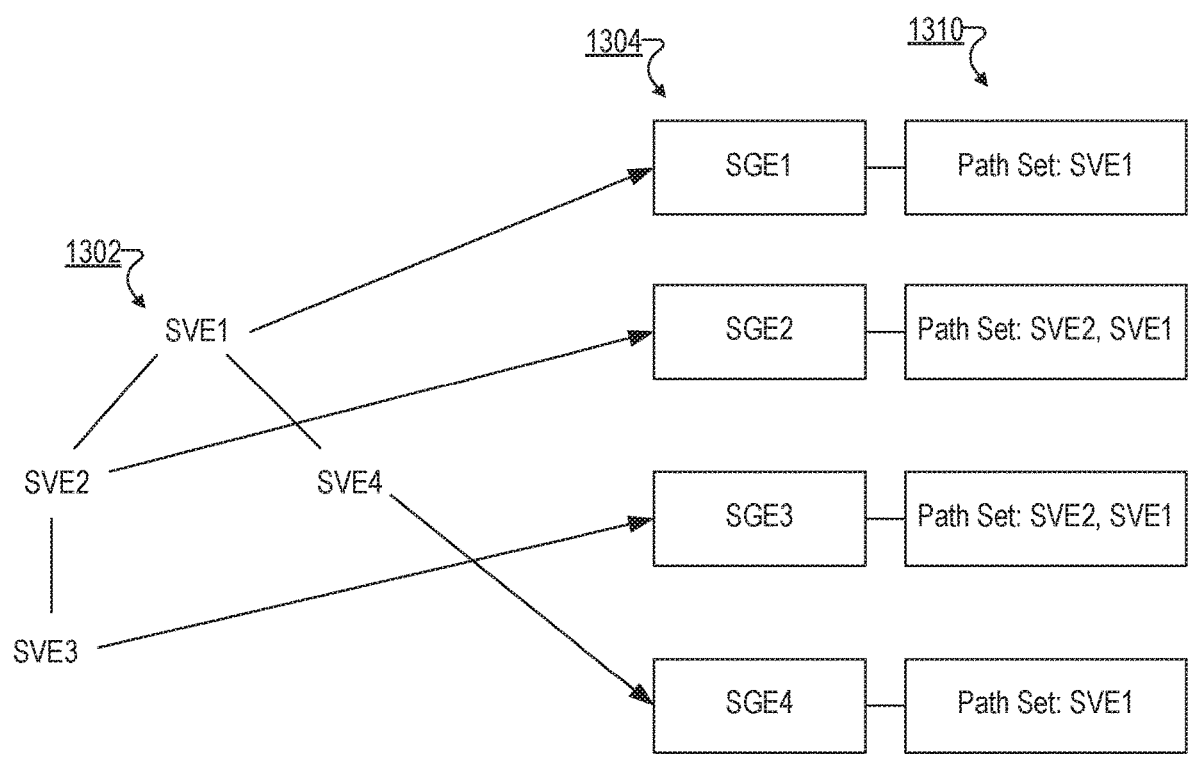

FIG. 13C illustrates an example of entity-level path sets that may be established and used by storage system 1200. FIG. 13C illustrates example path sets 1310 associated with storage layer entities (SGEs) 1304 that represent service layer entities (SVEs) 1302. One or more of SVEs 1302 may each be assigned a path identifier. The path identifiers may be used to define path sets 1310 that indicate relationships of SGEs 1304 to SVEs 1302 that are assigned path identifiers.

For example, the SVEs 1302 may include SVE1, SVE2, SVE3, and SVE4 arranged in a hierarchical configuration such as a directory hierarchy, as shown. Path identifiers may be assigned to SVE1 and SVE2. To illustrate, the path identifier for SVE1 may be "SVE1," and the path identifier for SVE2 may be "SVE2." Path identifiers may be selectively assigned to service layer entities based on any criteria, logic, or designation. For instance, path identifiers may be assigned to SVE1 and SVE2 based on SVE1 and SVE2 being designated service layer entities for use with path sets and/or certain operations (e.g., snapshot operations). In certain examples, SVE1 and SVE2 may be designated as managed directories of a file system, and SVE3 and SVE4 may be file storage elements other than elements that are designated to be managed directories. Accordingly, path identifiers may be assigned to SVE1 and SVE2 but not to SVE3 or SVE4.

The SGEs 1304 may include SGE1, SGE2, SGE3, and SGE4 that represent the SVEs 1302. Path sets 1310 may include a path set corresponding to each of the SGEs 1304. Each of the path sets 1310 may include information about certain SVEs 1302 that are associated with the respective SGE 1304. For example, a path set for SGE1 indicates that SGE1 is included in a directory tree of SVE1. In this case, SGE1 represents SVE1, which is part of its own directory tree. A path set for SGE2 indicates that SGE2 is in directory trees of SVE1 and SVE2. In this case, SGE2 represents SVE2, which is part of its own directory tree and the directory tree of SVE1. A path set for SGE3 indicates that SGE3 is in directory trees of SVE1 and SVE2. In this case, SGE3 represents SVE3, which is part of the directory tree of SVE1 and the directory tree of SVE2. A path set for SGE4 indicates that SGE4 is in the directory tree of SVE1. In this case, SGE4 represents SVE4, which is part of the directory tree of SVE1. SVE3 and SVE4 may not be considered to part of their own directory trees for one or more reasons, such as SVE3 and SVE4 being service layer entities other than a managed directory (e.g., a storage element such as a file or other non-directory data element and/or directory data element that is not designated for use with path set operations).

Storage system 1200 may be configured to establish and maintain entity-level path sets such as path sets 1310 in any suitable way. For example, storage system 1200 may establish path sets for storage layer entities when the storage layer entities are created and may dynamically update the path sets when configurations of service layer entities implemented by the storage layer entities change in a way that moves the service layer entities in and out of directories associated with path sets 1310 (which changes in the service layer 1202 may cause storage layer 1204 to update metadata for the storage layer entities). Storage system 1200 may be configured to manage path sets by tracking any changes to hierarchical configurations that affect path set information about the hierarchical configurations and updating the path sets accordingly (e.g., by detecting moves, hard links, etc.). Accordingly, when a service layer entity 1206 is moved between directories, a path set of a storage layer entity 1208 that represents the service layer entity 1206 may be updated to reflect the move when the move changes the path set. However, if the move is within a directory associated with a path set, or between directories associated with the same list of managed directories, the move does not change the path set because the service layer entity stayed within the managed directories, and so the path set relationships need not be updated.

Path sets 1300 and 1310 are illustrative. Storage system 1200 may be configured to use other suitable implementations of path sets in other embodiments.

Path sets may include additional information. For example, path sets may include information about operations applied to groups of service layer entities 1206 in service layer 1202 of storage system 1200. For instance, when certain operations are applied to the contents of a managed directory by service layer 1202, service layer 1202 may provide information about those operations for inclusion in a path set associated with the managed directory. Such information may identify the operations and the timing and/or sequence of those operations.

Path sets may be versioned. In certain examples, for instance, a path set that is associated with a service layer entity and may represent one version of a path set within a set of path sets associated with the service layer entity. For example, storage system 1200 may be configured to establish versions of path sets for a managed directory based on operations applied to the managed directory. One path set in the path sets for the managed directory may represent an operation applied to the managed directory at a particular time or within a temporal sequence of operations applied to the managed directory. Versions of path sets associated with a service layer entity such as a managed directory may be indexed in any suitable way, such as by increasing and applying a version counter to a newly created path set. Examples of versioned path sets and use of versioned path sets to coordinate implementation of operations on storage layer entities are described herein.

Examples of a storage system in which service layer 1202 includes a file service layer configured to provide a file storage service (such as any file storage service described herein or another suitable file storage service) and in which storage layer 1204 includes a block object layer configured to manage block objects that implement aspects of the file storage service (e.g., that implement service layer entities of the file storage service) will now be described. Examples of path sets being establish and used will then be described in the context of configurations in which a file storage service is implemented with block objects. One or more aspects of such example configurations may apply to other configurations of a storage system that provide other types of storage services and/or implementations of the storage services.

Figure 14:
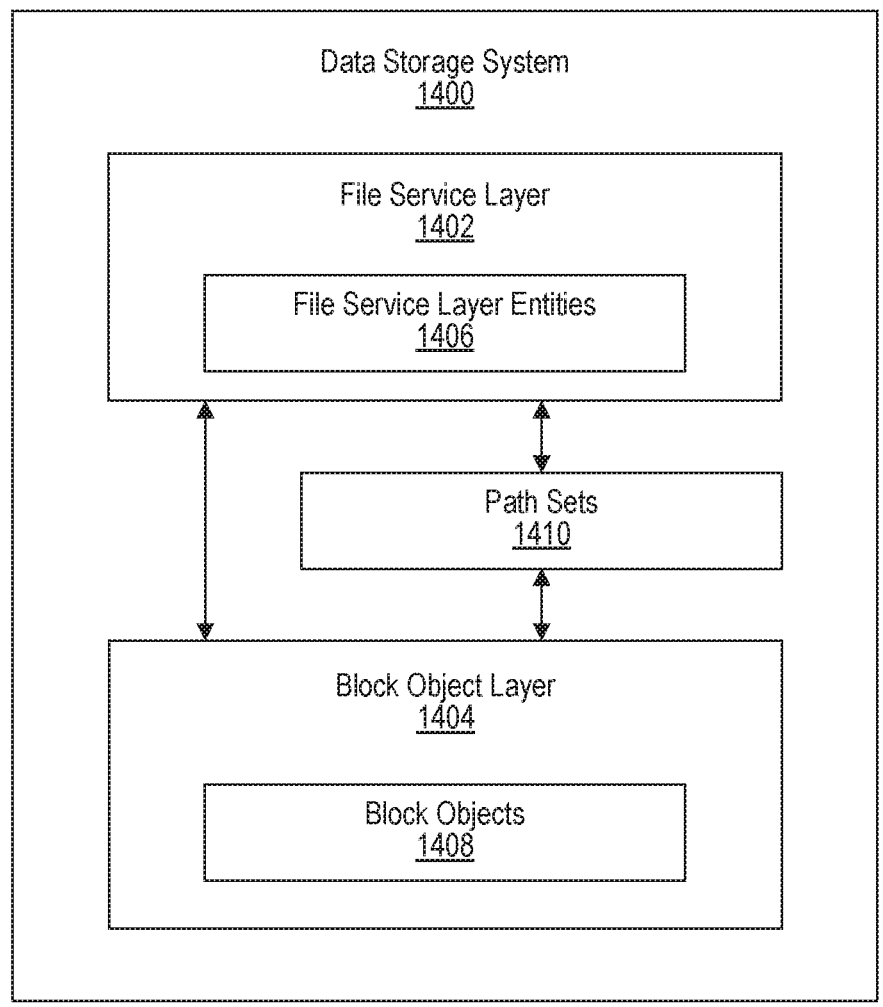
FIG. 14 illustrates an example of a data storage system in accordance with some embodiments of the present disclosure.

FIG. 14 illustrates an example of a data storage system 1400 ("storage system 1400") that includes a file service layer 1402 and a block object layer 1404 communicatively coupled to one another with any suitable communication technologies. Storage system 1400 may be an example implementation of storage system 1200.

File service layer 1402 may be configured to perform one or more operations to provide a file storage service of storage system 1400. To this end, file service layer 1402 may manage file service layer entities 1406, which may include directories and files arranged in a hierarchical configuration such as a directory hierarchy of a file system.

The file system may be a tree of directories with files as leaf nodes. The directories may provide names for files, some additional file metadata (often including the file type), and identities for the files that are usually distinct from the names that can be used to locate the metadata for storing the content and other metadata for the files themselves. For example, many traditional Unix file systems use an i-node number, but other implementations may use other forms of unique identifiers. Directories themselves can also have identifiers, similar or the same as for files, and can be named within their parent directories in a similar or identical fashion. These identities ensure that a file or directory is uniquely identified so that even if it is renamed, moved, or linked so that it has more than one name, it can still be referenced. Movement of a file or directory between a source directory and a target directory may be essentially an operation on the source and target directories that removes a name at one location for the moved file or directory and adds a name to another location for the moved file or directory. Linking, likewise, adds an additional name for a file to a target directory.

Block object layer 1404 may be configured to perform one or more operations to implement file service layer entities 1406 of the file storage service of storage system 1400. For example, block object layer 1406 may manage block objects 1408 associated with (e.g., that implement or otherwise represent) file service layer entities 1404. The block objects 1408 may be configured in any of the ways described herein and may be operated on by block object layer 1406 to implement file service layer entities 1406 and/or other aspects of the file storage system at the block object layer 1406. The block objects 1408 may be implementations of a storage system based on concepts in block-based storage systems but oriented toward high object counts and dynamic creation and deletion that are atypical of volume-based block storage and are suitable for storing data and metadata for individual files and directories with efficient random read-write access (at least at the level of blocks). This may separate out the implementation of a file service from the implementation of aspects of a storage system for storing data and metadata for individual files and directories in response to modification requests. As described herein, the block objects 1408 provide efficient mechanisms for certain data operations, including cloning and/or data versioning using efficient virtual block object snapshots. Block objects 1408 may be stored and managed in a block object store of block object layer 1404.

In certain examples, block objects 1408 stored in a block object store may be configured to have an externally visible organization analogous to what is commonly found in object stores, where a key in a simple namespace identifies an object that stores data. Block objects 1408 may be configured to support low latency random updates, at least at the level of writing and overwriting random blocks. Block objects 1408 may be configured to have a rich set of primitives for modifying the block objects 1408 (richer than primitives of conventional object stores).

In certain examples, block object layer 1404 may be configured to support snapshots of block objects 1408, linkage to path sets (which could instead be handled by file service layer 1402 or a layer intermediate between file service layer 1402 and block object layer 1404), and/or at least block-level random modifications and increases in block object size such as by writing beyond the current end of a block object 1408. Block object layer 1404 may be configured to provide additional features in other examples.

In certain examples, block objects 1408 may correspond to block containers such as block containers 405 described herein. For example, block objects 1408 may include block containers or be an implementation of block containers.

In addition to supporting reading and writing (and other types of modifications) of individual block objects 1408, block object layer 1404 may be configured to perform and/or support operations applied to groups of file service layer entities in file service layer 1402. In order to implement certain operations applied to groups of file service layer entities 1406 in file service layer 1402, block object layer 1404 must identify the block objects 1408 that are associated with the file service layer entities 1406 in the groups at the times the operations are applied in file service layer 1402. For example, for a snapshot operation applied to a directory of a file system in file service layer 1402, block object layer 1404 must identify the block objects 1408 associated with the file service layer entities 1406 that are in the directory tree of the directory at the time the snapshot operation is applied to the directory in order to be able to implement a consistent snapshot of the directory in block object layer 1404. Identifying all the appropriate block objects 1408 can be time consuming and difficult to implement atomically.

Storage system 1400 may be configured to identify relationships between groups of file service layer entities 1406 and block objects 1408 associated with the file service layer entities 1406 in advance of implementing operations in block object layer 1404. For example, storage system 1400 may use an implementation that groups and pairs files, managed directories, and block objects in advance. Storage system 1400 may then use those identified relationships to coordinate operations on block objects 1408, including to implement snapshot operations, cloning operations, and/or other operations on the block objects 1408. These relationships may be represented as path sets 1410.

In certain embodiments, path sets 1410 may be associated with one or more directories of a file system managed by file service layer 1402 and may represent collections of block objects 1408 associated with the directories (e.g., associated with file service layer entities 1406 of one or more directory hierarchies of the directories of the file system). In certain examples, directory hierarchies to be used for operations that benefit from path sets 1410 may be designated in advance, such as by designating directories of the file system as "managed directories" that are designated to support path sets and/or certain operations such as snapshots, cloning, and/or other operations. File service layer 1402 may be configured to manage directories and the general properties of directories that are designated to be managed directories. The set of all files and directories contained within a managed directory, together with their paired block objects 1408, may be represented as a path set 1410.

In simple examples, managed directories may start out empty and files and directories added within them may remain solely within them until deleted. In such examples, a file or directory cannot move into or out of a managed directory or be linked (e.g., hard linked in Unix parlance) into or out of the managed directory. This may apply generally to any managed directories, including managed directories within other managed directories, so that, for example, a file created within a second managed directory that is within a first managed directory cannot be moved or linked out of that second managed directory, and files within the first managed directory cannot later be moved or linked into the second managed directory.

Such examples may exist when file service layer 1402 is configured to invoke limitations that prevent movement of files and directories into and out of managed directories and/or linking of files and directories to managed directories. In such examples, files and subdirectories are typically added to a managed directory when the files or subdirectories are created, either as part of creating the managed directory itself or when adding files or subdirectories within the managed directory. Files and subdirectories within a managed directory may be marked as being "live" or "active" with respect to the managed directory. When the files or subdirectories are removed from the file system namespace, the files or subdirectories may be marked as no longer being "live" or "active" with respect to the managed directory.

In more complex examples, if a file or directory is added (e.g., moved) within a directory tree of a managed directory, file service layer 1402 may mark the file or directory as part of the managed directory. If a file or directory is removed from (e.g., moved out of) of a managed directory, file service layer 1402 may mark the file or directory as no longer part of the managed directory. If a file or directory is linked from one managed directory to another, file service layer 1402 may mark the file or directory as being a member of two managed directories. If a directory is moved into or out of a managed directory, file service layer 1402 may perform a tree walk to recursively mark that directory's files and subdirectories as now being in or no longer being in the managed directory. Such examples support moving or linking into and out of managed directories.

A file or directory may have some lifetime within a managed directory. When a file or directory is added to a managed directory (such as because the file or directory is created), then the file or directory is live within the managed directory. If at some point the file or directory is removed from the managed directory (such as because the file or directory is deleted), then the file or directory is no longer live within the managed directory. Any operations applied to the managed directory during a lifetime of a file or directory in the managed directory will apply to the file or directory. For example, any snapshots of a managed directory between the time a file or directory is added and the time the file or directory is removed from a managed directory will reflect as presented snapshot images of that file or directory.

In examples that support files or directories being moved or linked into or out of a managed directory, storage system 1400 may be configured to allow for multiple lifetime ranges. For example, if a file or directory is moved out of a managed directory, some snapshots are taken of the managed directory, and then the file or directory is moved back in to that same managed directory, then the file or directory has two ranges of snapshots, corresponding to the first time the file or directory was in the managed directory, and the second time the file or directory was in the managed directory, and the file or directory is "live" from the second time but not from the first time.

In certain examples, a directory may be designated a managed directory only at creation of the managed directory or when the directory is empty. In other examples, an existing non-empty directory may be designated a managed directory. File service layer 1402 may perform a tree walk of a directory designated to be a managed directory and mark each file or subdirectory within the tree as now associated with the managed directory. Other schemes may be used in other examples to change a non-managed directory to a managed directory.

In certain examples, a managed directory may be created anywhere within a directory tree. In other examples, file service layer 1402 may be configured to allow only certain directories to be designated as managed directories. For example, managed directories may be limited to certain directories such as a root directory, subdirectories within the root directory, and/or a top-level directory of a file system. In other examples, path sets 1400 may be established for other configurations of directories and/or all directories of a file system.

In certain examples, storage system 1400 may be configured to allow directories within one managed directory to also be designated as managed directories, thus causing some files and directories to be associated with more than one managed directory. Files and directories associated with more than one managed directory may be associated with more than one set of directory level operations, such as more than one set of snapshot operations. This may support nested snapshots of nested managed directories.

A managed directory may be any directory that is designated for one or more management operations, including for establishment of path sets for the directory and/or for taking snapshots of the directory. Managed directories may be configured to support various types of operations that may be applied to the managed directories. Such operations may be applied to a managed directory based on any suitable trigger event. For example, file service layer 1402 may apply an operation to a managed directory based on a manual trigger such as in direct response to user input requesting the operation be applied. As another example, file service layer 1402 may apply an operation to a managed directory based on a defined schedule or some other set of defined policies for applying operations.

To illustrate, snapshot policies may be associated with a managed directory and may include a set of rules for creating snapshots and possibly a set of rules for retaining the snapshots. The rules for creating snapshots may specify when snapshots of the managed directory are taken, and the rules for retaining snapshot may specify how long the snapshots are retained. For example, a rule of a schedule-based policy may specify that a snapshot be created every hour with snapshots being retained for twenty-four hours, except that one of every twelve of those snapshots (one snapshot from every twelve hours) is retained for five days. A trigger-based policy could be related to ransomware detection methods, where such detection may trigger creation of a snapshot with limitations on who and under what circumstances the snapshot can be deleted. Such ransomware protection snapshots may also guard against the file system itself being deleted, or at least may guard against a deletion of the file system also deleting ransomware protection snapshots. In certain examples, one or more snapshots of a managed directory may be read-only, immutable snapshots designed to protect versioned data from being corrupted or destroyed.

File service layer 1402 may be configured to provide access to snapshots, including access to the content of snapshots and/or information about (e.g., a listing of) snapshots. In certain examples, this may be accomplished with a special type of program implemented directory that can be accessed to access snapshots. For example, file service layer 1402 may provide a program implemented directory called " . . . snapshots . . . " that is available within any directory that might include snapshots and that may include policies or other information related to the directory and/or snapshots.

A program implemented directory may be a directory that is accessible through the file system namespace and whose contents are determined by file service layer 1402 rather than being stored as an explicitly formatted structure. A program implemented directory may be omitted from standard directory content queries to avoid confusing regular directory traversals (so that, for example, a POSIX or similar "find" command performing a directory tree walk would not normally notice the existence of a " . . . snapshots . . . " directory as it would not show up normally when iterating the entries in a directory. Explicitly opening or traversing into a " . . . snapshots . . . " directory may provide access that can be used to list snapshots or access policies, but the " . . . snapshots . . . " directory may be otherwise invisible when viewing the file system normally. A similar capability for accessing snapshots could be added to files as well, either by accessing a file with some special suffix (file . . . snapshots . . . ) or by accessing the file as if it were a directory (file/ . . . snapshots . . . ).

For example, if there were three snapshots of a managed directory called "managed1," then the managed1 directory itself, and also possibly subdirectories of the managed1 directory could each include a (possibly hidden) program implemented directory " . . . snapshots . . . " with, for example, entries of "snapshot.A," "snapshot.B," and "snapshot.C." Descending into one of these would then access that directory in the context of that snapshot. So, "managed1/ . . . snapshots . . . /snapshot.A/subdirectory/file1" would access file1 as it existed within the managed1 directory at the time of the snapshot. Snapshots associated with policies may include the policy name and/or may be organized in some directory structure within the " . . . snapshots . . . " directory, such as, for example, " . . . snapshots . . . /policies/<policyname>/snapshot.N."

Additional information may be provided for richer information about snapshots and policies. For example, a snapshots.info file may provide rich information about the snapshots, such as when they were created, how much space they consume, any restrictions on them, etc. A policies.info file may provide information about policies, each policy's snapshot schedule, or other interesting data. These could be provided in XML format, JSON format, some tabular format, or in any other useful format.

Program implemented directories such as " . . . snapshots . . . " may be provided when traversing a snapshot view (for example, such as through "managed1/ . . . snapshots . . . /snapshot.A/subdirectory/ . . . snapshots . . . "). Traversing parent directories (such as through "subdirectory/ . . . snapshots . . . /snapshot.B/ . . . ") may be allowed, in which case the parent is now in the context of "snapshot.B" instead of "snapshot.A." As a convenience, if a file or directory is still live within a managed directory (it has not been removed from the managed directory), then a "snapshot" name such as "live" could be used to access the file or directory from a snapshot. So, "managed1/ . . . snapshots . . . /snapshot.A/subdirectory/ . . . snapshots . . . /live/file" may access the live version of a file through a snapshot directory tree. Alternately, a determination may be made as to whether a file is still considered to exist in the live version of a managed directory that is being traversed through a snapshot directory tree by, for example, testing whether "file/ . . . snapshots . . . /live" exists.

In certain examples, storage system 1400 may be configured to allow a flexible scheme for identifying snapshots logically or essentially through queries using special names. For example, " . . . snapshots . . . /snapshot@time=2020 Jan. 2-03:06:00" may reference whatever snapshot was created at or before 03:06 am on Jan. 2, 2020, or "snapshot@time-3h" may reference a snapshot from at last three hours ago.

As mentioned, path sets 1410 may be associated with one or more directories of a file system managed by file service layer 1402 and may represent collections of block objects 1408 associated with those directories of the file system. Path sets 1410 may be associated with a directory such as a managed directory in any suitable way. For example, a managed directory may include or link to metadata that links to a path set 1410 associated with the managed directory.

In certain examples, a managed directory may be configured to manage snapshots of the managed directory that are taken by file service layer 1402, and path sets 1410 associated with the managed directory may be configured to manage information representative of the snapshots of the managed directory and/or implementations of the snapshots in storage system layer 1404. The metadata may include policy information that names each snapshot and relates snapshots managed by the managed directory with snapshots managed by path sets 1410 associated with the managed directory.

A time order of the snapshots may be defined for snapshots managed by the managed directory and/or for corresponding snapshots managed by path sets 1410 associated with the managed directory. For example, path sets 1410 may assign each snapshot and/or each corresponding versioned path set an increasing number so that higher numbers represent more recent snapshots and/or versioned path sets.

Metadata that associates a managed directory with path sets 1410 associated with the managed directory may be implemented in any suitable way. For example, a structure representing the managed directory may include such metadata, a structure representing the path sets 1410 may include such metadata, or any other structure or entity of storage system 1400 may include such metadata. The exact details of what metadata is held by a structure representing a managed directory and what metadata is held by a structure representing a path set 1410, or even whether these are distinct structures, can vary between implementations. In certain examples, a managed directory may represent a presentation of snapshots, and paths sets 1410 associated with the managed directory may represent an internal relationship that ties together block objects 1408 representing files and directories in the directory.

In certain examples, how policies relate between managed directories and path sets 1410 may vary between implementations. For policies which cause snapshots to be created automatically, for example, path sets 1401 may be configured to automatically invoke the snapshots in implementations in which the path sets 1410 are managed within the block object layer 1404 of storage system 1400. The block object layer 1404 may, for example, have tighter integration between activity that modifies a block object and clocks or other sensors that can be tested while performing that activity. That also makes for a convenient division of responsibility between presenting a model, which may generally happen within the file system service layer 1402 and implementing that model within the block object layer 1404.

In examples in which snapshots may be generated automatically in the block object layer 1404 on behalf of path sets 1410, the presentation of those snapshots from the file service layer 1202 (the managed directory layer) may take that into account. For example, the file service layer's 1202 presentation of snapshot names may in some cases use a pattern that can relate a path set created snapshot to a name presented through a managed directory-based interface. For example, the path set may know the rules for a policy, but a managed directory might define the name for the policy, so the 100th snapshot created on behalf of a policy might just have the number 100 in the path set structure, but the managed directory implementation in the file service layer 1402 may convert that to "daily/snapshot.100."

An example version of a relationship between managed directories and path sets 1410 is to make them the same, or rather to have all the policy, naming, and other aspects of a managed directory be held by the path sets 1410, thus leaving the term "managed directory" to mean a convenience name for the directory on which a path set is first created.

A path set 1410 may be, basically, a simple collection of files and directories. The path set 1410 itself may not necessarily record or understand the hierarchical relationships between those files and directories. Indeed, because files and directories can be moved around and linked within a path set 1410 without altering which path set 1410 those files or directories are associated with, such operations can be viewed as leaving the path set 1410 itself unchanged, except to the degree that the files and directories that are part of the path set are modified by such operations.

Figure 15:
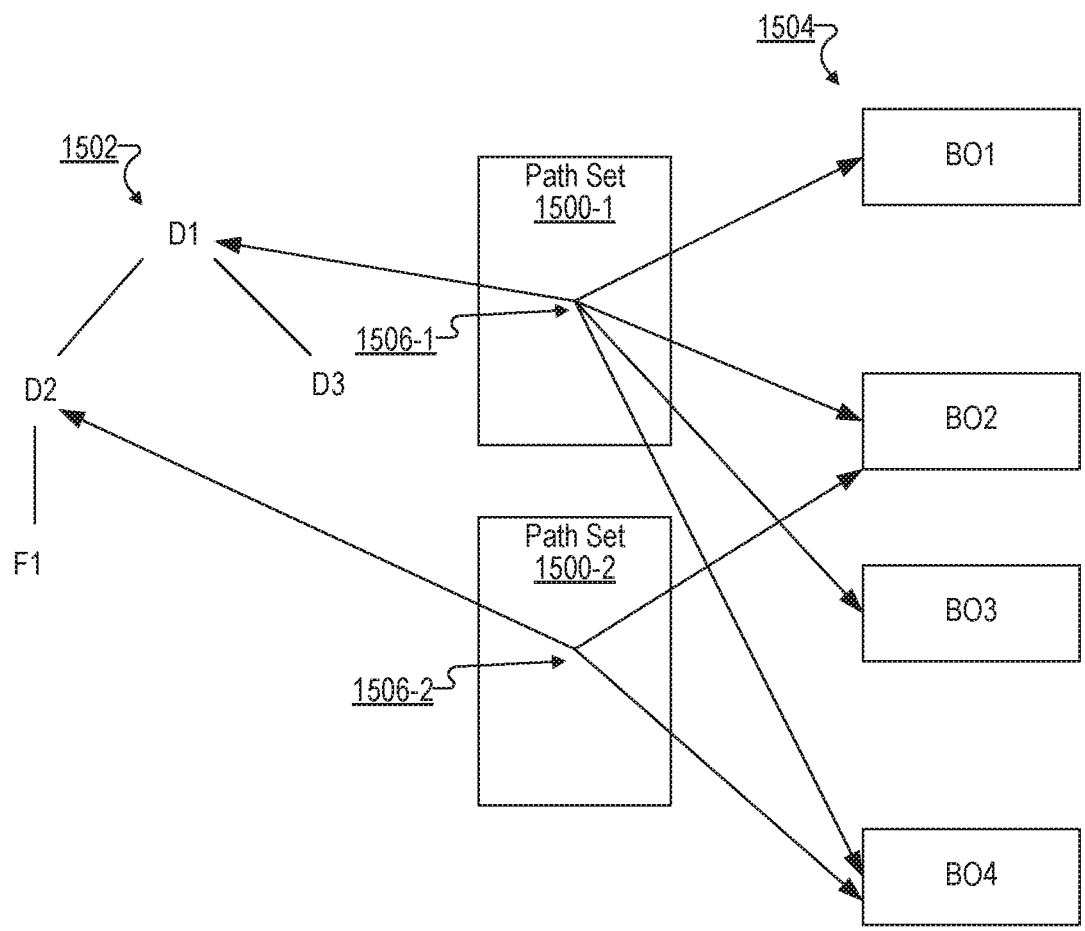
FIG. 15 illustrates an example of path sets in accordance with some embodiments of the present disclosure.

FIG. 15 illustrates example path sets 1500 (e.g., path sets 1500-1 and 1500-2) that represent relationships of file service entities 1502 and block objects (BOs) 1504 that represent the file service entities 1502. As shown, the file service entities 1502 may include directory D1, directory D2, directory D3, and file F1 arranged in a hierarchical configuration such as a directory hierarchy having D1 as the top node, D2 and D3 as children nodes of D1, and F1 as a child node of D2. The BOs 1504 may include BO1, BO2, BO3, and BO4 that implement the file service entities 1502. Configurations of arrows 1506 (e.g., configurations 1506-1 and 1506-2) depict relationships between the file service entities 1502 and the BOs 1504 that represent the file service entities 1502. As shown by configurations 1506-1 and 1506-2, path set 1500-1 may represent a collection of BOs 1504 (e.g., BO1, BO2, BO3, and BO4) that are associated with file service entities 1502 in a directory hierarchy having D1 as the top node, and path set 1500-2 may represent a collection of BOs 1504 (e.g., BO2 and BO4) that are associated with file service entities 1502 in a directory hierarchy having D2 as the top node.

In the example shown in FIG. 15, each of path sets 1500 is a path set associated with a different directory of a file system. In certain examples, path sets 1500 may be established for certain types of directories, such as directories that are designated as managed directories, as described above. For example, directories D1 and D2 may be designated as managed directories to which path identifiers (e.g., "D1" and "D2") are assigned and used for path sets 1500. D3 may not be a managed directory and may not be assigned a path identifier for use in path sets 1500.

In general, a path set represents less than all configuration information about file service entities 1502. For example, a path set may represent a collection of BOs 1504 that are associated with a managed directory D1 or D2, without representing information about the hierarchical structures within directory D1 or D2. For example, path set 1500-1 may represent that BO1, BO2, BO3, and BO4 are associated with directory D1 but may not include any information about the relationships between BO1, BO2, BO3, and BO4 or the relationships between D1, D2, D3, and D4 within directory D1.

In certain examples, path sets 1410 may be associated with operations applied to managed directories D1 or D2 in file service layer 1402. For example, file service layer 1402 may apply operations to managed directory D1. The application of the operations to managed directory D1 may be configured to trigger establishment and/or updating of a path set 1410 associated with the managed directory For example, the path set 1410 for managed directory D1 may be updated over time to reflect current membership of block objects 1408 in the path set 1410, as block objects 1408 are added to and removed from the path set 1410. When a particular type of group operation is applied to the managed directory D1, the path set 1410 for the managed directory D1 may be versioned such as by locking in the membership and content in the path set 1410 as the membership and content existed when the group operation is applied. This locked-in membership and content associated with the group operation applied to the managed directory D1 may be referred to as a version of the path set 1410.

In this sense, a path set 1410 may be said to be versioned based on operations and/or an order in which operations are applied to a managed directory. For example, the file service storage layer 1402 may apply a first particular group operation to the managed directory D1 at a first time in a temporal sequence. In response, the storage system 1400 may record a first version of the path set 1410 for the managed directory D1. The first version of the path set 1410 may indicate the first operation, the first time associated with the first operation, and the files and directories within the directory hierarchy of the managed directory D1 when the first operation is applied to the managed directory D1. Subsequently, the file service storage layer 1402 may apply a second particular group operation to the managed directory D1 at a second time in a temporal sequence. In response, the storage system 1400 may record a second version of the path set 1410 for the managed directory D1. The second version of the path set 1410 may indicate the second operation, the second time associated with the second operation, and the files and directories within the directory hierarchy of the managed directory D1 when the second operation is applied to the managed directory D1.

To illustrate one example, a first snapshot operation is applied to D1 shown in FIG. 15, which may in effect mean that the first snapshot operation is applied to all files and directories (D1, D2, D3, and F1) in the directory hierarchy associated with D1. The storage system 1400 may respond by recording a first version of the path set for D1 that represents a collection of block objects BO1, BO2, BO3, and BO4 that are within the directory hierarchy of D1 when the first snapshot operation is applied to D1. A change is then made to the directory hierarchy. For example, D3 may be removed (e.g., deleted or moved) from the directory hierarchy. The path set for D1 is updated to reflect that D3 has been removed from membership in the path set. A second snapshot operation is then applied to D1, which may in effect mean that the second snapshot operation is applied to all files and directories (D1, D2, and F1) in the directory hierarchy associated with D1. The storage system 1400 may respond by recording a second version of the path set for D1 that represents a collection of block objects BO1, BO2, and BO4 that are within the directory hierarchy of D1 when the second snapshot operation is applied to D1. In this or a similar manner, versions of the path set for D1 may be established and may represent collections of block objects within the directory hierarchy of D1 when snapshot operations are applied to D1.

Figure 16:
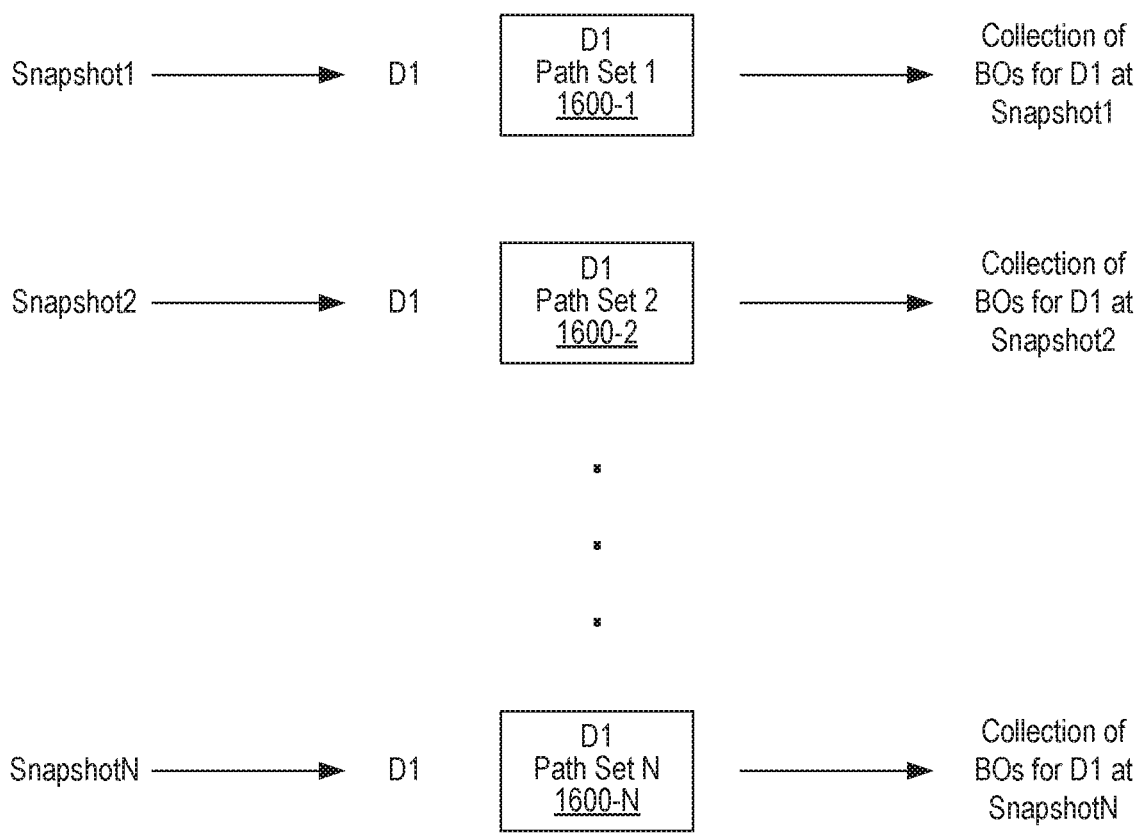
FIG. 16 illustrates an example of versioned path sets associated with snapshots of a directory in accordance with some embodiments of the present disclosure.

FIG. 16 illustrates an example establishment of versions of a path set for a directory D1 of a file system. In the illustrated example, a first version of a path set 1600-1 for D1 is established in response to a first snapshot (Snapshot1) being applied to D1. The first version of the path set 1600-1 represents a collection of block objects (BOs) associated with D1 when the first snapshot is applied to D1. Subsequently, a second version of the path set 1600-2 for D1 is established in response to a second snapshot (Snapshot2) being applied to D1. The second version of the path set 1600-2 represents a collection of block objects associated with D1 when the second snapshot is applied to D1. The collection of block objects associated with D1 at the second snapshot may be the same as the collection of block objects associated with D1 at the first snapshot if no changes to the membership of D1 were made between the applications of the first and second snapshots to D1. Otherwise, the collections may be different and may reflect any change(s) made to the membership of D1 between the applications of the first and second snapshots to D1. Versions of the path set for D1 may continue to be established in association with snapshots being applied to D1, as is illustrated by an Nth version of the path set 1600-N being established in response to an Nth snapshot (SnapshotN) being applied to D1. The Nth version of the path set 1600-N represents a collection of block objects associated with D1 when the Nth snapshot is applied to D1.

Versions of a path set may be indexed in any suitable way, such as by increasing an index value so that higher index values represent more recent versions of the path set. The versions of the path set may be used by the storage system 1400 in any suitable way to coordinate operations on block objects indicated by the path set. For example, creation of a new version of the path set may trigger one or more operations of block object layer 1404.

A block object 1408 stores data and some amount of metadata for a file service layer entity 1406 such as a file or directory of a file system managed by file service layer 1402. For example, a block object 1408 may store data and metadata for something stored into the block object 1408 by file service layer 1402 that utilizes collections of block objects 1408 to store content for the file service layer 1402. For a directory, this data may include a list of directory entries for the files and directories to be listed in that directory, identifiers for each individual file or directory that can be used by the file service layer 1402 to at least find that file or directory's block object, and possibly a few additional attributes for each entry. For example, a common item of metadata stored in directories is whether an entry references a file or directory. Metadata stored by the block object layer 1404 for a directory block object could include additional file system information, such as ownership, permissions, and/or various access and modification times. Alternately, much or all of that metadata could be stored in data blocks within the directory's block object. In certain examples, "directory" table objects which can store rows or records can be used to store structured data representing directories as tables, rather than as blocks which the file service layer 1402 stores formatted directory information into. Such an alternate implementation may require that operations (e.g., snapshot and/or cloning operations) work as described, even if the implementation differs from how data is stored for directories versus how data is stored for files. Such "table" objects may still be referred to as "block" objects for purposes of the present application as long as they provide operations (e.g., snapshot and/or cloning operations) and can be modified and read as needed for the file service layer 1402.

In certain examples, the content of each individual file in a block object store may be stored as individual block objects 1408 that each represent the content of that file. The block objects 1408 may have additional metadata kept elsewhere or in the block object 1408 (such as in the first one or the first few blocks of a block object 1408). Metadata may include ownership, permissions, time stamps, and/or information such as a link count used with linked files that can be used to determine whether a file is linked from multiple directory entries, such as from multiple directories, and to determine when the last link to a file has been removed.

Each block object 1408, whether for a file or directory, may have an identity that can be used to name the block object 1408 that is referenced by a particular file or directory. This identity might be a name or part of a name. There may be a variety of namespace elements for block objects 1408, such as a pod, a tenant, a file system, etc. The identity stored in a directory for use by a file system to reference a block object 1408 may be used to generate a full name or unique block object identity from other information known by the file system. The file system itself could have an identity, for example, and a particular block object 1408 may be identified by combining the file system identity and an identity which is unique within the file system. The identity within the file system may, for example, be a simple number as is common in Unix-style i-node based file systems. The file system could in turn be within a pod or a tenant or some other grouping structure, such as a more traditional object-store style bucket. In a pod-based system, for example, the full identity of a block object 1408 could be determined using the pod, the file system, and the block object number. An advantage of such a scheme is that the scheme allows pods or file systems to be copied by logically copying all of a file system's block objects, or all of a pod's block objects, and the file system relative identifier stored in the file system's directory entries doesn't have to change.

For example, if a file system identifier is a 128-bit globally unique identifier, and a pod also has a 128-bit globally unique identifier, and within a file system the file system relative identifier for a file or directory is a 64-bit number, then the identity of a block object within a pod might be formed from the 128-bit file system identifier and the 64-bit file system relative number, but a directory entry might contain only the 64-bit number, which may be stored, for example, as an eight-byte binary value in a binary data structure.

As described above, path sets 1410 may be used to define a set of snapshot operations in a time order based on the time order in which the snapshot operations are applied in the file service layer 1402. The snapshot operations may be ordered in any suitable way, such as by numbering them such that the first snapshot of a path set is number 1, the second is number 2, and so on. Other ordering schemes may be used in other examples.

In certain examples, storage system 1400 may maintain a live version of each path set. The live version of a path set represents a dataset corresponding to the path set that is updated by changes such as writes to a block object, or there may be updates to certain types of metadata that reflect in the live version but that stay frozen in snapshots just as with the data content of the block object. A number may be assigned to the live version of the dataset, such that this number becomes a snapshot number when the next snapshot is taken. The numbered instances of the datasets may be called versions, and all but the current and highest numbered "live" version are effectively snapshots with frozen logical contents. So, with this, when a path set is first created, the current live version number may be version 1 and there may be no earlier versions. When the first snapshot is taken, the live version advances to version 2 and version 1 becomes a logically content frozen snapshot. When the second snapshot is taken, the live version advances to version 3, making version 2 also a logically content frozen snapshot, and so on. Accordingly, a block object 1408 may include a live version and a set of trailing, logically content frozen, versions.

A block object 1408 may be associated with some number of path sets. With respect to each associated path set, the block object 1408 may be seen to have a snapshot life span, stretching from a first version held in the block object 1408 to a last version held in the block object 1408. A block object 1408 can be dropped as "live" for a path set, such as because its file or directory has been removed, resulting in the previous snapshot being the last version. So, the block object 1408 can be viewed as having a range of valid path set versions corresponding to the "live" path set version when the block object 1408 becomes valid in the path set through to the version where the block object 1408 is no longer valid in the path set, meaning that the block object 1408 is valid up until the version before the block object 1408 was removed from the path set. If a block object 1408 can be removed from a path set, such as by moving a file or directory out of a path set, and then added back to the path set, such as by moving that file or directory back to the path set, then an implementation may support multiple valid ranges. Alternately, a file or directory might be deleted from the live managed directory in one version (while that version is live) and restored to the managed directory in a later version. This can also result in multiple valid ranges.

A block object 1408, with respect to snapshots and versions, may be viewed as having a "live" writable image and a trailing set of snapshot images representing prior points in time. If a block object 1408 represents a file or directory that has not been removed from the live file system, then the block object 1408 has a writable image. If the block object 1408 has snapshots that have not yet been removed, then the block object 1408 has snapshot images. If the block object 1408 has been removed from the file system and all the block object's 1408 reachable snapshots have been removed, then the block object 1408 can be removed from the storage system.

In certain examples in which a block object 1408 knows which path set it is in and in which the block object layer 1404 can understand which block objects are in each path set, block object layer 1404 may be configured to snapshot each block object 1408 in a path set whenever a snapshot is taken of the path set and associate each such block object snapshot with the path set snapshot. For a path set PS1, for example, block object layer 1404 may take a snapshot of each block object 1408 in PS1 each time PS1's version increases and then associate that snapshot with the now trailing path set version number. So, when PS1 adds a new snapshot to move from version 3 to version 4, block object layer 1404 takes a snapshot of each block object 1408 that is "live" in PS1 and associate that with PS1 version 3. Version 4 would essentially be the writable image of the "live" block object 1408. If the block object 1408 is also associated with a second path set, PS2, then the block object 1408 may have a separately numbered set of versions, and a different version number corresponding to its "live" writable image even though the block object 1408 itself only has one writable image which is shared across all path sets in which the block object 1408 is live.

But, in a file system with many files and directories, it is common that most (in some cases, the vast majority of) files in a file system or in a managed directory are not modified between any two snapshots. Indeed, in many file systems, many if not most files are written once and never modified again, though the directories containing those files are modified to list and reference new files as they are added and to remove reference to files as they are deleted. Given that these are common cases, given that file systems (and managed directories) could store millions if not billions of files (and thus millions if not billions of block objects), and given that there is likely some amount of work needed to handle snapshots of each block object 1408 in a path set, it makes sense to optimize the model to avoid doing that work whenever a path set version advances to result in a path set snapshot. This is where a valid range for an individual block object within a path set may apply.

In certain examples, the logical content and tracked logical metadata of a block object 1408 may remain unchanged until a request from the file service layer 1402 requests a change, either by altering snapshot-tracked logical metadata or by altering the content of the block object 1408, such as through a write request or through any other supported requests for altering block object content or version tracked metadata. As a result, if the version number of a path set advances, resulting in a path set snapshot, block object layer 1404 may not act on that for any block object 1408 until a request is received from the file service layer 1402 to modify the logical content or version tracked metadata of the block object 1408. That is, block object layer 1404 may wait for some operation on the block object 1408 itself, such as a modifying operation, before acting on the path set version having advanced. Such selective and/or delayed implementation of operations may conserve and facilitate efficient use of resources of storage system 1400.

One way to configure such selective and/or delayed implementation of operations is to associate a last modified version (e.g., a last known "live" version) for each block object's association with each of its associated path sets. A modification may be a change to the logical content or version tracked metadata for a block object 1408, or a removal of the block object 1408 from the path set, such as because the file was deleted from the live file system. Until such a modification or removal request comes in, no snapshot is taken of the block object 1408. For example, a file F1 in path set PS1 may be created and written and closed at version 5 of PS1, so that all of F1's current logical content is at PS1 version 5 and there are no snapshots of F1. The version of PS1 may be advanced from 5 to 6 to 7 to 8, resulting in versions 5, 6, and 7 being snapshots and version 8 being the live version of PS1. The block object 1408 for F1 would still be at version 5 for PS1. Block container layer 1404 may receive, from the file service layer 1402, modifying operation to the block object 1408 for F1 when the block object's 1408 version for PS1 is at version number 5 and PS1's version is at version 8. This difference would be detected and would then result in block object layer 1404 taking a snapshot of the block object 1408. The live version of the block object 1408 would advance to version 8 for PS1. If instead of receiving a request to modify F1, a request is received to remove F1 from PS1, block object layer 1408 may respond by taking a snapshot of the block object 1408 and marking the block object 1408 as having been removed at version 8 from PS1.

While the example described in the previous paragraph is directed to a file, the same principles may apply to a directory or other suitable service layer entity of a data storage service.

The snapshot of the block object 1408 that is taken in response to a modifying or deleting operation that came in after a path set version advanced (thus after the snapshot of the path set) may be assigned to all intervening path set version numbers since the last snapshot. For example, the snapshot of the block object 1408 may be assigned to versions 5, 6, and 7 in the present example. Alternately, the snapshot of the block object 1408 may be assigned to only one of those versions (for example version 5), which would then imply that versions 6 and 7 essentially share the same version as the snapshot for version 5 (as an example). Storing just one of the numbers may result in storing less metadata.

In certain examples, requests to merely examine or retrieve logical content or logical snapshot tracked metadata for a block object 1408, such as requests to read a file or list the content of a directory, may trigger creating a snapshot and advancing the version of a block object 1408 for a path set if the version of the block object 1408 does not match a path set's "live" version. In other examples, the current content of the block object 1408 may be examined or retrieved without triggering the creation of block object snapshots. In such other examples, snapshots of block objects 1408 may be taken just in time, i.e., just before being modified or deleted.

Accessing snapshots of block objects 1408 may be similarly configured. Snapshot access may have a context defined by a combination of a managed directory and a path set, which may result in a block object 1408 being accessed in the context of a particular path set version number. These version numbers may be created on access if they do not yet exist, or path set version numbers may be mapped to whatever path set versions the block object 1408 has acted on as a result of modifying, deleting, or path set-changing move or link operations. For example, in the example described above, a request to access snapshot 6 or 7 of PS1 would result in accessing version 5 of PS1. If version 7 of PS1 is accessed before modifications result in a snapshot and the advancement of the block object 1408 to PS1 version 8, then the block object 1408 may consider version 5 of the block object 1408 to be modifiable in that version 5 of the block object 1408 will not yet have been converted into a snapshot.

This could result in a race condition, though, if care is not used to avoid such a race condition. The race condition may occur as a result of accessing a non-snapshot version of the block object 1408 on the presumption that the non-snapshot version of the block object 1408 is unchanged while at the same time a modifying operation comes in resulting in the creation of a snapshot and the advancing of the "live" version number associated with the path set to a new number. The modified data may be inadvertently read if: the retrieval through snapshot version 7 first checks that the live version has not advanced; then, the modifying operation makes a snapshot, advances the live version, and then modifies the block object; and then, the retrieval operation through snapshot version 7 reads the live block object on the presumption that it is still at path set PS1 version 5. This race condition may be avoided by preventing simultaneous operations or by taking a snapshot, thus freezing version 5, and advancing the block object to 8 before reading from version 5 through snapshot version 7.

Another way to avoid such a race condition is to use an implementation where snapshots of block objects 1408 are not so much created as new "live" versions are created, leaving previous versions behind as effective snapshots. In that model, when a modification happens at version 8, a snapshot is not created that then becomes version 5, but instead version 5 is simply left behind as now unchanging and a new version 8 starts being written that no longer modifies version 5. Then, the snapshot version 7 retrieval of content through version 5 will be safe from race conditions involving creation of a snapshot. This approach may avoid causing a race condition without having to implement some locks to avoid simultaneous operations and without having to create unnecessary snapshots.

In this approach, if a block object 1408 is associated with two path sets and one advances and the other does not, then there may be confusion where for one path set the current "live" version freezes into a snapshot and for another path set the current "live" version remains modifiable. For example, in the above case where PS1 advances from version 5 to version 6, and then 7, and then 8, and is then written, for another path set that the block object 1408 is associated with, say PS2, the path set version has remained at, say, 20, that whole time without advancing. The block object 1408 may freeze at version 5 of PS1 and advance to a new writable image for version 8 of PS1, but the block object 1408 cannot do the same with version 20 for PS2 because that should still be writable. This potential issue may be handled, though, by manipulating the relationship between internal versions of the block object 1408 and versions associated with path sets. For example, there could be an internal version of a block object 1408 that advances every time a snapshot is left behind that results from a modifying operation. The "live" version of any path set would then be updated to track these advances in the block object 1408, while snapshots would not. So, a block object 1408 may be at internal version 100 when the first modifying operation is received after PS1 advances to version 8, PS1 version 5 for the block object 1408 may be left behind as referencing version 100, the block object 1408 itself may then advance to internal block object version 101, PS1 version 8 for the block object 1408 may advance to internal block object version 101, and PS2 version 20 would be modified to advance to internal block object version 101 as well.

In this approach, reads of a block object 1408 through a version, say version N, of a path set (either the live version or a snapshot version) may either read from the internal version of the block object 1408 that is associated with path set version N for the block object 1408, or may read from the most recent path set version known to the block object 1408 that is prior to version N.

As described previously, in some implementations block objects 1408 can be removed from and then added back to path sets and may have ranges of validity from when first added to a path set (such as when the corresponding file or directory is created) to when removed from a path set (such as when the file or directory is deleted). This can result in ranges of validity of path set versions for a particular block object 1408, including multiple ranges in some implementations. When traversing through a snapshot directory tree from a snapshot of a managed directory, the validity ranges do not present a problem. Any particular file or directory either exists in that snapshot or does not exist in that snapshot, and if a particular file or directory was not in the directory tree when that snapshot was taken, then the file or directory will not exist during that traversal either. But this may complicate the presentation of snapshots when viewing what snapshots of a file or directory are available from other files and directories, such as through a " . . . snapshots . . . " namespace on a subdirectory or file described earlier as an example snapshot presentation model. Only valid snapshots should be listed in such cases, otherwise there could be referential integrity issues such as from entering a version of a directory that shouldn't exist in the managed directory and then accessing the parent directory in that context, which might not exist at all because it was first created after that snapshot.

As long as a block object's 1408 most recent valid range for a path set is marked as now invalid when the block object 1408 is removed from a path set, and a new range for a path set is established when a block object 1408 is added to a path set, including when adding back to a path set that it had been in previously, the valid snapshots relative to any path set can be deduced. To continue the previously described example, if instead of being modified in PS1 version 8, the file represented by the block object 1408 had been moved out of the path set, then the block object 1408 would be updated to indicate that the block object 1408 was valid for PS1 from starting at version 5 and was invalid for PS1 starting at version 8. If some set of new snapshots are taken of PS1, advancing it to version 12, then if the file is added back to PS1, then a new valid range will be established starting at version 12. Note that if the file still has not been modified, then the content for version 12 is still in the internal version associated with version 5, though it may make sense to reference that internal version from a version 12 rather than relying on uses of version 12 to realize the content really comes from version 5 (though that would also work). The validity ranges may provide a way of listing and accessing only those snapshots of a path set that should be valid for a particular file or directory. So, in this example, a program that determines the content of the " . . . snapshots . . . " program implemented directory for a file or directory that is not valid from version 8 through version 11 may see from the block object's 1408 valid ranges for the path set that versions 8 through version 11 are not valid and can then avoid listing the corresponding managed directory snapshots.

Block containers 1408 can be inexpensively versioned in an implementation that supports very low overhead snapshots. However, relating together all the files and directories within a particular directory can be an expensive operation at least because doing so may entail reading all the directories in a tree walk that could involve reading and analyzing entries in thousands or millions of directories and linking to thousands to billions of block objects 1408 representing each individual file.

But certain cases are inexpensive. One example is taking snapshots of individual files. Taking a snapshot of an individual file involves snapshotting one block object 1408, tracking that a snapshot took place, and providing a way to view the snapshot. To handle this, block objects 1408 could list, and provide names or numbers for, snapshots that are not related to path sets. A variant approach is to give a block object 1408 a private path set that works the same as regular path sets but that is local to that individual block object 1408. This private path set could be provided even for block objects that represent files rather than directories. These snapshots might be presented only through that file or directory's individual snapshot presentation model (such as through the file's " . . . snapshots . . . " program implemented directory). Or, there may be some way of listing and accessing from the vantage point of a directory the available versions of all that directory's contained files and directories separately or in addition to listing and accessing versions from the containing directory itself.

One aspect that may be accounted for at the interface between the file service layer 1402 and the block object layer 1404 is that the file service layer 1402 may need to understand whether it is accessing the live version of a block object or a snapshot version of a block object, and it may be configured to do so with client protocols that keep file access context in client-held identifiers. And, if Posix-style (Unix, Linux) client access is desired, a live version of a file versus each snapshot of a file may have a different reported 64-bit i-node number within each exported file system.

Ignoring the i-node issue, identifiers can simply include snapshot information from the path set, such as an identifier for the path set itself, and the number or other identifier of a snapshot of the path set. These identifiers can be reported for directory listings within a particular snapshot, for example, and then can be supplied back to the file service layer 1402 from a client interested in accessing a particular file or directory within that directory.

Handling the i-node number issue can be more complicated. Posix generally expects i-node numbers to be unique within a presented file system, and snapshots of files and directories are essentially additional unique files from that perspective. As a result, all snapshots of all files and directories may have unique i-node numbers within a file system, so storage system 1400 may be configured to avoid clashes of these i-node numbers. One solution is to make snapshots of files into distinct file systems from the standpoint that each snapshot has a distinct file system identifier. This could work in some cases, but some distributed file system protocols and client implementations (such as NFS v3) may support this poorly. An alternative is to carve out ranges of numbers from the 64-bit i-node number space to be used for individual path set snapshots. For example, 36 bits of each 64-bit i-node number may be associated with a particular file or directory, and 28 bits of each 64-bit i-node number may then be associated with a particular path set snapshot (forming a snapshot number space embedded within the i-node number). This would allow for 64 billion files and directories, and 256 million path set snapshots in some implementations. Note that every snapshot of every path set may require a distinct number, though numbers could be reused from deleted snapshots.

In such a scheme, live files and directories may be associated with particular i-node snapshot number space, for example, 0. There could be a simple mapping from the live i-node snapshot number space to a particular path set snapshot's snapshot number space. For example, an i-node number in the live i-node snapshot space might map to a snapshot by using the number within the live i-node snapshot space and using that number within the path set snapshot's snapshot number space. So, if we use the notation snapshot-space.i-node-number as a nomenclature for an i-node number within a snapshot number space, then if snapshot number space 0 means the live file system and snapshot 5 of path set PS1 has a snapshot number space of 27, then a file with live i-node 300 might be 0.300 for the live version of the file and 27.300 for the version of the file in path set PS1 snapshot 27. Note that if a file or directory is deleted from the live file system, it may no longer be present in the live i-node snapshot number space, but the file may still exist in snapshots. As a result, storage system 1400 may be configured to ensure that a live i-node number is not reused until all snapshots of the corresponding block object have been deleted.

Other mapping schemes are reasonably possible, depending on the file system implementation, file system network access protocols, and file system network client implementations. Generally, a mapping scheme should map file and directory identifiers to identifiers for files in a particular path set snapshot. In certain examples, the mapping scheme should be straightforward to determine which block object corresponds to a particular file service layer identifier. In the i-node number scheme provided above, for example, the i-node number 27.300 corresponds to the block object with number 0.300, even if the file for that block object has been deleted from the file system.

Note that the result of reading a directory differs between reading a live directory and reading a snapshot of a directory, at least because the identifiers of referenced files and directories stored in the directory's block object may identify the live files and directories. As a result, the file service layer 1402 may be configured to interpret those identifiers and convert them into identifiers appropriate for the snapshot. So for example, in the case described in the previous two paragraphs, a directory might store an i-node number 0.300 for the particular file described, but when reading the directory in the context of the snapshot whose i-node snapshot number space is 27, the file system service layer may convert to that to 27.300. If directories store different kinds of identifiers than such i-node numbers, then an appropriate different transformation may be used instead.

Figure 17:
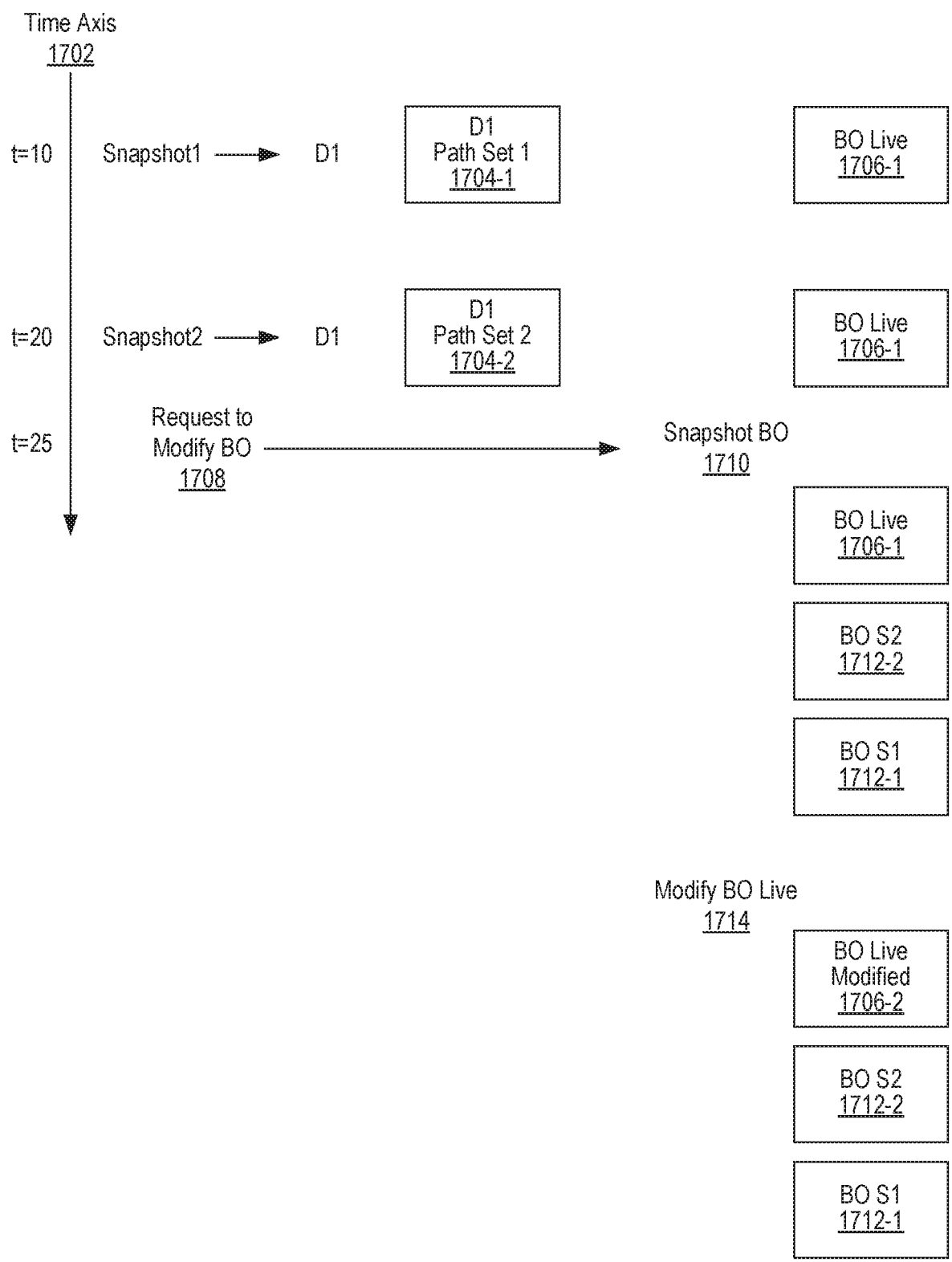
FIG. 17 illustrates an example of establishment and use of path sets to coordinate implementation of snapshots on block objects in accordance with some embodiments of the present disclosure.

FIG. 17 illustrates an example of a storage system establishing and using versions of a path set to coordinate implementation of snapshot operations. In FIG. 17, a time axis 1702 depicts a time order in which operations are performed. The time axis 1702 may represent time order using any suitable units, such as counter values and/or time values. The operations may be performed by a storage system or any component(s) thereof, including any of the example storage systems and components described herein.

As shown, at a time value of 10 (t=10), a first snapshot, "Snapshot1," is taken of directory D1. In response, a version of a path set 1704-1 for D1 is established. The version of the path set 1704-1 may include information indicating its association with Snapshot1 and a collection of files and directories that are in the directory tree of D1 at the time Snapshot1 is applied to D1, as is represented by the first version of the path set 1704-1 positioned in line with time t=10. Those files and directories may include a file that is implemented by a block object 1706-1. At the time Snapshot1 is applied to D1, block object 1706-1 may include a live version of itself and no snapshot versions, as is represented by BO Live 1706-1 positioned at time t=10.

At a time value of 20 (t=20), a second snapshot, "Snapshot2," is taken of directory D1. In response, a second version of the path set 1704-2 for D1 is established. The second version of the path set 1704-2 may include information indicating its association with Snapshot2 and a collection of files and directories that are in the directory tree of D1 at the time Snapshot2 is applied to D1, as is represented by the second version of the path set 1704-2 positioned in line with time t=20. Those files and directories may still include the file that is implemented by block object 1706-1. At the time Snapshot2 is applied to D1, block object 1706-1 may still include a live version of itself and no snapshot versions, as is represented by BO Live 1706-1 positioned at time t=20.

At a time value of 25 (t=25), a request 1708 to modify block object 1706-1 is received. The requested modification may include any requested change to the data or metadata of the block object 1706-1, including a request to delete the block object 1706-1 or its data or metadata, or a request to write to the data or metadata of the block object 1706-1. In response to the request 1708, a storage system may determine whether to take one or more snapshots of the block object 1706-1 before performing the requested modification. The determination may be made based on the versions of the path set of D1 and on any snapshot versions of the block object 1706-1. For example, the storage system may determine that block object 1706-1 has no snapshot versions related to D1, that the first version of the path set 1704-1 indicates a first pending snapshot of D1 when block object 1706-1 is included in D1, and that the second version of the path set 1704-2 indicates a second pending snapshot of D1 when the block object 1706-1 is included in D1.

Based on these determinations, the storage system may create 1710 one or more snapshots of the block object 1706-1 in order to implement the first and second pending snapshots of D1 before modifying the block object 1706-1. This may include creating snapshot versions of the block object 1706-1. For example, the storage system may create a first snapshot version 1712-1 that corresponds to Snapshot1 of D1 and a second snapshot version 1712-2 that corresponds to Snapshot2 of D1. After these snapshots are created, the block object may include a live version 1706-1 and snapshot versions 1712-1 and 1712-2. Alternatively, the storage system may create a single snapshot version of the block object that corresponds to both pending snapshots of D1 (because the data of the block object did not change between the pending snapshots, one snapshot can be used for both pending snapshots).

After creating the snapshots of the block object, the storage system may apply 1714 the requested modification to the block object by applying it to the live version of the block object. After the modification is applied, the block object may include a modified live version 1706-2 and snapshot versions 1712-1 and 1712-2 (or just one snapshot version in an alternative implementation).

Figure 18:
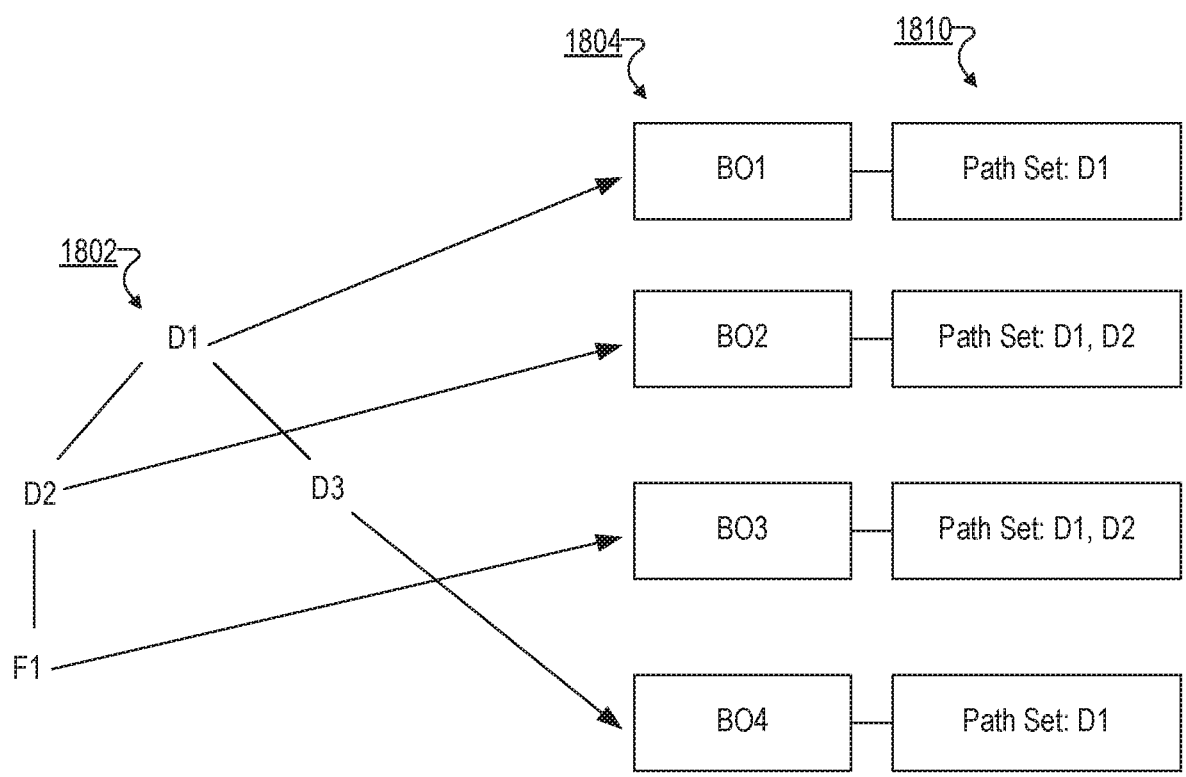
FIG. 18 illustrates an example of path sets in accordance with some embodiments of the present disclosure.

Another approach to establishing and using path sets to coordinate implementation of operations such as snapshots will now be described in relation to storage system 1400. FIG. 18 illustrates a directory hierarchy 1802 that includes directory D1, directory D2, directory D3, and file F1 arranged in a hierarchical configuration having D1 as the top node, D2 and D3 as children nodes of D1, and F1 as a child node of D2. D1, D2, D3, and F1 may be managed by file service layer 1402. D1, D2, D3, and F1 may be implemented by block objects (BOs) 1804 that include BO1, BO2, BO3, and BO4, which may be managed by block object layer 1404.

Storage system 1400 may establish path sets 1810 for the BOs 1804. The path sets may be entity-level path sets in that each of the BOs 1804 may have a corresponding path set established and associated with that BO 1804. A path set may indicate any managed directories associated with a BO. For example, D1 and D2 may be designated as managed directories for use with path sets and/or certain operations (e.g., snapshots). D1 and D2 may be assigned path identifiers (e.g., "D1" and "D2") for use in the path sets.

In the example shown in FIG. 18, a path set for BO1 indicates that BO1 is associated with a file storage element in a directory tree of D1. In this case, BO1 represents D1, which is part of its own directory tree. A path set for BO2 indicates that BO2 is associated with a data storage element in directory trees of D1 and D2. In this case, BO2 represents D2, which is part of its own directory tree and the directory tree of D1. A path set for BO3 indicates that BO3 is associated with a data storage element in directory trees of D1 and D2. In this case, BO3 represents F1, which is part of the directory tree of D1 and the directory tree of D2. A path set for BO4 indicates that BO4 is associated with a data storage element in the directory tree of D1. In this case, BO4 represents D3, which is part of the directory tree of D1. D3 and D4 may not be considered to be part of their own directory trees for one or more reasons, such as D3 being a file rather than a directory and D4 being a directory that is not designated a managed directory.

Storage system 1400 may be configured to establish and maintain entity-level path sets such as path sets 1810 in any suitable way. For example, storage system 1400 may establish path sets for block objects 1804 that implement files and directories of a directory hierarchy 1802 of a file system when the files and directories are created and may update the path sets 1810 when configurations of the files and directories implemented by the block objects 1804 change (which configuration changes in the file service layer 1402 may cause block object layer 1404 to update metadata for the block objects 1804). Storage system 1400 may be configured to use such path sets 1810 to coordinate implementation of operations on the block objects 1804. For example, snapshots applied to D1 and/or D2 by file service layer 1402 may be selectively implemented on block objects 1804 based on path sets 1810.

Figure 19:
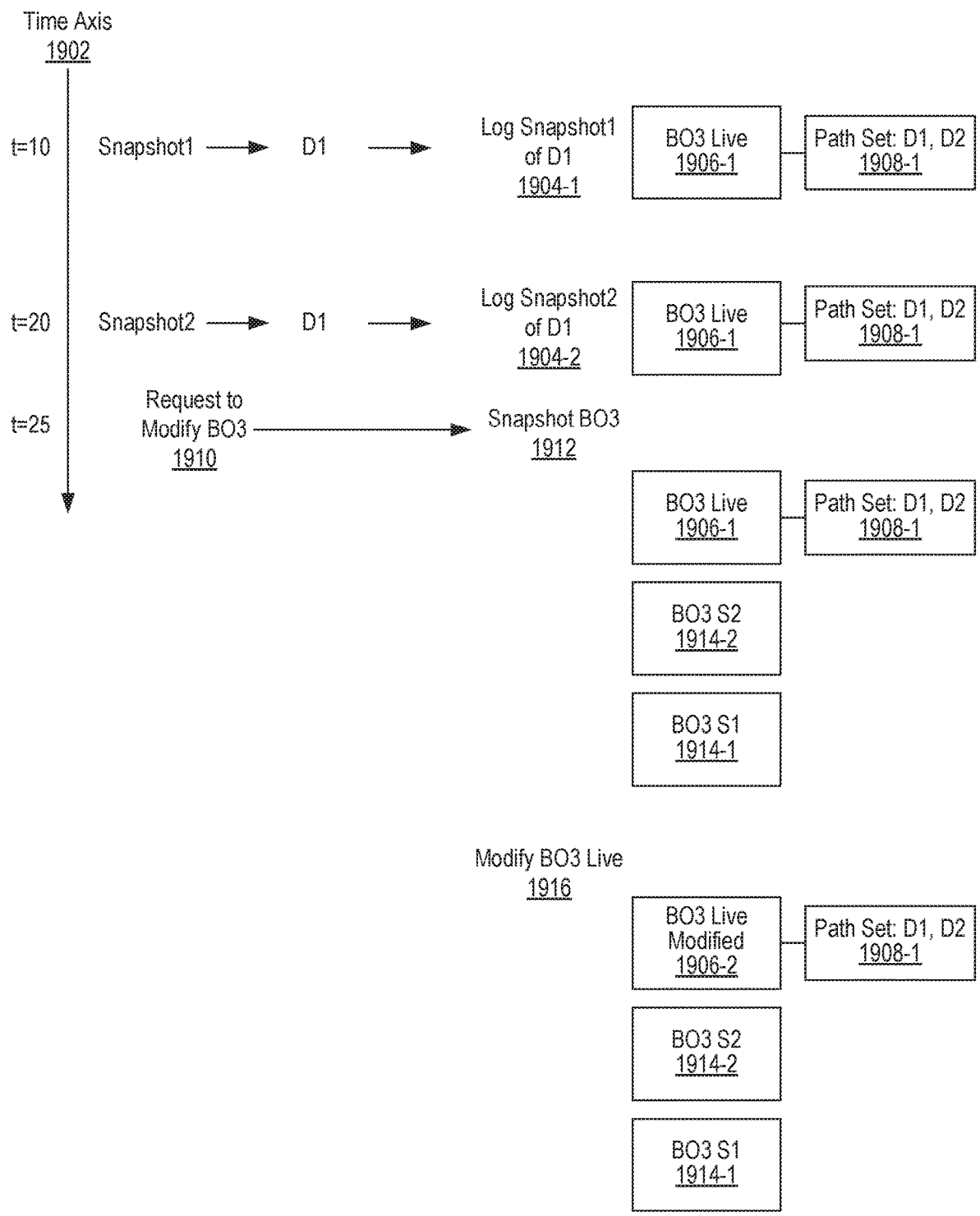
FIG. 19 illustrates an example of establishment and use of path sets to coordinate implementation of snapshots on block objects in accordance with some embodiments of the present disclosure.

FIG. 19 illustrates an example of a storage system using a path set 1810 to coordinate implementation of snapshot operations on a block object 1804. In FIG. 19, a time axis 1902 depicts a time order in which operations are performed. The time axis 1902 may represent time order using any suitable units, such as counter values and/or time values. The operations may be performed by 1400 storage system or any component(s) thereof, or by any other appropriately configured storage system of component(s) thereof.

As shown, at a time value of 10 (t=10), a first snapshot, "Snapshot1," is taken of directory D1. In response, the first snapshot operation applied to D1 is logged 1904-1. The logging of the operation may include receiving and storing any information about the operation, such as a time the operation is applied to D1 and an association of the operation to D1. At the time Snapshot1 is applied to D1 and/or logged, a block object (BO3) that represents file F1 in directory hierarchy 1802 may include only a live version of BO3, as is represented by BO3 Live 1906-1 positioned at time t=10. A path set 1908-1 is associated with BO3, such as by being associated with BO3 Live 1906-1 as shown in FIG. 19.

At a time value of 20 (t=20), a second snapshot, "Snapshot2," is taken of directory D1. In response, the second snapshot operation applied to D1 is logged 1904-2. The logging of the operation may include receiving and storing any information about the operation, such as a time the operation is applied to D1 and an association of the operation to D1. At the time Snapshot2 is applied to D1 and/or logged, BO3 includes only a live version of BO3, as is represented by BO3 Live 1906-1 positioned at time t=20. The path set 1908-1 associated with BO3 remains unchanged at time t=20.

At a time value of 25 (t=25), a request 1910 to modify BO3 is received. The requested modification may include any requested change to the data or metadata of BO3, including a request to delete BO3 or its data or metadata, or a request to write to the data or metadata of BO3. In response to the request, storage system 1400 may determine whether to take one or more snapshots of BO3 before performing the requested modification. The determination may be made based on the path set 1908-1 associated with BO3, any snapshot versions of BO3, and logs of snapshots applied in file service layer 1402. For example, storage system 1400 may determine that BO3 has no snapshot versions related to D1, that path set 1908-1 indicates the BO3 is associated with D1 and D2, and that pending snapshots of D1, Snapshot1 and Snapshot2 have been applied to D1. The determination may be made in any suitable way, such as by storage system 1400 identifying D1 and D2 in the path set 1908-1 associated with BO3, querying logged snapshots to identify any pending snapshots of D1 and D2, and for any identified pending snapshots of D1 and D2 determining whether any matching snapshot versions of BO3 have already been taken or have yet to be taken. In this example, storage system 1400 may identify pending snapshots Snapshot1 and Snapshot2 as being associated with D1 indicated in path set 1908-1 and that corresponding snapshots of BO3 have yet to be taken for Snapshot1 and Snapshot2.

Based on these determinations, storage system 1400 may create 1912 one or more snapshots of BO3 in order to implement the first and second pending snapshots of D1 in the block object layer 1404 before modifying BO3. This may include creating snapshot versions of BO3 Live 1906-1. For example, storage system 1400 may create a first snapshot version 1914-1 that corresponds to Snapshot1 of D1 and a second snapshot version 1914-2 that corresponds to Snapshot2 of D1. After these snapshots are created, BO3 may include a live version 1906-1 and snapshot versions 1912-1 and 1912-2.

Alternatively, storage system 1400 may create a single snapshot version of BO3 that corresponds to both pending snapshots of D1 (because the data of BO3 did not change between the pending snapshots, one snapshot can be used for both pending snapshots).

After creating the snapshots of BO3, storage system 1400 may apply 1916 the requested modification to BO3 by applying it to BO3 Live 1906-1. After the modification is applied, BO3 may include a modified live version 1906-2 and snapshot versions 1914-1 and 1914-2 (or just one snapshot version in an alternative implementation). If the modification does not remove BO3 from D1 or D2 (or another managed directory), path set 1908-1 of BO3 may remain unchanged. If the modification removes BO3 from D1 or D2 (or another managed directory), storage system 1400 may modify path set 1908-1 to reflect the change.

Figure 20:
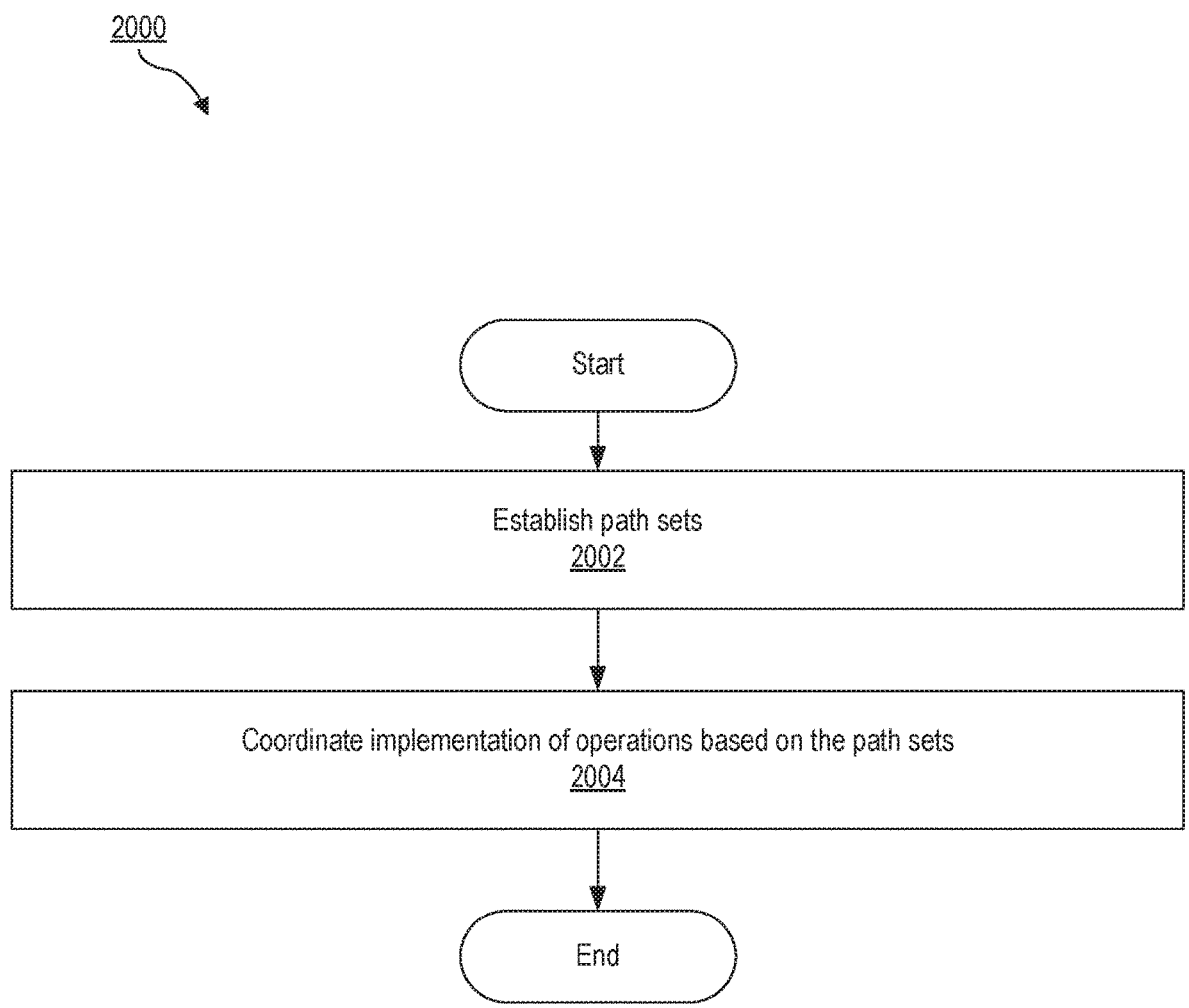
FIGS. 20-22 illustrate example methods of snapshot management for a storage system in accordance with some embodiments of the present disclosure.
Figure 21:
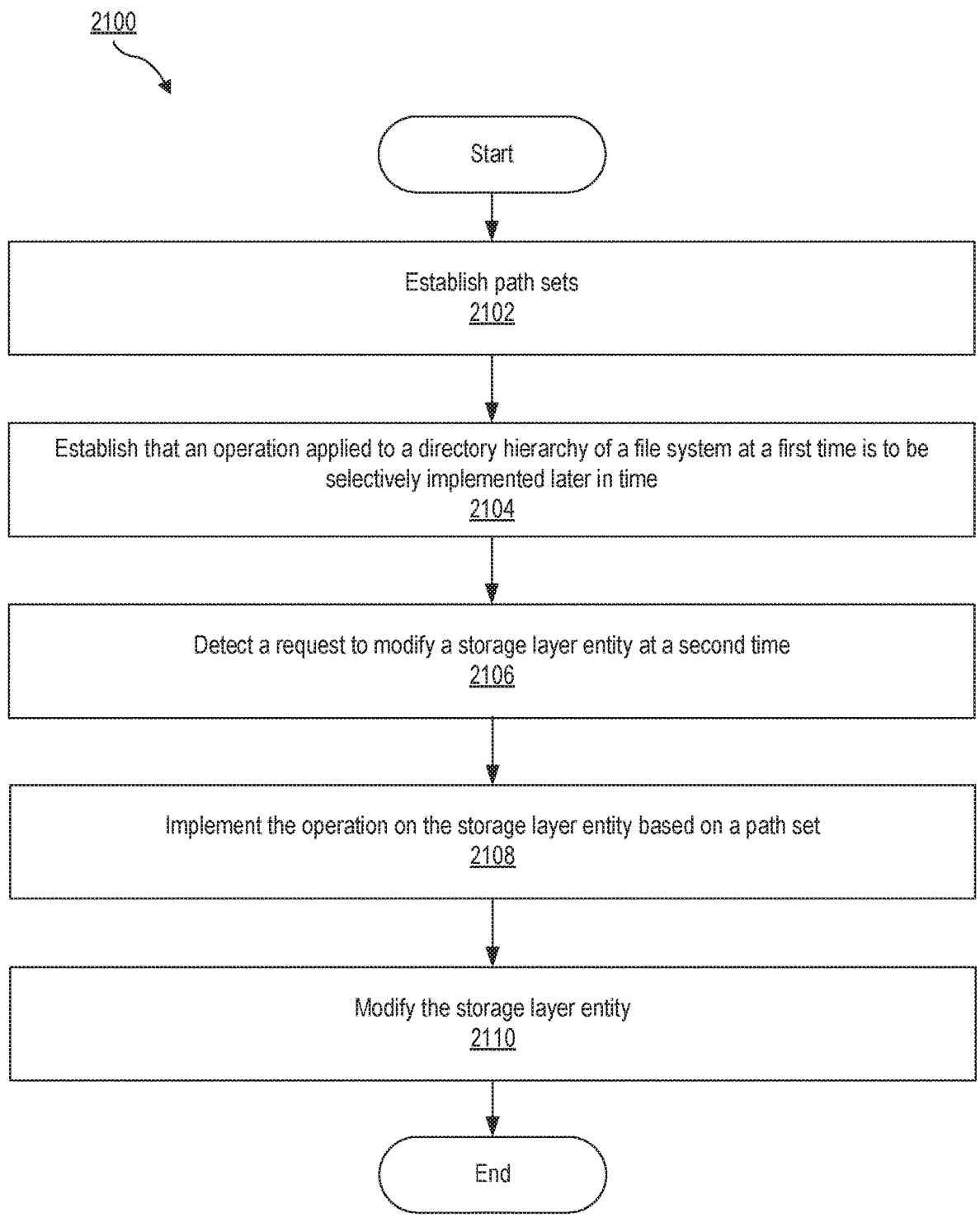
Figure 22:
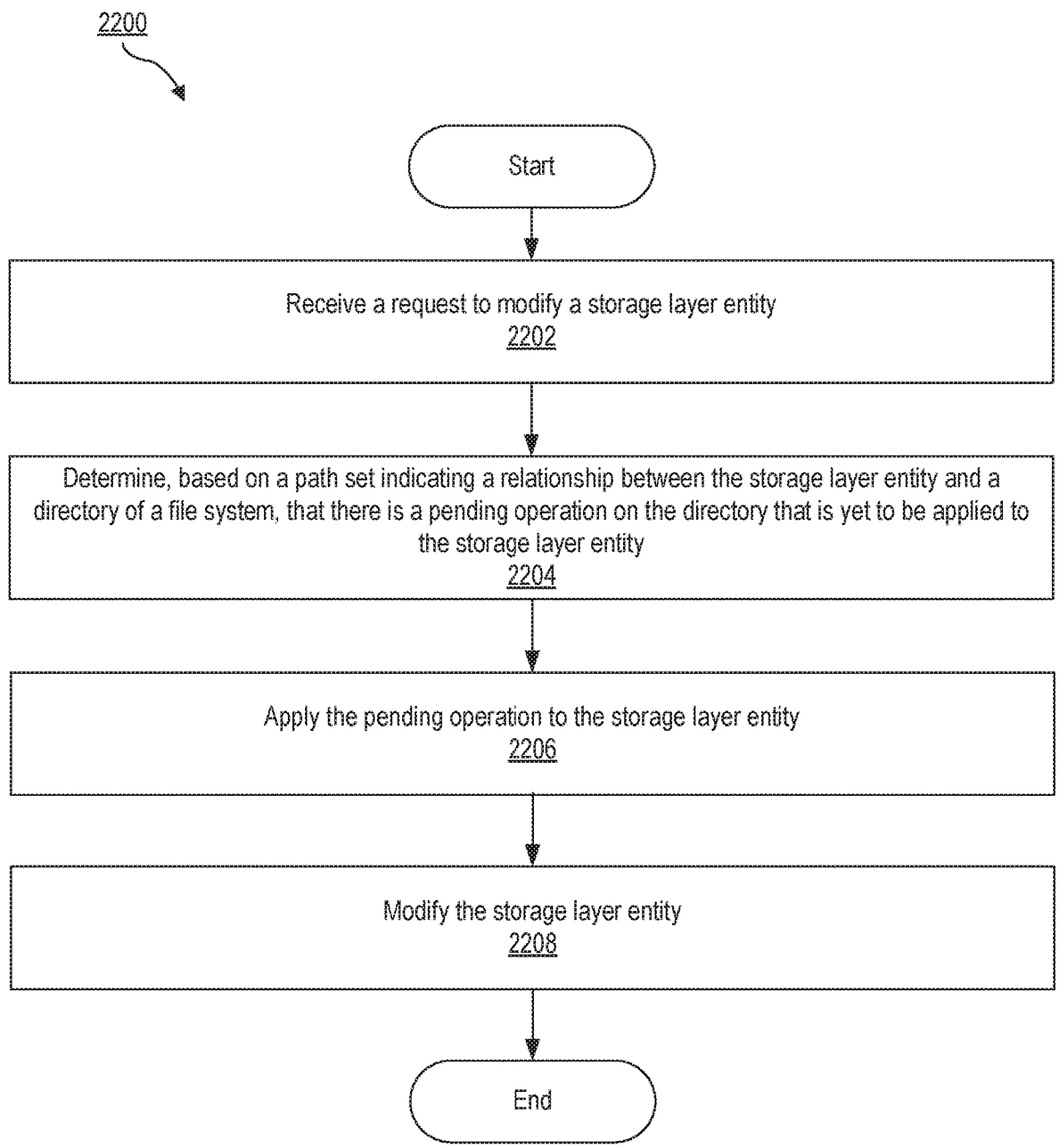

FIGS. 20-22 depict illustrative methods. While FIGS. 20-22 illustrate example operations according to certain embodiments, other embodiments may omit, add to, reorder, and/or modify any of the operations shown in FIGS. 20-22. Operations of any of the illustrative methods may be combined with operations of any of the other methods in any suitable way. One or more of the operations shown in FIGS. 20-22 may be performed by a storage system, any components included therein, and/or any implementation thereof.

FIG. 20 depicts an illustrative method 2000. In operation 2002, a storage system establishes path sets. The storage system may establish (e.g., create and maintain) the path sets in any suitable way, including in any of the ways described herein. The path sets may be configured in any of the ways described herein or in another suitable way.

In operation 2004, the storage system coordinates implementation of operations based on the path sets. Operation 2004 may be performed in any suitable way, including in any of the ways described herein. For example, the storage system may use the path sets to coordinate selective and/or delayed implementation, in a storage layer of the storage system, of operations that have been applied to a service layer of the storage system.

FIG. 21 depicts an illustrative method 2100. In operation 2102, a storage system establishes path sets. The storage system may establish (e.g., create and maintain) the path sets in any suitable way, including in any of the ways described herein. The path sets may be configured in any of the ways described herein or in another suitable way.

In operation 2104, the storage system establishes that an operation applied to a directory hierarchy of a file system at a first time is to be selectively implemented later in time. Operation 2104 may be performed in any suitable way, including in any of the ways described herein. For example, the storage system may detect and/or log an application of an operation (e.g., a snapshot operation) to the directory hierarchy in a service layer of the storage system.

In operation 2106, the storage system detects a request to modify a storage layer entity (e.g., a block object) at a second time. Operation 2106 may be performed in any suitable way, including in any of the ways described herein. For example, a storage layer of the storage system may receive a request to modify the storage layer entity.

In operation 2108, the storage system implements the operation on the storage layer entity based on a path set. Operation 2108 may be performed in any suitable way, including in any of the ways described herein. For example, the storage system may determine, based on the path set, that the operation applies to the storage layer entity and has not yet been implemented on the storage layer entity. Based on this determination from the path set, the storage system may then implement the operation on the storage layer entity in response to detecting the request to modify the storage layer entity.

In operation 2110, the storage system modifies the storage layer entity. Operation 2104 may be performed in any suitable way, including in any of the ways described herein. For example, the storage system may modify the storage layer entity in response to the request detected in operation 2106 only after the storage system has implemented the operation on the storage layer entity in operation 2108 (in cases where the storage system determines the operation is to be implemented on the storage layer entity).

FIG. 22 depicts an illustrative method 2200. In operation 2202, a storage system receives a request to modify a storage layer entity (e.g., a block object). Operation 2202 may be performed in any suitable way, including in any of the ways described herein. For example, a storage layer of the storage system may receive the request to modify the storage layer entity from a service layer of the storage system.

In operation 2204, the storage system determines, based on a path set indicating a relationship between the storage layer entity and a directory of a file system, that there is a pending operation on the directory that is yet to be applied to the storage layer entity. Operation 2204 may be performed in any suitable way, including in any of the ways described herein.

In operation 2206, the storage system applies the pending operation to the storage layer entity. Operation 2206 may be performed in any suitable way, including in any of the ways described herein. Operation 2206 may be performed in response to the determination in operation 2204 and before the request to modify the storage layer entity is implemented on the storage layer entity.

In operation 2208, the storage system modifies the storage layer entity. Operation 2208 may be performed in any suitable way, including in any of the ways described herein. Operation 2206 may be performed in response to the determination in operation 2204 and after the pending operation is applied to the storage layer entity.

Path sets may be established and used in any of the ways described herein and/or in other suitable ways. As an example, path sets may be used for physical space accounting operations, such as to determine how much space may be reclaimed when a directory is deleted from a file system. As another example, path sets may be used to support nested snapshots of nested directories of a file system. For instance, snapshots may be taken of each managed directory in a file system, including of a root directory (which may be a managed directory by default) and any subdirectories that are managed directories. In certain examples, snapshots and path sets may be applied to any directories instead of being limited to managed directories or certain directories.

An interesting issue can come up with space accounting in storage systems that are capable of accounting for deduplication, clones, and other forms of physical block sharing between block file systems and block objects. Specifically, when considering physically stored blocks (and possibly the space that they consume after compression or other data reduction techniques, and possibly including the additional capacity such as that required to make the stored blocks recoverable from faults) reporting for blocks that could be shared between multiple logical addresses within the same or different logical storage entities (files, objects, block objects, volumes, managed directories, file systems, pods, etc.) a distinction can be made between physically stored blocks that are shared beyond the logical storage entity and physically stored blocks that are not shared beyond the logical storage entity. For example, a volume may include some number of blocks that are unique to that volume (there may be multiple references within the volume, but the physical blocks are not shared with other storage entities managed within the storage system) and some number that are not unique to that volume (the physical blocks are shared with at least one other storage entity managed within the storage system, which could be another volume or could be some other kind of entity including a file, object, or block object). Reporting of shared blocks may be broken down further to account for the fraction of references from the particular logical entity, such as the volume in this example. For example, there could be a first volume and a second volume where the first volume has ten unique blocks, the second volume has five unique blocks, and the first volume includes two references to a particular shared block, and the second volume includes three references to the particular shared block. In this example, the first volume has ten unique blocks and one shared block, and the second volume has five unique blocks and one shared block. Further, the first volume might be considered to include 40% of the references to the shared block and the second volume might be considered to include 60% of the references to the shared block. There are many other ways that this accounting might occur, but there is at least a fundamental distinction between unique blocks for a logical storage entity and shared blocks between logical storage entities.

Specifically in the context of managed directories and path sets, space accounting may be provided on a managed directory basis to describe unique versus shared space consumed by all files that are part of a managed directory, such that unique and shared physical space consumption is reported in some useful way, possibly extended to some useful description of space consumed by snapshots of files and managed directories.

In a block object-based storage system with path sets linking together block objects associated with a particular managed directory, the storage system may provide accounting for unique versus shared blocks as described above for managed directories. This can be done by having the storage system perform the logical calculations based on logical references to stored blocks as described above but then doing so for each path set associated with each block object. By accumulating for each path set the accounting of unique versus shared blocks and, depending on the implementation, possibly further accounting for their associated physical capacity from various combinations of data reduction and overhead for fault recovery, managed directories can be provided with this kind of granular information on actual space consumption. This is particularly interesting and/or useful for multi-level managed directories where shared blocks at a lower layer in a hierarchy of managed directories might well be unique blocks at a higher layer, as one managed directory that is a subdirectory within a higher managed directory might share duplicate blocks, such as through a deduplication process or through block or block object virtual copy or clone operations, with block objects in another managed directory that is a subdirectory within the same higher managed directory.

An example where these kinds of multi-directory-level calculations can become particularly interesting and/or useful is when a lower-level managed directory is entirely cloned to another lower-layer managed directory beneath the same higher-level managed directory. In this case, all of the blocks in both lower-level managed directories become shared blocks, possibly with fractional assignment of capacity to each of the two managed directories, yet the higher-level directory's counts of shared and unique blocks would remain largely unchanged. As blocks are written to block objects in each of those two lower-level managed directories or as new files are added or deleted, or as other modifications result in changes to shared and unique blocks and calculated capacities, the two lower-layer directories will diverge from each other while the higher-layer directory may continue to accumulate counts of unique blocks, shared blocks, and calculated capacities based on the combination of the higher-layer managed directory's combined block objects.

U.S. provisional patent application 63/077,259, filed Sep. 10, 2020 and which is already incorporated herein by reference, describes examples of space accounting. Those examples may be implemented and/or otherwise combined with path sets in any way suitable for space accounting. As an example of a way of referencing shared versus unique blocks, and for cloning ranges of logical blocks or other logical storage elements, see U.S. patent application Ser. No. 15/842,850 filed Dec. 14, 2017, the contents of which are hereby incorporated by reference. In particular, the '850 patent application describes an illustrative model of leaf and composite logical extents and a model for referencing shared blocks by content identifier from those extents. The model is suitable for cloning, snapshots, and inline and post process deduplication.

Calculations of unique and shared blocks, and possibly the partial attribution of stored capacity based on the pattern of block shares within and between path sets (and thus within and between managed directories) can be useful for various purposes. This can be provided to users to give them an understanding of space consumption that takes shared and unique space into account. This can be used as part of a charge-back model where clones and deduplication can reduce the amounts charged back, or where fractional attribution of shared blocks can be included in charge-back calculations. These can also be used as part of a quota model, whereby operations that would increase unique and fractionally attributed capacity can be prevented or can yield a warning of some kind. In such a case, a quota may apply at a higher-layer directory, allowing any amount of cloning, virtual copying, or duplicate content within and across the various objects and lower-layer directories (including lower-layer managed directories) within that higher-layer directory without that cloned, copied, or duplicate content adding significantly or at all against the quota. Metadata overhead may still add some amount to such a quota.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A data storage system comprising:
    a memory storing instructions; and
    a processor communicatively coupled to the memory and configured to execute the instructions to:
        establish a path set data structure that represents a collection of storage layer entities that store data representative of service layer entities whose pathnames begin with a common path to a directory of a file system; and
        coordinate, based on the path set data structure and on operations applied to the directory of the file system, implementation of the operations on the storage layer entities represented by the path set data structure, wherein the coordinating implementation of the operations on the storage layer entities comprises using the path set data structure to delay implementation of one or more of the operations on one or more of the storage layer entities.

2. The data storage system of claim 1, wherein:
    the service layer entities comprise files and directories within a directory hierarchy of the directory of the file system; and
    the storage layer entities comprise block objects implementing the storing of content of the files and directories.

3. The data storage system of claim 1, wherein:
    the operations comprise a snapshot of the directory of the file system; and
    the coordinating implementation of the operations on the storage layer entities comprises implementing the snapshot on a storage layer entity of the storage layer entities in response to a request to modify the storage layer entity.

4. The data storage system of claim 3, wherein:
    the snapshot is applied to the directory at a first time; and
    the implementation of the snapshot on the storage layer entity is delayed until a modification of the storage layer entity is requested at a second time subsequent to the first time.

5. The data storage system of claim 3, wherein the request to modify the storage layer entity comprises a request to delete the storage layer entity or a request to write to data or metadata of the storage layer entity.

6. The data storage system of claim 3, wherein:
    the operations further comprise a snapshot of a subdirectory included in a directory hierarchy of the directory of the file system; and
    the coordinating implementation of the operations on the storage layer entities comprises implementing the snapshot of the subdirectory on the storage layer entity in response to the request to modify the storage layer entity.

7. The data storage system of claim 1, wherein:
    the path set data structure represents a first version of a path set;
    the processor is configured to execute the instructions to establish an additional version of the path set that represents an additional collection of storage layer entities that store data representative of service layer entities of the directory of the file system;
    the first version of the path set corresponds to a first operation of the operations, the first operation applied, at a first time, to a directory hierarchy of the directory of the file system; and
    the additional version of the path set corresponds to a second operation of the operations, the second operation applied, at a second time subsequent to the first time, to the directory hierarchy of the directory of the file system.

8. The data storage system of claim 7, wherein:
    the first version of the path set represents the collection of storage layer entities that store data representative of service layer entities of the directory hierarchy of the directory of the file system at the first time; and
    the additional version of the path set represents the additional collection of storage layer entities that store data representative of service layer entities of the directory hierarchy of the directory of the file system at the second time.

9. The data storage system of claim 8, wherein the additional collection of storage layer entities that store data representative of service layer entities of the directory hierarchy of the directory of the file system at the second time is different from the collection of storage layer entities that store data representative of service layer entities of the directory hierarchy of the directory of the file system at the first time.

10. The data storage system of claim 1, wherein:
    the path set data structure is used to implement the operations on the storage layer entities as a group associated with a directory hierarchy of the directory of the file system.

11. The data storage system of claim 1, wherein:
the service layer entities are managed by a service layer of the data storage system, the service layer configured to provide a data storage service;
the storage layer entities are managed by a storage layer of the data storage system; and
certain aspects of the data storage service are separated from the service layer for implementation by the storage layer.

12. The data storage system of claim 11, wherein:
the service layer maintains configuration information representing a directory hierarchy of the directory of the file system; and
the storage layer entities of the storage layer do not maintain configuration information representing the directory hierarchy of the directory of the file system.

13. The data storage system of claim 1, wherein the operations comprise at least one of a snapshot operation, a cloning operation, a replication operation, a continuous data protection operation, a quota operation, a space management operation, or a space accounting operation.

14. A data storage system comprising:
a memory storing instructions; and
a processor communicatively coupled to the memory and configured to execute the instructions to:
establish that an operation applied to a directory hierarchy of a directory of a file system at a first time is to be selectively implemented later in time;
detect a request to modify a storage layer entity at a second time that is after the first time, the storage layer entity storing data representative of a file or a subdirectory included in the directory hierarchy of the directory of the file system; and
implement, in response to the request and based on a path set data structure indicating that the storage layer entity is associated with the directory hierarchy of the directory of the file system at the first time, the operation on the storage layer entity before modifying the storage layer entity based on the request, the path set data structure representing a collection of storage layer entities that store data representative of service layer entities whose pathnames begin with a common path to the directory of the file system.

15. The data storage system of claim 14, wherein the operation comprises a snapshot of the directory hierarchy.

16. The data storage system of claim 14, wherein the storage layer entity comprises a block object that stores content of the file or the subdirectory included in the directory hierarchy of the directory of the file system.

17. The data storage system of claim 16, wherein the directory is a managed directory configured to support application of operations to contents of the managed directory as a group.

18. A method comprising:
receiving a request to modify a storage layer entity that implements a file service layer entity of a file system;
determining, in response to the request and based on a path set data structure indicating that the storage layer entity is included in a directory tree of a directory in the file system, that there is a pending operation on the directory that is yet to be applied to the storage layer entity, the path set data structure representing a collection of storage layer entities that store data representative of service layer entities whose pathnames begin with a common path to the directory in the file system; and
applying, based on the determining, the pending operation to the storage layer entity before modifying the storage layer entity based on the request.

19. The method of claim 18, wherein the pending operation comprises a snapshot of the directory.

20. The method of claim 18, wherein the storage layer entity comprises a block object that implements content of a file or a subdirectory included in the directory tree of the directory in the file system.

* * * * *